US009451622B2

(12) United States Patent
Ma et al.

(10) Patent No.: US 9,451,622 B2
(45) Date of Patent: Sep. 20, 2016

(54) METHODS AND SYSTEMS FOR WIRELESS NETWORKS WITH RELAYS

(75) Inventors: Jianglei Ma, Kanata (CA); Hang Zhang, Nepean (CA); Peiying Zhu, Kanata (CA); Mo-Han Fong, L'Orignal (CA); Wen Tong, Ottawa (CA); Ming Jia, Ottawa (CA)

(73) Assignee: APPLE INC., Cupertino, CA (US)

(*) Notice: Subject to any disclaimer, the term of this patent is extended or adjusted under 35 U.S.C. 154(b) by 327 days.

(21) Appl. No.: 13/618,926

(22) Filed: Sep. 14, 2012

(65) Prior Publication Data

US 2013/0028122 A1    Jan. 31, 2013

Related U.S. Application Data

(63) Continuation of application No. 12/093,202, filed as application No. PCT/CA2006/001851 on Nov. 10, 2006.

(60) Provisional application No. 60/822,960, filed on Aug.

(Continued)

(51) Int. Cl.
*G08C 15/00* (2006.01)
*H04W 72/06* (2009.01)
(Continued)

(52) U.S. Cl.
CPC ........... *H04W 72/06* (2013.01); *H04B 7/2606* (2013.01); *H04B 7/2615* (2013.01); *H04L 5/0023* (2013.01); *H04L 5/0035* (2013.01); *H04L 5/0037* (2013.01); *H04L 5/0044* (2013.01); *H04L 5/0048* (2013.01);

(Continued)

(58) Field of Classification Search
USPC ....... 370/203, 208, 241, 252, 253, 315, 350, 370/468
See application file for complete search history.

(56) References Cited

U.S. PATENT DOCUMENTS 6,850,709 B1 * 2/2005 Gfeller et al. ................ 398/118
6,967,965 B2   11/2005 Amit et al.
(Continued)

FOREIGN PATENT DOCUMENTS

WO    2005/067225 A1    7/2005
WO    2006/034578 A1    4/2006

OTHER PUBLICATIONS

International Search Report for corresponding PCT Application No. PCT/CA2006/001851, Feb. 19, 2007, 3 pages.
(Continued)

*Primary Examiner* — Yemane Mesfin
*Assistant Examiner* — Mon Cheri Davenport
(74) *Attorney, Agent, or Firm* — Fay Kaplun & Marcin, LLP

(57) ABSTRACT

Methods and systems are provided for use with wireless networks having one or more cell in which each cell includes a base station (BS), at least one relay station (RS) and at least one mobile station (MS). The at least one relay station can be used as an intermediate station for providing communication between the BS and MS. Methods are provided for an RS to initially access the network, access of the RS by MSs initially accessing the network, methods of allocating OFDM resources for communicating between the BS, RS and/or MS for example dividing transmission resources into uplink and downlink transmissions, and methods of inserting pilot symbols into transmission resources used by the RS. In some embodiments on the invention, the methods are consistent and/or can be used in conjunction with existing standards such as 802.16e.

26 Claims, 37 Drawing Sheets

Related U.S. Application Data 21, 2006, provisional application No. 60/822,816, filed on Aug. 18, 2006, provisional application No. 60/809,341, filed on May 31, 2006, provisional application No. 60/735,940, filed on Nov. 10, 2005.

(51) Int. Cl.

| | | |
|---|---|---|
| *H04B 7/26* | (2006.01) | |
| *H04L 5/00* | (2006.01) | |
| *H04L 27/26* | (2006.01) | |
| *H04L 25/02* | (2006.01) | |
| *H04L 25/03* | (2006.01) | |
| *H04W 16/26* | (2009.01) | |
| *H04W 52/34* | (2009.01) | |
| *H04W 84/04* | (2009.01) | |

(52) U.S. Cl.
CPC ...... *H04L 27/2613* (2013.01); *H04L 27/2655* (2013.01); *H04L 25/0204* (2013.01); *H04L 25/0226* (2013.01); *H04L 25/0232* (2013.01); *H04L 25/03866* (2013.01); *H04W 16/26* (2013.01); *H04W 52/34* (2013.01); *H04W 84/047* (2013.01)

(56) References Cited

U.S. PATENT DOCUMENTS

| | | | |
|---|---|---|---|
| 7,075,949 | B2 | 7/2006 | Okada et al. |
| 7,636,334 | B2 | 12/2009 | Gerlach |
| 7,646,752 | B1 | 1/2010 | Periyalwar et al. |
| 2004/0057397 | A1* | 3/2004 | Kanterakis et al. ......... 370/320 |
| 2004/0095907 | A1 | 5/2004 | Agee et al. |
| 2004/0097238 | A1 | 5/2004 | Hwang et al. |
| 2006/0009212 | A1* | 1/2006 | Kim ................... H04B 17/336 455/423 |
| 2006/0046643 | A1 | 3/2006 | Izumikawa et al. |
| 2006/0153132 | A1 | 7/2006 | Saito |
| 2006/0188031 | A1* | 8/2006 | Liu ............................. 375/260 |
| 2007/0153758 | A1* | 7/2007 | Kang et al. .................. 370/338 |
| 2007/0201392 | A1 | 8/2007 | Ramachandran |
| 2008/0212512 | A1 | 9/2008 | Harpek et al. |
| 2011/0310848 | A1 | 12/2011 | Ma et al. |

OTHER PUBLICATIONS

Leng et al., "A Frame Structure for Mobile Multi-Hop Relay with Different Carrier Frequencies", IEEE Document No. IEEE C802.16mmr-05/025, Nov. 11, 2005, retrieved Feb. 5, 2007 from URL: http://www.ieee802.org/16/sg/mmr/contrib/C80216mmr-05_025.pdf.

Ren et al., "Recommendation on PMP Mode Compatible TDD Frame Structure", IEEE Document No. IEEE C802.16mmr-05/027r1, Nov. 11, 2005, retrieved on Feb. 5, 2007 from URL: http://www.ieee802.org/16/sg/mmr/contrib/C80216mmr-05_027r1.pdf.

Asa et al., "Relay Strategy of Broadcast Messages in Mobile Multihop Relay", IEEE Document No. IEEE C802.16mmr-06/008, Jun. 1, 2006, retrieved on Feb. 5, 2007 from URL: http://www.ieee802.org/16/sg/mmr/contrib/C80216mmr-06_008.pdf.

IEEE 802 Tutorial, "802.16 Mobile Multihop Relay", Document No. IEEE 802.16mmr-06/006, Denver, Colorado, Mar. 6, 2006, retrieved on Feb. 5, 2007 from URL: http://www.ieee802.org/16/sg/mmr/, Slides 1 and 73.

Vook et al., "Signaling Methodologies to Support Closed-Loop Transmit Processing in TDD-OFDM", IEEE C802.16e-04/103r2, Jul. 7, 2004, retrieved on Feb. 5, 2007 from URL: http;//www.ieee802.org/16/tge/contrib/C80216e-04_103.pdf.

Chevillat et al., "Broadband Radio LANs and the Evolution of Wireless Beyond 3G", IBM Journal of Research and Development, vol. 47, No. 2/3, Mar./May 2003, pp. 327-336, retrieved on Feb. 5, 2007, from URL: http://www.research.ibm.com/journal/rd/472/chevillat.pdf, p. 327 and 331.

Koo et al., "Configuration Scenario for Multihop Relay Network", IEEE Document No. IEEE C80216.mmr-06/013, Sep. 1, 2006, retrieved on Feb. 5, 2007 from URL: http://www.ieee802.org/16/sg/mmr/contrib/C80216mmr-06_013.pdf.

Extended Search Report and Supplementary European Search Report for related European Patent Application No. 08733554.3, dated Jan. 6, 2011, 19 pages.

Peterson, R. et al., "Proposal for a Frame Structure for IEEE 802.16j", IEEE 802.16 46th Session, Nov. 7, 2006, 23 pages.

Hoymann, Christian et al., "Multihop Communication in Relay Enhanced IEEE 802.16 Networks", The 17th Annual IEEE International Symposium on Personal, Indoor and Mobile Radio Communications, Sep. 1, 2006, 4 pages.

Schultz, Daniel C. et al., "On the Integration of Relaying in the Winner Mac", Wireless World Research Forum, http://www.comnets.rwth-aachen.de/publications/gesamtlisten/abstracts/2006/scpaklwa-wwrf16.html, retrieved on Aug. 5, 2009, 6 pages.

Zhang, Hang et al., "Frame Structure to Support Relay Node Operations", http://ieee802.org/16, IEEE C802.16j-07/100, Jan. 8, 2007, 13 pages.

Yu, Derek et al., "Dedicated Resource Assignment for RS", http://www.ieee802.org/16/relay/contrib/C80216j-07_101r2.pdf, Jan. 17, 2007, 8 pages.

Office Action for related U.S. Appl. No. 12/300,522, issued on Mar. 28, 2012, 7 pages.

* cited by examiner

METHODS AND SYSTEMS FOR WIRELESS NETWORKS WITH RELAYS

RELATED APPLICATIONS

This application is a continuation of U.S. patent application Ser. No. 12/093,202 filed on May 9, 2008, which claims the benefit of and is a National Phase Entry of International Application No. PCT/CA2006/00185 filed on Nov. 10, 2006, and claims the benefit of U.S. Provisional Patent Application No. 60/735,940 filed on Nov. 10, 2005, U.S. Provisional Patent Application No. 60/809,341 filed on May 31, 2006, U.S. Provisional Patent Application No. 60/822,816 filed on Aug. 18, 2006 and U.S. Provisional Patent Application No. 60/822,960 filed on Aug. 21, 2006, which are all hereby incorporated by reference in their entirety.

FIELD OF THE INVENTION

The invention relates to the field of wireless communications, more specifically to systems and methods for supporting Orthogonal Frequency Division Multiplexed (OFDM) communication using relays.

BACKGROUND OF THE INVENTION

Orthogonal frequency division multiplexing (OFDM) is a form of multiplexing that distributes data over a number of carriers that have a very precise spacing in the frequency domain. The precise spacing of the carriers provides several benefits such as high spectral efficiency, resiliency to radio frequency interference and lower multi-path distortion. Due to its beneficial properties and superior performance in multi-path fading wireless channels, OFDM has been identified as a useful technique in the area of high data-rate wireless communication, for example wireless metropolitan area networks (MAN). Wireless MAN are networks to be implemented over an air interface for fixed, portable, and mobile broadband access systems.

In some wireless networks, a mobile station (MS) in a given cell is only served by its serving base station (BS).

One drawback of such wireless networks is that MSs near an edge of the given cell suffer performance loss due to interference from other cells in cellular networks and propagation loss in non-cellular networks which results in limited data rates and gaps in coverage of the given cell.

While soft hand off can be used in cellular networks to improve performance to some extent for MSs at the cell edge, the improved performance comes at the cost of additional system complexity and a spectrum efficiency penalty.

One way to improve the performance is to introduce a fixed relay station (RS) into wireless networks. The use of an RS may provide a) enhanced system capacity, b) enhanced data rate and cell coverage, c) reduced MS transmit power requirements and d) allow less expensive power amplification.

SUMMARY OF THE INVENTION

According to an aspect of the invention, there is provided a method comprising: allocating an OFDM transmission resource having a frequency dimension consisting of a set of OFDM sub-carriers and a time dimension consisting of OFDM symbols using zones, each zone comprising a set of consecutive OFDM symbols by: for a base station (BS), allocating a DL_MS zone for transmitting to mobile stations (MSs), and allocating a DL_RS zone for transmitting to relay stations (RSs); for each relay station, allocating a DL_MS zone for transmitting to mobile stations, and allocating a DL_RS zone for transmitting to other relay stations if present; for the base station, allocating a UL_MS zone for receiving from mobile stations, and allocating a UL_RS zone for receiving from relay stations; for each relay station, allocating a UL_MS zone for receiving from mobile stations, and allocating a UL_RS zone for receiving from other relay stations if present.

In some embodiments, all of the zones are on a single OFDM carrier.

In some embodiments, the method further comprises separating uplink transmission from downlink transmissions using TDD (time division duplexing).

In some embodiments, allocating comprises defining TDD frames, each TDD frame comprising a DL sub-frame during which downlink transmissions for the BS and RSs takes place, and a UL sub-frame during which uplink transmissions to the BS and RSs takes place, the DL sub-frame and the UL sub-frame being sequentially transmitted.

In some embodiments, the method further comprises separating uplink transmission from downlink transmissions using FDD (frequency division duplexing).

In some embodiments, allocating comprises defining FDD frames, each FDD frame comprising a DL frame during which downlink transmissions for the BS and RSs takes place, and a UL frame during which uplink transmissions to the BS and RSs takes place, the DL frame and the UL frame being simultaneously transmitted using a different frequency resource.

In some embodiments, the method comprises: using an entire OFDM band of a single carrier for communications between BS and RS, communications between RS and RS, communications between BS and MS links, and communications between RS and MS, with no resource reuse among the BS and different tier RS.

In some embodiments, the method further comprises allocating in a manner that employs resource reuse among RSs that are the same number of hops from the BS.

In some embodiments, the method comprises: using an entire OFDM band of a single carrier for communications between BS and RS, communications between RS and RS, communications between BS and MS links, and communications between RS and MS, and allocating in a manner employing resource reuse among the BS and different tier RS.

In some embodiments, the method further comprises allocating in a manner employing resource reuse among RSs that are the same number of hops from the BS.

In some embodiments, the method comprises: using an entire OFDM band for some communications types, and using a partial OFDM band for some communications types with no reuse among BS and different tier RS, the communications types comprising BS to and/or from RS, RS to and/or from RS, BS to and/or from MS, RS to and/or from MS.

In some embodiments, using an entire OFDM band for some communications types comprises: using an entire OFDM band for communications between RS and RS and for communications between RS and BS.

In some embodiments, using a partial OFDM band for some communications types comprises: using a partial OFDM band for communications between MS and RS and for communications between MS to BS.

In some embodiments, using a partial OFDM band for communications between MS and RS and for communications between MS to BS comprises: using a respective partial OFDM band for BS transmissions to MSs and for each tier of RS transmissions to MSs; using a respective partial OFDM band for the BS receptions from MSs and for and each tier of RS receptions from MSs.

In some embodiments, the method further comprises allocating in a manner employing resource reuse among RSs that are the same number of hops from the BS.

In some embodiments, the method comprises: using a first OFDM band for some communications types, and using parts of a second OFDM band for some communication types, the communications types comprising BS to and/or from RS, RS to and/or from RS, BS to and/or from MS, RS to and/or from MS.

In some embodiments, the method comprises: using a first OFDM band for some communications types, a second OFDM band for some communications types, and using parts of a third OFDM band for some communications types, the communications types comprising BS to and/or from RS, RS to and/or from RS, BS to and/or from MS, RS to and/or from MS.

In some embodiments, using a first OFDM band for some communications comprises using the first OFDM band for communications between RS and BS; using a second OFDM band for some communications types comprises using the second OFDM band for communications between RS and RS; using parts of a third OFDM band for some communications types comprises using a respective partial OFDM band for the BS and each tier of RS transmissions to MSs, and using a respective partial OFDM band for the BS and each tier of RS receptions from MSs.

In some embodiments, the method comprises: each relay station transmitting a first preamble for use by mobile stations; each relay station transmitting a second preamble for use by other relay stations.

In some embodiments, the first preamble is an 802.16e preamble.

In some embodiments, the second preamble is transmitted by each RS once in every N frames, where N>=1.

In some embodiments, the second preamble has a structure consistent with 802.16e.

In some embodiments, the second preamble is transmitted within a UL sub-frame for TDD implementations or a UL frame for FDD implementations.

In some embodiments, the RSs transmission and receiving of the second preamble is synchronized so that at each second preamble transmission time, only one RS per tier is receiving and all others are transmitting.

According to an aspect of the invention, there is provided a method of channel coordination for RSs, a channel comprising an OFDM zone, the method comprising: each RS measuring neighboring station's signal strength and/or channel quality and reporting this to a BS; each RS reporting its capability to the BS; the BS determining a channel assignment for each RS and broadcasting this information to the RSs.

According to an aspect of the invention, there is provided a method of channel coordination for RSs, a channel comprising an OFDM zone, the method comprising: each one hop RS measuring neighboring station's signal strength and/or channel quality and reporting this to a BS; each one hop RS reporting its capability to the BS; the BS determining a channel assignment for each one hop RS and broadcasting this information to the RSs; each one hop RS determining channel assignment for next hop RSs and so on.

According to an aspect of the invention, there is provided a method of channel coordination for RSs, a channel comprising an OFDM zone, the method comprising: each RS in any of a first N hops from a BS measuring neighboring station's signal strength and/or channel quality and reporting this to the BS; each RS in any of the first N hops reporting its capability to the BS; the BS determining a channel assignment for each RS in any of the first N hops and broadcasting this information to the involved RSs; each RS in hops subsequent to the Nth hop determining channel assignment for each next hop RSs.

According to an aspect of the invention, there is provided a method of allocating RS DL Resource comprising: allocating a persistent resource for RS DL communications for a period of time longer than a frame, wherein a frame comprises multiple OFDM symbols.

In some embodiments, the method further comprises: updating the persistent resource allocation from time to time; supplementing the persistent resource allocation from time to time; terminating the persistent resource allocation when appropriate.

In some embodiments, updating the persistent resource allocation comprises updating any one or more of: resource size information; resource location information; and modulation code scheme (MCS) information that at least in part defines the persistent resource allocation.

According to an aspect of the invention, there is provided a method of performing RS UL Resource Allocation comprising: in a non-contention based approach, allocating each RS a dedicated UL resource for the RS to send a resource request MAC (media access control) header every N frames, where N is a pre-defined number and using the dedicated resource to send request UL resources; the BS responding with a resource grant.

In some embodiments, sending the resource request MAC header comprises sending the following fields: request type, Bandwidth request, and HCS (header check sequence).

According to an aspect of the invention, there is provided a method of performing RS UL Resource Allocation comprising: in a contention based approach, the RS sending a BW (bandwidth) request ranging message to request a UL resource; the BS responding with a resource grant.

In some embodiments, sending a BW request ranging message comprises sending the following fields: request type, Bandwidth request, station ID and HCS.

In some embodiments, the resource allocation is a persistent UL resource allocation, the method further comprising: updating the persistent UL resource allocation from time to time; supplementing the persistent UL resource allocation from time to time; terminating the persistent UL resource allocation when appropriate.

According to an aspect of the invention, there is provided a method of performing MS UL Resource Allocation comprising: disabling a piggyback sub-header function for a multi-hop-away MS; a MS using a BW request header along with data if there is a UL resource available.

According to an aspect of the invention, there is provided a method of performing MS UL Resource Allocation comprising: an RS associated with a MS forwarding a piggyback sub-header to a BS; the BS decrypting the piggyback sub-header and informing the RS associated with the MS.

According to an aspect of the invention, there is provided a method of facilitating intra-cell peer-to-peer communication comprising: maintaining a destination address table for a BS that includes destination addresses that are served by the BS; upon receiving a packet containing a destination address, determining if the destination address is in the address table or not; if the destination address is within the table, routing the packet towards the destination without upper layer processing, and otherwise routing the packet for upper layer processing.

In some embodiments, routing the packet for upper layer processing comprises: performing DL classification and CID (connection identification) mapping and sending the packet to a destination MS or RS associated with the destination MS.

In some embodiments, the method further comprises updating the table upon at least one of the following occurrences: after a MS enters a network; at a MS hand off when the MS leaves a cell served by a given BS; and at a MS hand off when the MS enters a cell served by a given BS.

According to an aspect of the invention, there is provided a method for use in an OFDM communication system employing relay stations comprising: dividing communications into frames each comprising multiple OFDM symbols; dividing the frames into first and second groups of frames, the first group of frames being used for communication between a base station (BS) and RSs one-hop away from the BS, and for communications between the BS and its respective mobile stations (MSs), the first group also being used for communication between RSs two-hops away from the BS and its respective MSs, and the second group of frames being used for communication between the RSs one-hop away from the BS and any RS/MS it is communicating with.

In some embodiments, dividing the frames comprises dividing the frames such that the first group is odd frames and the second group is even frames.

In some embodiments, the method further comprises: the BS communicating with mobile stations during the second group of frames at a reduced transmission power with respect to the transmission power used for transmitting to the RSs.

In some embodiments, the method further comprises, after entry into a network, each relay station transmitting a preamble and frame control header (FCH) on every frame.

In some embodiments, the method further comprises: defining DL RS_Zones for downlink transmission from a base station or an RS to another RS and UL RS_Zones for uplink transmission from an RS to another RS, or from an RS to BS, with remaining resources available for communication with MSs.

In some embodiments, defining DL RS_Zones comprises defining a zone size and starting OFDM symbol within the frame according to one of: a fixed size; a size that is slowly changed through a management media access control (MAC) message; a size that is dynamically changed and forecast by BS and DL transmitting RSs subsequent to the change.

In some embodiments, the method further comprises transmitting RS multiplexing access profile (RS-MAP) information to indicate the resource assignments for the DL RS_zone and/or the UL RS_zone.

In some embodiments, transmitting the RS-MAP includes transmitting one or more of: resource location information, resource size information, and modulation and coding scheme (MCS) information.

In some embodiments, the location information is a fixed offset relative to the beginning of a frame or a fixed offset relative to RS_Zone.

In some embodiments, the modulation and code information is provided by at least one of: slowly updating the MCS information based on worst link budgets among all attached RS; and multicasting the MCS information to the corresponding RSs when needed.

In some embodiments, transmitting multiple RS-MAP, each RS-MAP for a respective one RS or multiple RSs with similar channel qualities.

According to an aspect of the invention, there is provided a method for use in an OFDM communication system employing relay stations (RSs) comprising: assigning a distinct pseudo-random noise (PN) sequence to each base station (BS) and each respective RS.

In some embodiments, assigning the distinct PN sequence to each relay station comprises including assigned PN index, DL_PermBase, and PRBS_ID fields in REG-REQ/RSP (registration request/response) messages.

In some embodiments, the method further comprises for purposes of routing, identifying each BS or RS by a BS identification (BS ID) in a MAC management message.

In some embodiments, identifying each RS comprises assigning each RS a BS ID in a REG-REQ/RSP message.

In some embodiments, assigning a distinct PN sequence for a mobile relation station (MRS) is statically defined even when there is a handoff.

In some embodiments, the method further comprises defining for mobile relay stations a system reserved sub-set of PN indexes so as to avoid collisions when a MRS moves across the network.

In some embodiments, the PN index is re-assigned during a handoff, and further comprising informing any attached MSs of the change and/or performing re-synchronization.

In some embodiments, the method further comprises: performing sub-channelization using bins, wherein each bin is a band of sub-carriers in an OFDM symbol.

In some embodiments, performing sub-channelization using bins is performed in a manner consistent with 802.16e AMC sub-channelization.

In some embodiments, a bin is defined as a band of contiguous sub-carriers (G) in one OFDM symbol, with each bin including at least one pilot sub-carrier.

In some embodiments, the at least one pilot sub-carrier is: for one antenna located in the bin at a sub-carrier indexed with floor(G/2); for two antennas located in the bin at a first sub-carriers indexed with floor(G/2) for a first antenna and a second sub-carrier indexed with floor(G/2)+1 for a second antenna; and for four antennas located in the bin at a first sub-carrier indexed with floor(G/2) for a first antenna, a second sub-carrier indexed with floor(G/2)−1 for a second antenna, a third sub-carrier indexed with floor(G/2)+1 for a third antenna and a fourth sub-carrier indexed with floor(G/2)+2 for a fourth antenna.

In some embodiments, performing sub-channelization comprises forming sub-channels from contiguous sets of one or more bins over one or more consecutive OFDM symbols.

In some embodiments, the method further comprises performing DL resource multiplexing between BS and RS, between RS and RS, between BS and MS and between RS and MS on an FDM (frequency division multiplexing) basis.

In some embodiments, the method further comprises for all available sub-carriers used for pilot and data in an OFDM symbol; dividing the sub-carriers into a set of major groups; and dedicating a number of the major groups of the set of major groups to BS and RS transmission and RS and RS transmission.

In some embodiments, dividing the sub-carriers into a set of major groups and dedicating a number of the major groups is done in a manner consistent with 802.16e.

In some embodiments, a sub-channel is defined so as to enlarge sub-channel size, each sub-channel defined to consist of a set of clusters that are not contiguous.

In some embodiments, the method further comprises performing UL resource multiplexing between RS and BS, between RS and RS, between MS and BS and between MS and RS using the UL RS_Zones.

In some embodiments, the method further comprises: performing sub-channelization using bins, wherein each bin is a band of sub-carriers in an OFDM symbol.

In some embodiments, a first bin definition includes pilot symbols, and a second bin definition does not include pilot symbols, and a combination of the two bin definitions is used for a given sub-channel.

In some embodiments, the method further comprises: initially assuming an entire frame resource is initially available for use for RS related transmission (DL/UL); defining RS sub-channels; assigning resources for MSs first; then assigning resources for RSs with RS sub-channels; resources assigned to RS that are already occupied by MSs are punctured out from the assigned resource for RS.

According to an aspect of the invention, there is provided a method comprising: measuring strengths of a plurality of preambles in use in an OFDM network; selecting a preamble to transmit based on the measured strengths of the preambles.

In some embodiments, measuring strengths of a plurality of preambles in use in the system is performed during initial network entry.

In some embodiments, selecting a preamble to transmit based on the measured strengths of the preambles comprises: selecting at least one preamble having a signal strength below a threshold.

In some embodiments, the method further comprises: signalling the selection of the at least one preamble back to a serving base station.

According to an aspect of the invention, there is provided a method comprising: a relay station measuring strengths of a plurality of preambles in use in an OFDM system and feeding at least some of these measurements back to a serving base station; the serving base station selecting a preamble for the relay to transmit based on the measured strengths of the preambles and signalling a selected preamble back to the relay.

In some embodiments, signalling to identify preambles is performed using preamble indexes.

In some embodiments, feeding at least some of these measurements back to a serving base station comprises: feeding back a list that includes all the preamble indexes whose strength measured by the RS are higher and/or lower than a pre-defined threshold.

According to an aspect of the invention, there is provided a method comprising: receiving strength measurement information from a mobile station in respect of a plurality of preambles transmitted by respective relay stations in an OFDM network; allocating resources in a manner resulting in resource re-use based on the strength measurements.

In some embodiments, allocating resources in a manner resulting in resource re-use based on the strength measurements comprises allocating resources at a first relay station to the mobile station that are also being allocated at a second relay station whose preamble signal strength measurement was below a defined threshold.

In some embodiments, allocating resources in a manner resulting in resource re-use based on the strength measurements comprises: if a first mobile station reports a good signal strength from a first relay station and poor signal strength from a second relay station, and a second mobile station reports a good signal strength from the second relay station and poor signal strength from the first relay station, then in at least some instances assigning the same or at least partially overlapping resources at the first and second relay stations for transmitting to the first and second mobile stations with the understanding that this will not result in interference.

According to an aspect of the invention, there is provided a method for initial access of a relay station (RS) into an OFDM system comprising a base station (BS) and at least one mobile station (MS), the method comprising: the RS performing downlink (DL) synchronization, including frame synchronization and timing/frequency synchronization; the RS performing cell identification and selection; the RS obtaining system parameters from information sent on a broadcast channel by the BS to all receiving stations and decoding the received system parameters; the RS transmitting an initial ranging code; the RS receiving a response to its transmitted initial ranging code from the BS.

In some embodiments, the method further comprises: selecting the initial ranging code from a first sub-set of ranging codes allocated for use by relay stations in a cell serving the BS, which are different than a second sub-set of ranging codes allocated for use by mobile stations in the cell serving the BS.

In some embodiments, the method further comprises: selecting the initial ranging code from a set of ranging codes allocated for use by relay stations and mobile stations in the cell serving the BS.

In some embodiments, the method further comprises: selecting the initial ranging code from a set of ranging codes allocated for use by relay stations and transmitting the selected initial ranging code in a time-frequency region that is different than a time-frequency region used for MS initial ranging.

According to an aspect of the invention, there is provided a method for initial access of a relay station (RS) by a mobile station (MS) in an OFDM system comprising a base station (BS) and at least one RS, the method comprising: the RS transmitting a common Sync symbol and preamble to enable downlink (DL) synchronization by the mobile; the RS transmitting information on a broadcast channel available to be received and decoded by all who receive the information; the RS detecting an initial ranging code from the MS; the RS sending a response to the received initial ranging code.

In some embodiments, the initial ranging code received by the RS comprises: an initial ranging code selected from a set of RS dedicated initial ranging codes that are specific to different RSs respectively in a cell served by the BS.

In some embodiments, information regarding RS dedicated initial ranging codes is transmitted and readable by all receivers within range of the BS on a BS broadcast channel.

In some embodiments, initial ranging code received by the RS comprises: an initial ranging code selected from a set of allocated common initial ranging codes that are used for the BS and all RSs in a cell served by the BS.

According to an aspect of the invention, there is provided in an OFDM system comprising a base station (BS), at least one relay station (RS) and a plurality of mobile station (MSs), a method comprising: an RS receiving a BS preamble and additional information from the BS in a BS downlink (DL) transmission, the additional information including a BS-FCH (BS frame control header), BS-MAP (BS-multiplexing access profile), BS-Broadcast information; the RS transmitting in an RS DL transmission an RS preamble and an RS-FCH (RS frame control header), RS-MAP (RS-multiplexing access profile) and the BS-Broadcast information following a duration for receiving the additional information received from the BS in the BS DL transmission; the at least one RS receiving in an RS UL transmission ranging information from any relay stations and MSs with which the at least one RS is communicating; the at least one RS transmitting in a BS UL transmission ranging information from the at least one relay station (RS) and at least some of the plurality of MSs.

In some embodiments, the method further comprises separating UL transmissions from DL transmissions using TDD (time division duplexing).

In some embodiments, the method further comprises defining TDD frames, each TDD frame comprising a DL sub-frame during which downlink transmissions for the BS and RSs takes place, and a UL sub-frame during which uplink transmissions to the BS and RSs takes place, the DL sub-frame and the UL sub-frame being sequentially transmitted.

In some embodiments, the method further comprises separating UL transmissions from DL transmissions using FDD (frequency division duplexing).

In some embodiments, the method further comprises defining FDD frames, each FDD frame comprising a DL frame during which downlink transmissions for the BS and RSs takes place, and a UL frame during which uplink transmissions to the BS and RSs takes place, the DL frame and the UL frame being simultaneously transmitted using a different frequency resource.

In some embodiments, the duration is the duration for the RS to receive the additional information from the BS plus a predetermined offset.

In some embodiments, the duration is a fixed duration.

In some embodiments, a duration for receiving the additional information is variable in duration.

According to an aspect of the invention, there is provided in an OFDM system comprising a base station (BS), at least one relay station (RS) and a plurality one mobile station (MS), a method comprising: communicating between the BS and an RS using closed-loop MIMO (multiple input multiple output) techniques; and the RS communicating with at least one MS of the plurality of MS.

In some embodiments, the RS communicating with at least one MS comprises communicating between the RS and the at least one MS using closed-loop MIMO techniques.

In some embodiments, the method further comprises: the RS communicating with at least one other RS; and the at least one other RS communicating with at least one MS of the plurality of MS.

In some embodiments, the RS communicating with at least one other RS comprises communicating between the RS and the at least one RS using closed-loop MIMO techniques.

According to an aspect of the invention, there is provided in an OFDM system comprising a base station (BS), at least one relay station (RS) and a plurality of mobile stations (MSs), a method comprising: for two or more of a group consisting of: the BS; the at least one RS; and at least one of the plurality of MSs: using a same set of sub-carriers for downlink (DL) and/or uplink (UL) transmissions.

In some embodiments, the method further comprises transmitting between the BS and at least one MS one hop from the BS and between the BS and at least one RS one hop from the BS over respective sub-channels having different sub-carrier to sub-channelization permutations.

In some embodiments, the method further comprises transmitting between the RS and at least one MS one hop from the RS over respective sub-channels having different sub-carrier to sub-channelization permutations.

In some embodiments, the method further comprises for uplink transmissions, one or both of: at least two MS, each respectively one hop from the BS, collaboratively transmitting to the BS; and at least two MS, each respectively one hop from a respective RS, collaboratively transmitting to the respective RS.

In some embodiments, the method further comprises for uplink transmissions, one or both of: at least two RS, each one hop from the BS, collaboratively transmitting to the BS; and at least two MS, each one hop from a respective RS, collaboratively transmitting to the RS.

In some embodiments, the method further comprises one or more of: transmitting concurrently from two or more RSs to the BS; transmitting concurrently from two or more MSs to the BS; transmitting concurrently from two or more mobile stations to the at least one RS.

In some embodiments, the method further comprises performing interference cancellation techniques to improve detection performance.

In some embodiments, performing interference cancellation techniques is performed by one or both of the RS and the BS.

According to an aspect of the invention, there is provided a method for inserting OFDM pilot symbols in a time-frequency resource in a system using relay stations (RSs), at least one RS having N transmitting antennas, where N>=1 comprising: inserting pilot symbols in time and frequency for each of the N transmitting antennas in a given relay station in symbol locations that are not assigned to pilot symbols used by a base station (BS) serving a cell in which the given RS is currently located or mobile stations (MSs) located in the cell served by the BS.

In some embodiments, when N=2: for each transmitting antenna, assigning pilot symbols in time and frequency in a given pattern for transmission by the antenna and assigning null symbol locations that correspond to locations of pilot symbols to be transmitted by the other antenna.

In some embodiments, when N=4: for each transmitting antenna, assigning pilot symbols in time and frequency in a given pattern for transmission by the antenna and assigning null symbol locations that correspond to locations of pilot symbols to be transmitted by the other antennas.

In some embodiments, the method further comprises inserting OFDM pilot symbols in a time-frequency transmission resource for other RSs in the same cell with a pattern that is the same as a pattern of the transmission resource of the given RS, but which is shifted in time and/or frequency with respect to the given RS.

In some embodiments, inserting pilot symbols in time and frequency comprises inserting pilot symbols in time and frequency using partial use sub-carrier channelization (PUSC) and/or optional PUSC.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the attached drawings in which.

DETAILED DESCRIPTION OF THE EMBODIMENTS OF THE INVENTION

In accordance with embodiments of the invention, various physical layer designs and procedures are provided for enabling relay based communications that may find applications in an IEEE 802.16 based network. The concepts described herein are not, however, limited in this regard and may be applicable to any OFDM based systems, such as 3GPP and 3GPP2 evolutions.

Figure 1:
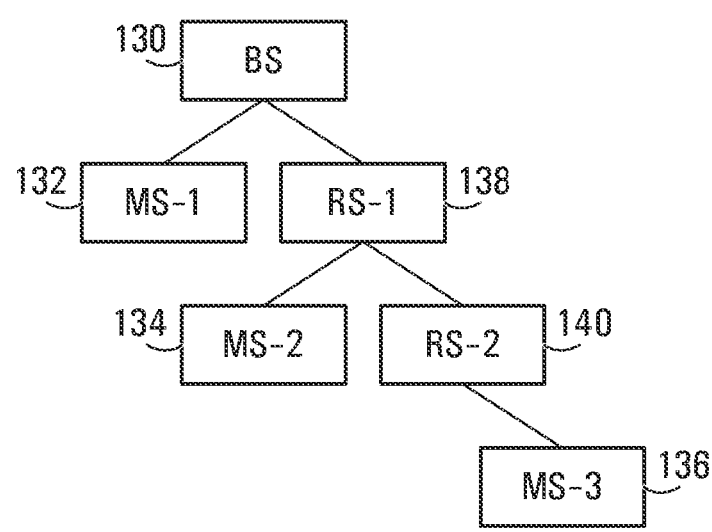
FIG. 1 is a block diagram of an example of a network including a base station, relay stations and mobile stations.

FIG. 1 shows an example of a wireless system, for example an OFDM network that includes relays. Shown is a base station (BS) 130 that is in communication with one or more mobile stations (MS), only one shown MS-1 132, and one or more first tier relay stations (RS), only one shown RS-1 138. Some of the first tier (one hop away from BS) relay stations are in communication with one or more second tier (two hops away from BS) relay stations. RS and MS the same number of hops away from the BS are said to be in the same tier. In the illustrated example RS-1 138 is in communication with second tier RS-2 140. Each relay station can serve one or more mobile stations. For example, RS-1 138 is in communication with MS-2 134 and RS-2 140 is in communication with MS-3 136. In the particular example, there is a two-tier relay structure, such that there is a maximum of three hops to reach a mobile station. Larger numbers of hops are contemplated. Furthermore, the specific network of FIG. 1 is to be considered only an example. More generally, an arbitrary arrangement of base stations, relay stations, and mobile stations is contemplated. The mobile stations will change over time due to their mobility. Some embodiments support only fixed relays; others support mobile relays, while further embodiments support both fixed and mobile relays.

Figure 2:
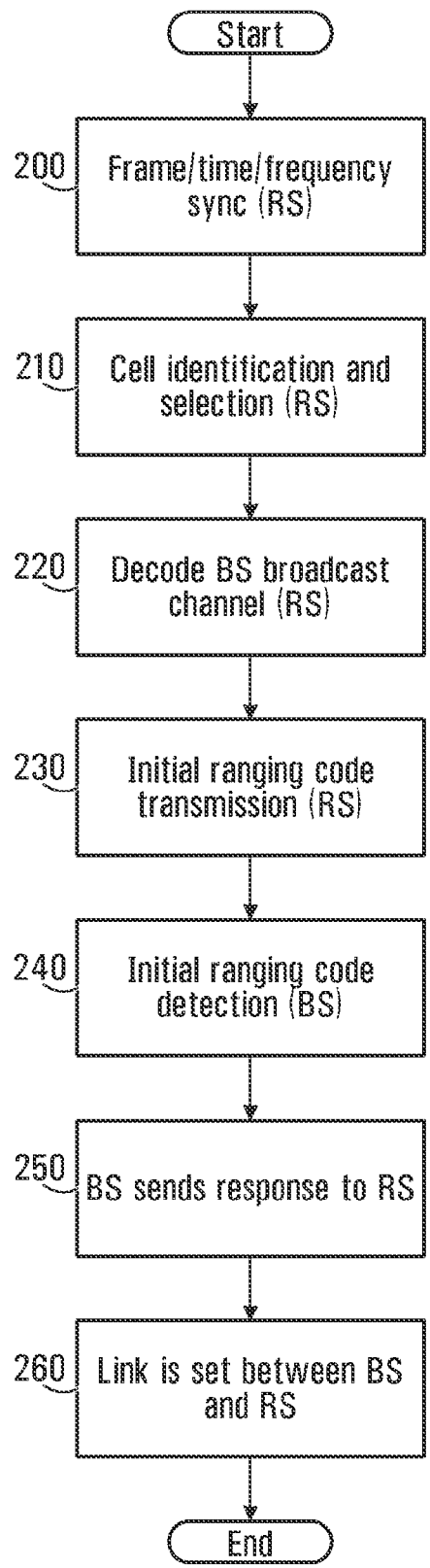
FIG. 2 is a flow chart for a relay station (RS) initial access procedure in accordance with an embodiment of the invention.

When a relay station is added to a wireless system, the RS initially accesses the system by communication with a base station. Referring to FIG. 2, a method for initial access for a relay station will now be described. In the interest of brevity, this flowchart includes steps executed by a BS and steps executed by an RS. Note that further embodiments of the invention provide a method consisting only of the RS executed stations, and an RS operable to execute such a method, and a method consisting only of the BS executed steps, and a BS operable to execute such a method. The RS performs down link (DL) synchronization, which includes frame synchronization and timing/frequency synchronization at step 200. For example, the RS receives synchronization information sent by the BS that any RS (or MS) within receiving distance of the BS is capable of receiving, for example a BS DL common Sync symbol and/or BS preamble information. At step 210, cell identification and selection is performed by the RS. This results in a specific BS being selected by the RS as the one to access the system through. At step 220, system parameters are obtained and decoded by the RS from information sent on a broadcast channel by the BS and capable of being read by all receiving stations, either RS or MS. At step 230, the RS performs initial ranging. This includes the RS sending an initial ranging code. This code may be one of a set of predetermined pseudo-noise codes allocated for requesting initial access to the BS. At step 240, the BS detects the RS initial ranging code. At step 250, the BS responds to the received initial ranging code sent by the RS. A link is then established between the BS and the RS as indicated at 260.

In a network with no relay stations, a set of ranging codes is allocated for the MSs for initial ranging. In a network with relay stations, ranging codes also need to be allocated to RSs for initial ranging. There are multiple ways to allocate ranging codes to RSs and MSs.

In some embodiments, a set of ranging codes that are used for initial access ranging is separated into two sub-sets, and one subset is assigned to be used by RSs and the other sub-set is assigned to be used by MSs for initial ranging of RSs and the BS. In some embodiments, the same ranging codes are used for both RSs and MSs for initial access ranging. In such embodiments, the BS is able to distinguish between ranging by the RSs and MSs. In some embodiments, different time-frequency transmission resources are used for RS initial ranging than are used for MS initial ranging.

Figure 3:
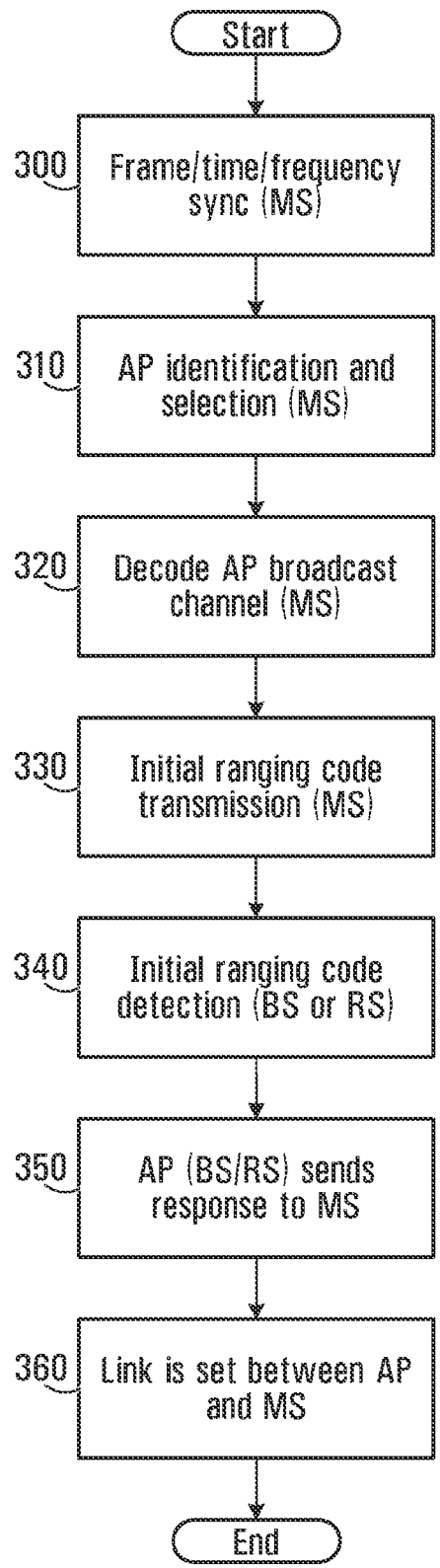
FIG. 3 is a flowchart for a mobile station (MS) initial access procedure in accordance with an embodiment of the invention.

Referring to FIG. 3, a method for a mobile station to initially access a network having a BS and at least one RSs will now be described. In the interest of brevity, this flowchart includes steps executed by a BS/RS and steps executed by a MS. Note that further embodiments of the invention provide a method consisting only of the BS/RS executed steps, and a BS/RS operable to execute such a method, and a method consisting only of the MS executed stations, and a MS operable to execute such a method.

At step 300, the MS performs initial system access to synchronize with access points (AP) in the network, which includes frame synchronization and timing/frequency synchronization. An access point is an RS or the BS of the cell serving the MS that the MS accesses when entering the network. In some embodiments, this includes the BS transmitting a DL BS common Sync symbol and preamble and the RS transmitting a DL RS common Sync symbol and preamble. The DL BS and DL RS common Sync symbols may be carried on respective BS and RS common Sync channels transmitted by the RS and BS, respectively.

In some embodiments, the DL RS common Sync symbol is identical in structure and sequence to that which is transmitted by the BS, as described above, with regard to the RS initially accessing the network.

The preamble transmitted by each AP may include an AP specific Sync channel. In some embodiments, the preamble transmitted by the RS is similar to a BS cell specific Sync channel in a system not using relay stations. In some embodiments, the preamble transmitted by the RS may use an identical structure to that used by the BS. In some embodiments, an RS signature for the RS is added to the AP specific Sync channel. The RS may obtain its signature from the BS. In some embodiments, the RS specific code is added on top of a cell specific code. In some embodiments, RS specific scrambling is applied to cell specific codes.

At step 310, the MS performs AP identification and selection based on the DL AP common Sync symbol and preamble. In some embodiments, this is a similar procedure to cell identification and selection that the MS performs with the BS in non-relay systems or that the RS performs with the BS as described above with regard to FIG. 2. In some implementations, a two-step preamble detection is performed in which the MS performs cell identification and selection and then the MS performs AP identification and selection in the selected cell. In some implementations, a one-step preamble detection is performed in which the MS scans all cell specific codes and selects the AP based on the results of scanning. For example, the MS might select the AP with the strongest reception. In some embodiments, a threshold value for the signal strength of the measured preamble can be set to trigger the selection of RS. Cell selection involves selecting a single AP from a set of one or more RSs and/or BSs that are detected.

At step 320 the MS obtains and decodes system parameters from information sent on a broadcast channel by the selected access point (RS or BS). In the event the RS transmits a broadcast channel, the RS may retransmit information passed along from the BS. Alternatively, for the RS case, rather than the RS transmitting a broadcast channel, the system information may be obtained from a broadcast channel sent by the BS.

At step 330, the MS performs initial ranging. The MS sends an initial ranging code to the selected access point (RS or BS). Alternatively or in addition, in the RS case, the ranging code may be sent directly to the BS. If initial ranging codes are sent to both the BS and the selected RS, coordination of transmissions may be needed.

Following the MS sending the initial ranging code at step 330, the APs in the cell detect the initial ranging code at step 340.

At step 350, the selected AP (BS or RS), sends a response to the received initial ranging code sent by the MS. A link is then established between the selected AP (BS or RS) and the MS as indicated at 360.

There are multiple ways of performing steps 330 and 340. In a first example of the MS performing initial ranging, BS and RS dedicated initial ranging codes are used. For initial ranging to RSs for example, each RS is assigned an RS initial ranging code from a set of RS initial ranging codes to distinguish between different RSs in the same cell. The MS may obtain RS initial ranging code information from the BS broadcast channel.

The initial ranging code is then detected by the selected AP (BS or RS). In the RS case, the RS detects its dedicated initial ranging code. The RSs pass the detected information to the BS. The BS determines RS selection results based on the dedicated initial ranging code.

In a second example, common initial ranging codes are used for the BS and all RSs in the same cell. In some embodiments, the ranging codes in the 802.16e standard may be used. The common initial ranging code sent by the MS is detected by the RSs. In some embodiments, all RSs in the same cell may detect an initial ranging channel on which the common initial ranging code is transmitted. The RS passes the detected information to the BS. The BS receives MS's RS selection information from message exchanges between the MS and the RS as well as between the RS and the BS.

FIGS. 2 and 3 are described in relation to a single hop between the RS and BS and a single hop between the MS and the RS. However, a relay station entering a network more than a single hop from the BS or a MS attaching to a multiple hop series of RSs are also contemplated.

A transmission resource for OFDM transmission is a two dimensional resource. A first dimension consists of a set of OFDM sub-carriers. A second dimension consists of OFDM symbols, an OFDM symbol referring to the transmission of OFDM sub-carriers collectively for an OFDM symbol duration. Sets of OFDM symbols may also be combined to form frames. Another way of defining the two dimensional OFDM resource is to consider one dimension to be represented by logical sub-channels and the other dimension is represented by sub-channel allocation periods which may be one or multiple OFDM symbols.

Figure 4:
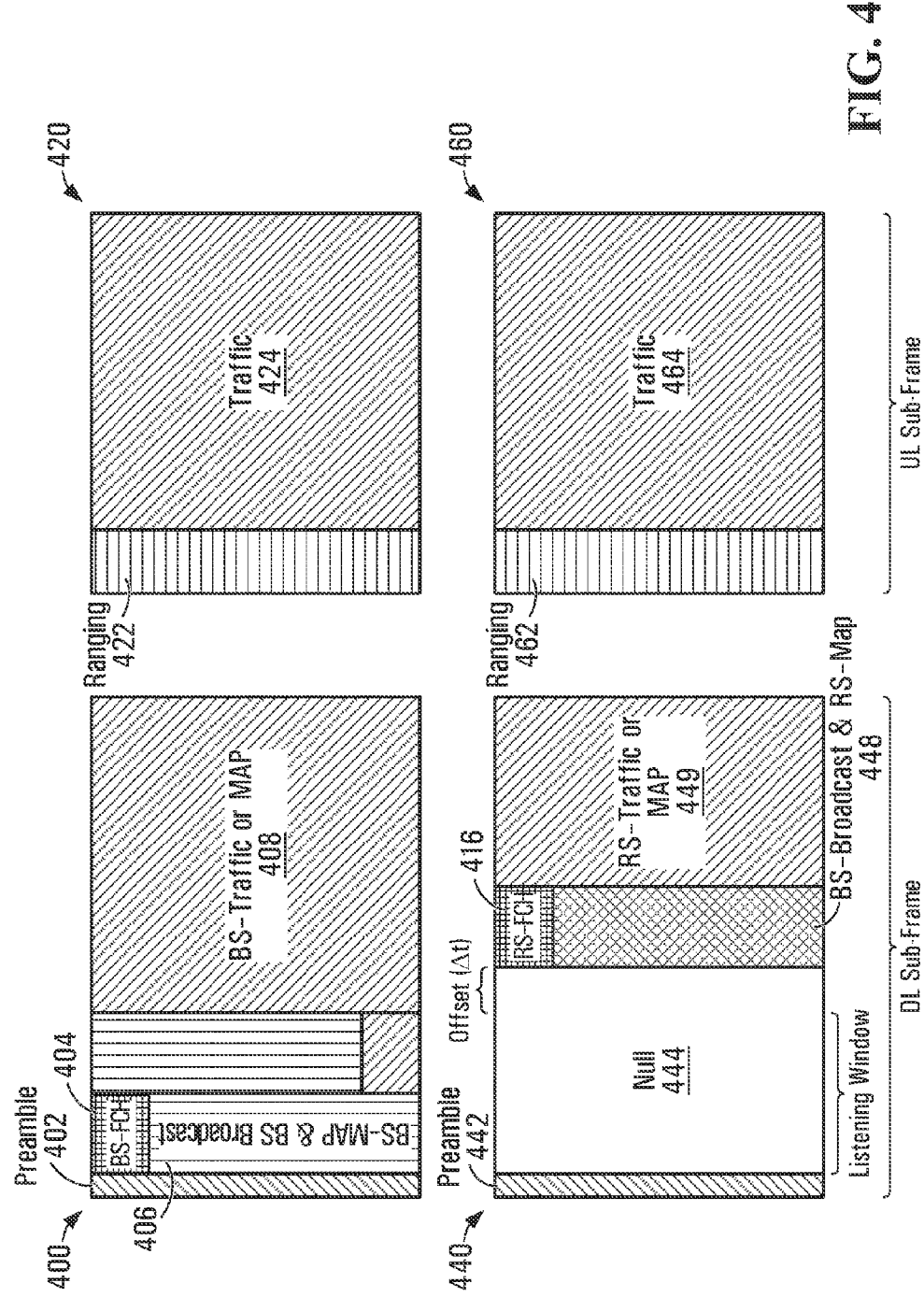
FIG. 4 is a set of schematic diagrams of a TDD (time division duplex) Frame Structure for a base station (BS) and an RS where a BS-FCH (base station frame control header) reaches all MSs within range of the BS in accordance with an embodiment of the invention.

FIG. 4 illustrates examples of respective TDD (time division duplex) frame structures for use by a BS and for use by an RS. The BS frame structures of FIG. 4 include an example DL sub-frame 400 and UL sub-frame 420 for transmission between the BS and RS, as well as between the BS and any MSs the BS may communicate with directly. The RS frame structures of FIG. 4 include an example DL sub-frame 440 and UL sub-frame 460 for transmission between the RS and MSs and between the RS and other RSs with which the RS may communicate. For the examples of FIG. 4, it is assumed that a frame control header (FCH) transmitted by the BS is received by all MSs in the cell served by the BS. The FCH provides some initial information about the contents of the DL and/or UL sub-frames. For example, the FCH may contain information about the size of the multiplexing access profile (MAP) information following the FCH. The MAP information is used to identify locations in the DL sub-frame where data is transmitted to particular RSs or MSs and/or locations in the UL sub-frame where data is received from particular RSs or MSs.

The sub-frames that are depicted in FIG. 4 are two dimensional channel resources in which one dimension is represented by logical sub-channels and the other dimension is represented by sub-channel allocation periods which may be one or multiple OFDM symbols. A logical sub-channel is a designated grouping of active sub-carriers that may or may not be contiguous, and that may not necessarily all be on the same OFDM symbol. Active sub-carriers are any one of data sub-carriers for data transmission, pilot sub-carriers for synchronization, or sub-carriers that do not involve direct transmission, but are used for example as transition guards between the sub-frames. In some embodiments, a combination of the DL and UL sub-frames 400,420 form a frame that enables two-way communication between the BS and one or more RS and the BS and one or more MS. In use, such a frame is preceded and followed by similar frames, all forming part of an ongoing sequence of frames. In some embodiments, a combination of the DL and UL sub-frames 440,460 for the RS form a frame that enables two-way communication between the RS and one or more RS and the RS and one or more MS. In use, such a frame is preceded and followed by similar frames, all forming part of an ongoing sequence of frames.

In some embodiments, for each of the BS and the RS, each DL sub-frame 400,440 starts with a respective preamble 402,442. In the BS DL sub-frame 400, following the preamble 402, the BS includes a frame control header (FCH) [BS-FCH] 404 described above that is capable of being received and read by all stations, either RS or MS, within the transmission range of the BS. Following the BS-FCH 404, the BS DL sub-frame 400 includes a multiplexing access profile (MAP) [BS-MAP] 406 that is also capable of being received and read by all stations, either RS or MS, within the transmission range of the BS. In some embodiments, the BS also transmits information in a broadcast format [BS-Broadcast] that can be detected by all who receive it. In some embodiments, a portion of the DL sub-frame 400 is allocated for transmission of the BS-Broadcast and the BS-MAP, as illustrated in FIG. 4. In some embodiments, each of the preamble 402, BS-FCH 404, BS-MAP and BS-Broadcast 406 vary in duration depending on their respective content. MSs that receive the DL structure 400 may know the length of BS-MAP 406 even though it cannot decode information included in the BS-MAP 406. The length of the BS-MAP may be included in the BS-FCH, for example. An RS that receives the DL sub-frame 400 decodes the BS-Broadcast information and then retransmits it to other RS or MS. Also included in the BS DL sub-frame 400 is the BS-Traffic 408 to be transmitted to RSs and MSs. In some embodiments, the portion of the BS DL sub-frame 400 including the BS-Traffic 408 may also include MAP information only accessible by a receiving station that knows its location or MAP information assigned only for specific receiving stations.

In the RS DL sub-frame 440, following preamble 442 the RS includes a null period 444 to allow receipt of the BS-FCH, BS-MAP and BS-Broadcast. The null period 444 may include a predetermined time offset ($\Delta t$) from a point in time following the end of receipt of the BS-MAP and BS-Broadcast 406 to allow for RS radio switching from a receiving mode to a transmitting mode for example. In some embodiments, the inclusion of the predetermined time offset may aid in accommodating coexistence of multiple radios. The RS then transmits an RS specific FCH (RS-FCH) 446, RS specific MAP (RS-MAP) and broadcast format information [BS-Broadcast] 448. The RS-FCH 446 and RS-MAP and BS-Broadcast 448 are received by MSs and other RSs that are in communication with the RS. The RS then send traffic 449 to the MSs or other RSs.

An MS receiving from a given RS may determine the location of the RS-FCH based on the length of BS-FCH and $\Delta t$ and then decode the RS-FCH and RS-MAP received from the given RS. This requires every MS, even those receiving access through an RS, to be able to receive enough of the BS transmission to determine where the RS-FCH is located.

In some embodiments, for each of the BS and the RS, each UL sub-frame 420,460 may start with a ranging portion 422,462. Following the ranging portion 422,462 traffic 424, 464 from the MS to the RS can be sent. The ranging portion may be used for example for initial ranging, periodic ranging (for example to re-synchronize with the RS) or to transmit bandwidth requests.

Figure 5:
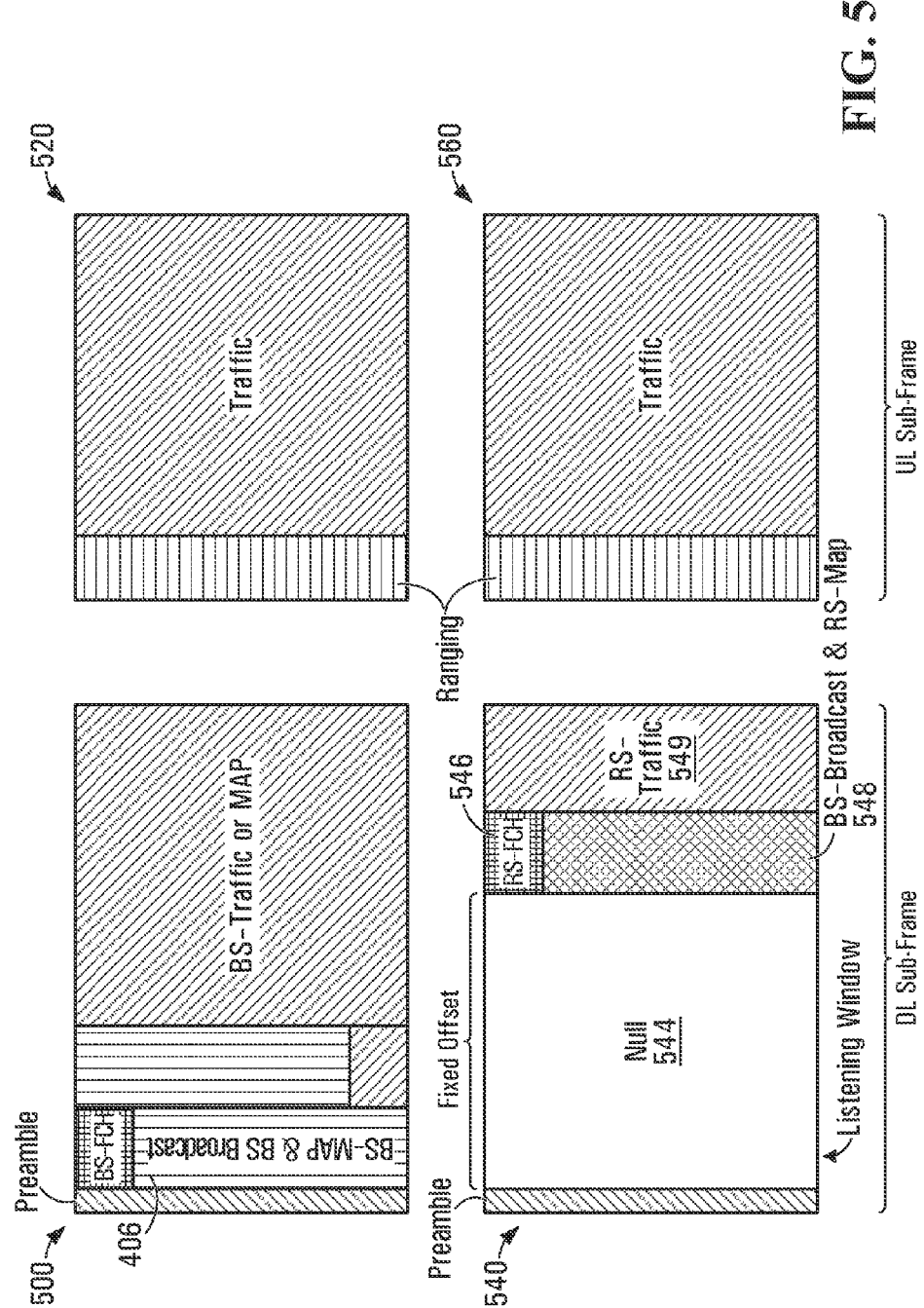
FIG. 5 is a set of schematic diagrams of a TDD Frame Structure for a BS and an RS where a BS-FCH may not reach one or more MS, in accordance with an embodiment of the invention.

FIG. 5 includes further examples of TDD frame structures for use in a base station and relay station. FIG. 5 includes an example DL sub-frame 500 and UL sub-frame 520 for transmission between the BS and RS, as well as between the BS and any MS the BS may communicate with directly. FIG. 5 also includes an example DL sub-frame 540 and UL sub-frame 560 for transmission between the RS and MSs and between the RS and other RSs with which the RS may communicate. For the examples of FIG. 5, every MS does not necessarily need to be able to receive something (the BS-FCH in the FIG. 4 example) from the BS.

The BS DL and UL sub-frames 500,520 and the RS UL sub-frame 560 of FIG. 5 have a similar structure to BS DL and UL sub-frames 400,420 and the RS UL sub-frame 460 described above with regard to FIG. 4.

RS DL sub-frame 540 includes a preamble 542. RS DL sub-frame 540 also includes a null period 544 having a predetermined fixed offset from the end of the preamble 542. The use of the fixed offset allows the MS to know the location of the RS-FCH without receiving anything from the BS. The null period 544 allows a duration during the DL sub-frame 540 for receipt of the BS-FCH, BS-MAP and BS-Broadcast from the BS DL sub-frame 500. The RS then transmits an RS specific FCH (RS-FCH) 546, RS specific MAP (RS-MAP) and broadcast format information [BS-Broadcast] 548. The RS then sends traffic 449 to the MSs or other RSs.

An MS receiving the DL sub-frame 540 from a given RS may determine the location of the RS-FCH 546 based on the predetermined fixed offset and then decode the RS-FCH 546 and the RS-MAP and BS-Broadcast 548 from the given RS.

For FIGS. 4 and 5 above it is assumed that there is only a single radio in the RS, which is why the RS DL sub-frame has the null period 449,549. The RS can not receive and transmit at the same time, therefore while the RS is receiving the BS-FCH, BS-MAP and BS-Broadcast information from the BS it cannot transmit to other RS or MS. However, in other implementations, the RS may include more than a single radio and as a result the RS could receive and transmit at the same time. In some implementations, for a multiple radio RS, the frame structure described above could still be used, however other more efficient frame structures are also contemplated.

The embodiments described above, and the specific examples thereof shown in FIGS. 4 and 5 assume a TDD separation between DL and UL transmissions. Further embodiments are provided that parallel the embodiments described with the exception that the separation between DL and UL transmission uses FDD (frequency division duplexing). All of the examples described above also can be modified to this context; the only difference is that rather than having UL sub-frames and DL sub-frames that are transmitted during separate time intervals, UL frames and DL frames are simultaneously transmitted, but on different frequencies.

Given that additional channel resources may be needed to maintain a link between BS and RS, overall performance improvement of the system may be impacted. Thus, schemes for enhancing spectrum efficiency according to some embodiments of the invention are described below.

A first approach that can be exploited to possibly mitigate the effect of additional overhead introduced by communication between BS and RS is closed-loop MIMO (multiple input multiple output). MIMO communication involves transmissions between pairs of stations that each have multiple antennas or collaborative transmissions from multiple single antenna stations to a multiple antenna station. The latter is known as collaborative MIMO. Closed-loop MIMO includes the use of feedback between the stations. Examples of implementation techniques for closed-loop MIMO can be found in PCT International Patent Application No. PCT/CA2005/000506, assigned to the assignee of the present application and incorporated herein by reference in its entirety. The use of closed-loop MIMO on the link between the BS and the RS may improve channel performance between the BS and RS. Closed-loop MIMO may enable a reduction in DL and/or UL transmit power for the link between the BS and RS.

When using closed-loop MIMO, a fixed relay station has multiple transmit antennas and multiple receive antennas although the transmit antennas and receive antennas are not necessarily distinct. In some implementations, a link between two fixed location stations, for example a fixed location BS and a location fixed RS, aids in making closed-loop MIMO and signal processing techniques used over the link reliable.

A second approach that can be exploited to possibly mitigate the overhead introduced by the communications between BS and RS is a spectrum sharing scheme that may enhance the spectrum efficiency of the system. The spectrum sharing scheme may include one or more of a) concurrent transmissions from two or more RSs to a BS, b) concurrent transmissions from two or more MS to an RS and RS to BS, and c) interference cancellation to improve detection performance.

For concurrent transmissions, the transmission resources being used are at least partially the same for respective transmission sources. For example, two RS that are each one hop away from the BS and use the same band of sub-carriers to communicate with the BS are performing spectrum sharing.

Interference cancellation may be done at either of the BS and the RS in order to deal with the effects of multiple signals being transmitted using the same spectrum. The spectrum sharing scheme may also utilize power control techniques between the BS and RS, depending on the quality of the link.

Figure 6:
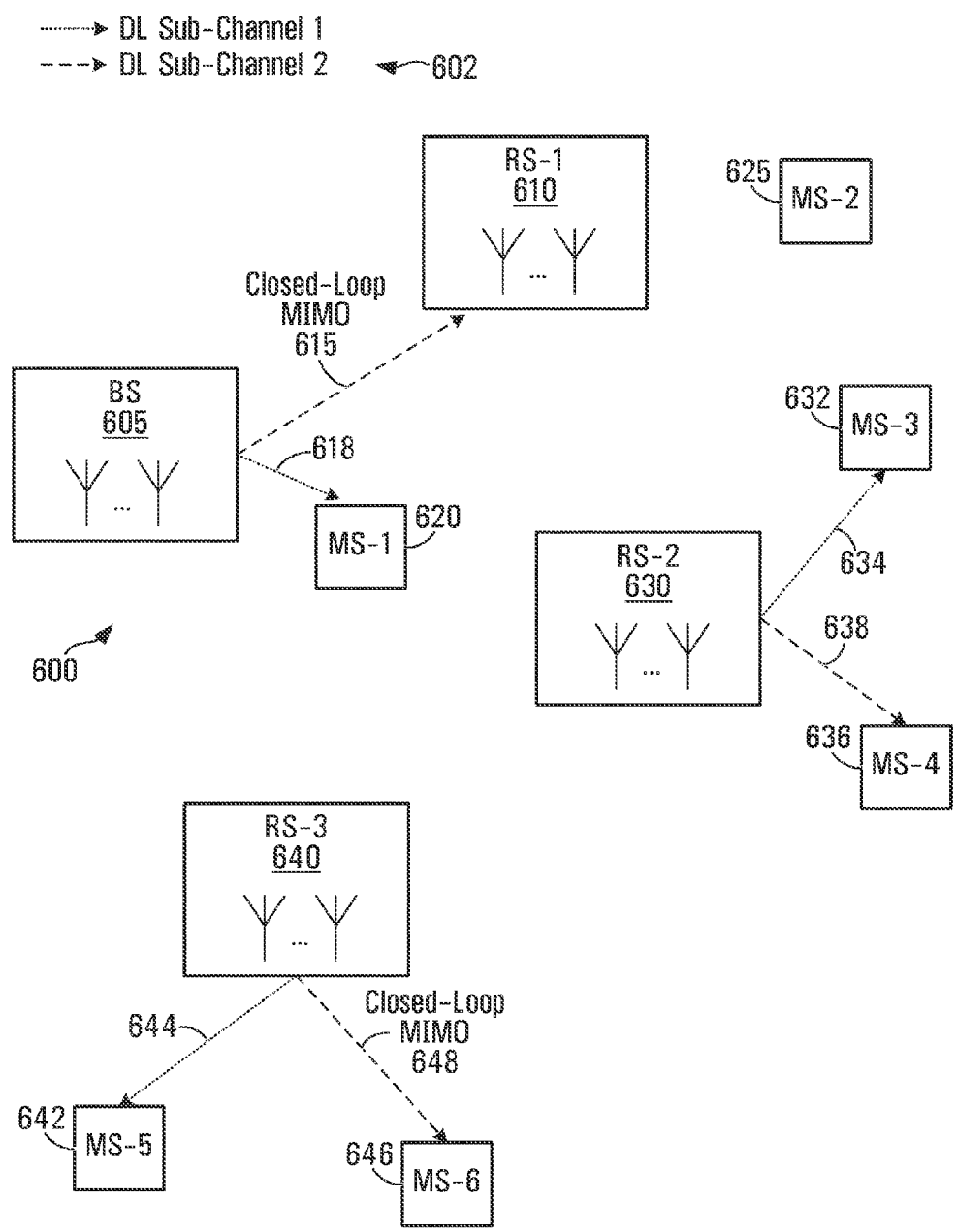
FIG. 6 is a schematic diagram of concurrent transmissions occurring in a down link (DL) direction including BS to RS and RS to MS.

Referring now to FIG. 6, an example of how closed-loop MIMO can be used between a multiple antenna BS and a multiple antenna RS and between a multiple antenna RS and a multiple antenna MS for DL transmission will now be described. FIG. 6 illustrates a multiple hop network 600 including a BS 605 having multiple antennas, three multiple antenna relay stations RS-1 610, RS-2 630, RS-3 640 and multiple mobile stations MS-1 620, MS-2 625, MS-3 632, MS-4 636, MS-5 642, MS-6 646. DL transmissions are occurring simultaneously over different hops of the multiple hop network 600. The BS 605 is shown to be in communication with RS-1 610 via a closed-loop MIMO link 615. The BS 605 is also shown in communication with MS-1 620 via link 618. BS 605 has a sufficient number of antennas to allow it to perform MIMO processing of signals from RS-1 610 and MS-1 620, as well as any other RS or MS it may be in communication with. MS-1 620 has only a single antenna so link 618 is not a closed-loop MIMO link. The links between BS 605 and RS-1 610 and BS 605 and MS-1 620 are formed over different sub-channels. The links between BS 605 and RS-1 610 and between BS 605 and MS-1 620 are indicated to be different DL sub-channels according to legend 602

RS-2 630 and RS-3 640 are each respectively shown in communication with MSs over different respective DL sub-channels simultaneously with the communication occurring between BS 605 and RS-1 610 and BS 605 and MS-1 620. RS-2 630 is communicating with MS-3 632 and MS-4 636 over links 634 and 638, respectively. RS-3 640 is communicating with MS-5 642 and MS-6 646 over links 644 and 648, respectively. MS-6 has two antennas (not shown) enabling closed-loop MIMO to be used over link 648. RS-3 640 has a sufficient number of antennas to allow it to perform MIMO processing of signals from MS-5 642 and MS-6 646. The links between RS-2 630 and MS-3 632 and MS-4 636 and between RS-3 640 and MS-5 642 and MS-6 646 are indicated to be different DL sub-channels according to legend 602.

In the illustrated example at another time, a closed-loop MIMO link may exist (not shown) for DL communication between RSs that are one hop apart, for example RS-1 610 and RS-2 630.

Different permutations may be applied for links between BS and RS and RS and MS. A permutation is a particular mapping of sub-carriers into a logical sub-channel.

Figure 7:
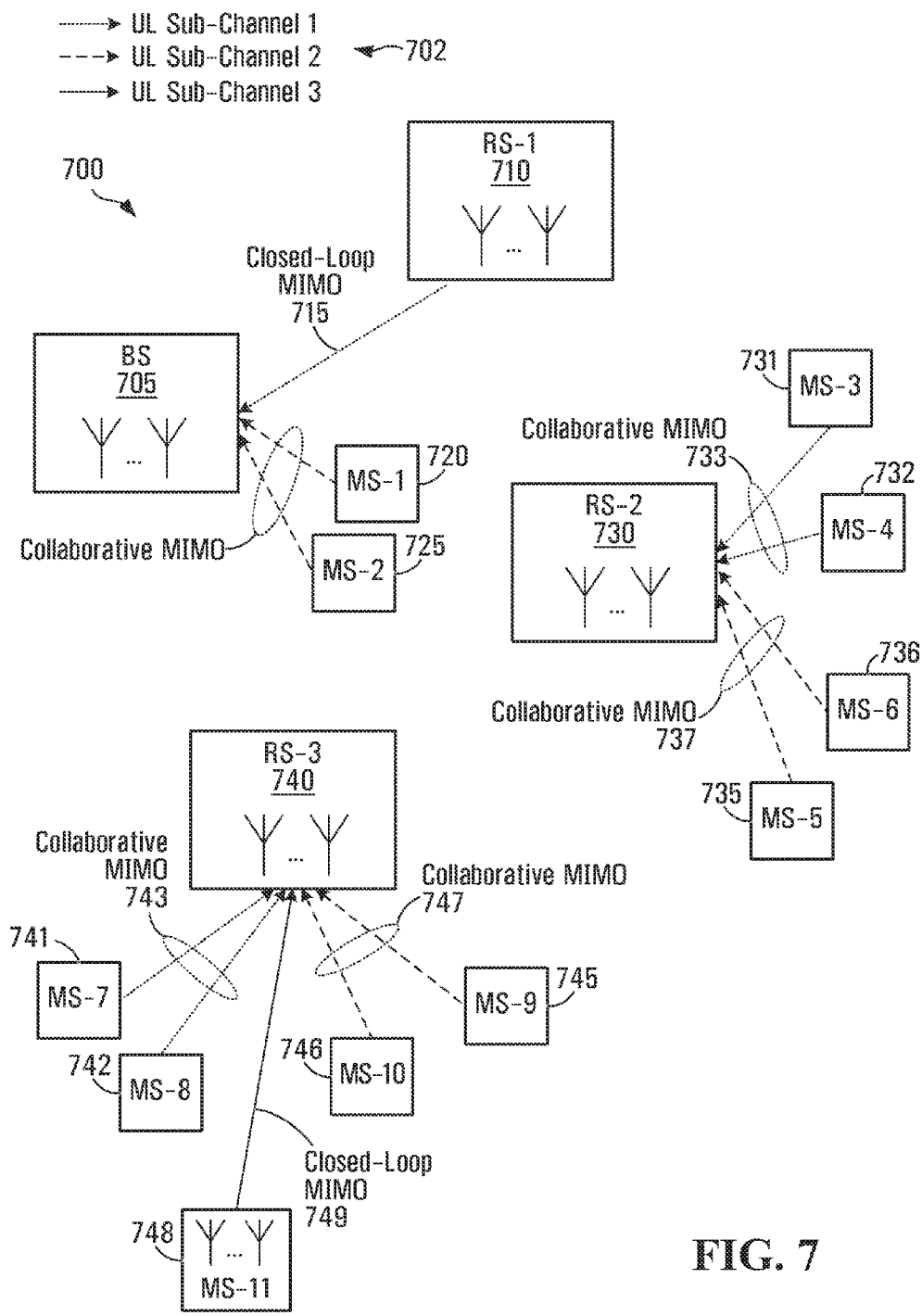
FIG. 7 is a schematic diagram of concurrent transmissions occurring in an up link (UL) direction including MS to RS and RS to BS.

Referring now to FIG. 7, an example of how closed-loop MIMO can be used between a multiple antenna RS and a multiple antenna BS and between a multiple antenna RS and a multiple antenna MS for UL transmission will now be described. Furthermore, FIG. 7 also illustrates how collaborative MIMO can be used between two or more single antenna MS and a multiple antenna RS and between two or more single antenna MS and a multiple antenna BS, for UL transmissions. FIG. 7 illustrates a multiple hop network 700 including a BS 705 having multiple antennas, three multiple antenna relay stations RS-1 710, RS-2 730, RS-3 740 and multiple mobile stations MS-1 720, MS-2 725, MS-3 731, MS-4 732, MS-5 735, MS-6 736, MS-7 741, MS-8 742 MS-9 745, MS-10 746, MS-11 749. UL transmissions are occurring simultaneously over different hops of the multiple hop network 700. BS 705 is shown to be in communication with RS-1 710 via a closed-loop MIMO link 715. BS 705 is also shown in communication with MS-1 720 and MS-2 725 using collaborative MIMO. The links between BS 705 and RS-1 710 and BS 605 and both MS-1 720 and MS-2 725 are formed over different sub-channels as indicated by legend 702.

In the illustrated example at another time, a closed-loop MIMO link may exist (not shown) for UL communication between RSs that are one hop apart, for example RS-1 610 and RS-2 630.

RS-2 730 and RS-3 740 are each respectively shown in communication with pairs of MS using collaborative MIMO over different respective UL sub-channels. RS-2 730 is communicating with MS-3 731 and MS-4 732 over collaborative MIMO link 733 and with MS-5 735 and MS-6 736 over collaborative MIMO link 737. RS-3 740 is communicating with MS-7 741 and MS-8 742 over collaborative MIMO link 743 and with MS-9 745 and MS-10 746 over collaborative MIMO link 747. RS-3 740 is communicating with MS-11 748 via a closed-loop MIMO link 749. RS-3 740 has a sufficient number of antennas to allow it to perform MIMO processing of signals to all MS with which it is communicating. The links between RS-2 730 and MS-3 731 and MS-4 732 and between RS-2 730 and MS-5 735 and MS-6 736, the links between RS-3 740 and MS-7 741 and MS-8 742 and between RS-3 740 and MS-9 745 and MS-10 746 and the link between RS-3 740 and MS-11 748 are indicated to be different DL sub-channels according to legend 702.

Different permutations may be applied for links between BS and RS and RS and MS.

Figure 8:
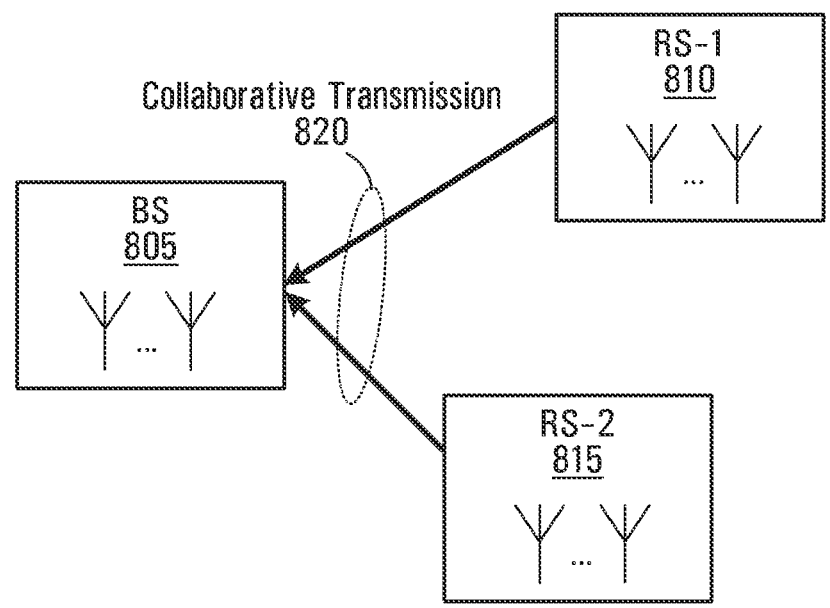
FIG. 8 is a schematic diagram of a collaborative transmission occurring for two RS communicating with a single BS.

In some embodiments, for concurrent transmissions of two multiple antenna RSs to the multiple antenna BS, collaborative MIMO is implemented if channel conditions permit. FIG. 8 illustrates collaborative transmission in a UL direction over collective links 820 for two RS, RS-1 810 and RS-2 815 with BS 805. Furthermore, in some embodiments, the BS may perform interference cancellation to mitigate interference from sources other than the two RSs. In some embodiments, the BS has a larger number of antennas than the RSs. In some embodiments, one or more RS being served by the BS have an equal number of antennas to that of the BS.

Figure 9:
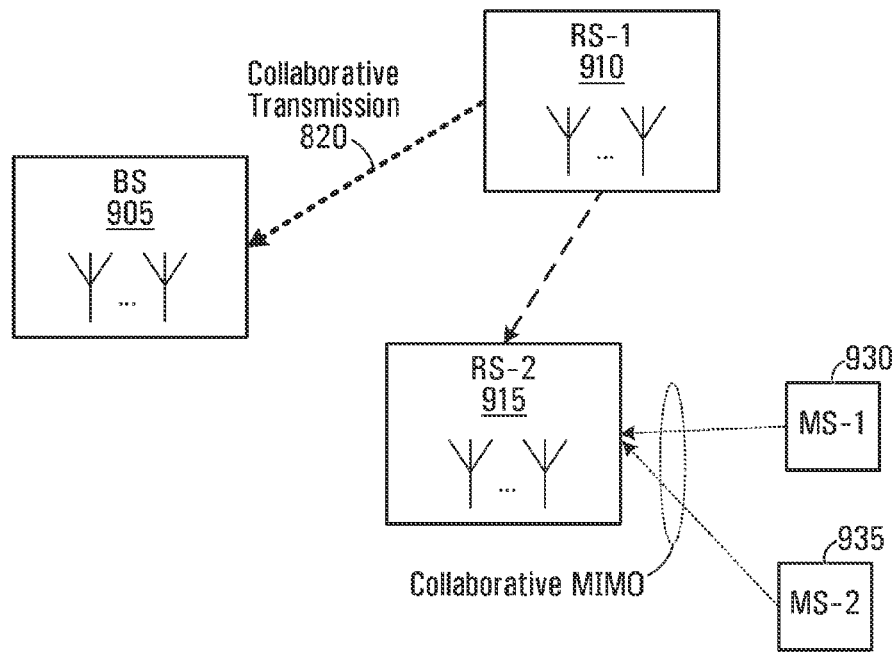
FIG. 9 is a schematic diagram of a network for the purpose of showing when an interference cancellation scheme may be used according to some embodiments of the invention.

Referring now to FIG. 9, an example of how an interference cancellation scheme is used will be described. FIG. 9 illustrates a first multiple antenna RS RS-1 910 in UL communication with multiple antenna BS 905. A second multiple antenna RS RS-2 915 is attempting to receive UL transmissions, which are being sent using collaborative MIMO by MS-1 930 and MS-2 935. The UL transmission from RS-1 910 may interfere with the collaborative MIMO transmissions of MS-1 930 and MS-2 935 to RS-2 915. Therefore, RS-2 915 may perform interference cancellation to mitigate, reduce and/or cancel interference from other RS, namely RS-1 in this example.

In some embodiments, channel information such as pilot symbols from interfering stations is used to enable interference cancellation for a given station. Examples of pilot symbol arrangements that can be used to support interference cancellation are described below in FIGS. 10-15. The pilot symbol arrangements can be used for UL transmissions from an RS to BS and UL transmissions from an RS to another RS.

To maintain backward compatibility with existing standards in the area of wireless networks, for example 802.16e, the BS and MS may use the conventional pilot designs for their transmissions. The pilot symbols in the pilot arrangements used by RSs may be orthogonal to the BS and MS pilots.

In some embodiments, different RSs in the same cell use different pilot patterns, if multiple pilot patterns exist. The pilot patterns may be orthogonal to each other. In some embodiments, a design of an RS pilot arrangement supports collaborative MIMO for multiple RS. In some embodiments, for fixed RS, sub-band based sub-channelization is used in generating patterns that include pilot symbols.

In some embodiments of the invention, pilot overhead for fixed RS may be reduced as compared to pilot pattern designs used in the 802.16e standard.

In a particular implementation, a sub-carrier to sub-channel permutation may include six contiguous groups of time-frequency resources to form a sub-channel. A group of time-frequency resources is commonly known as a tile and includes a band of sub-carriers being used for signal transmission over a given number of OFDM symbols. The sub-carriers in the band may be a group of contiguous frequencies or a logical grouping of non-contiguous frequencies. For example, a tile used in describing pilot patterns in FIGS. 10 through 12 is a band of four sub-carriers over three OFDM symbol durations.

Figure 10A:
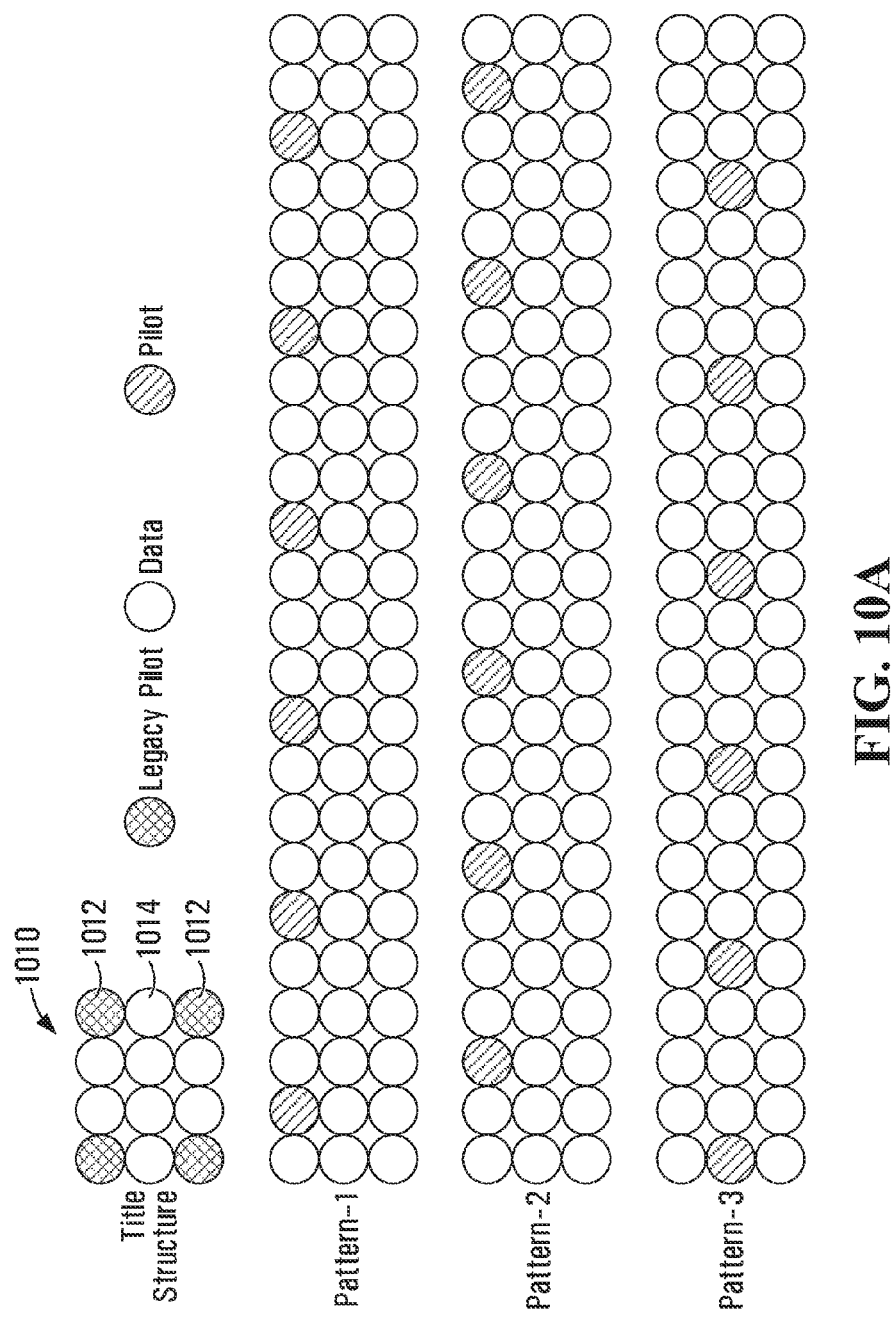
FIGS. 10a and 10b are a set of schematic diagrams of RS pilot designs for a particular type of sub-carrier to sub-channel allocation (partial use sub-channelization (PUSC)) for UL transmission using a single transmission antenna RS in accordance with an embodiment of the invention.
Figure 10B:
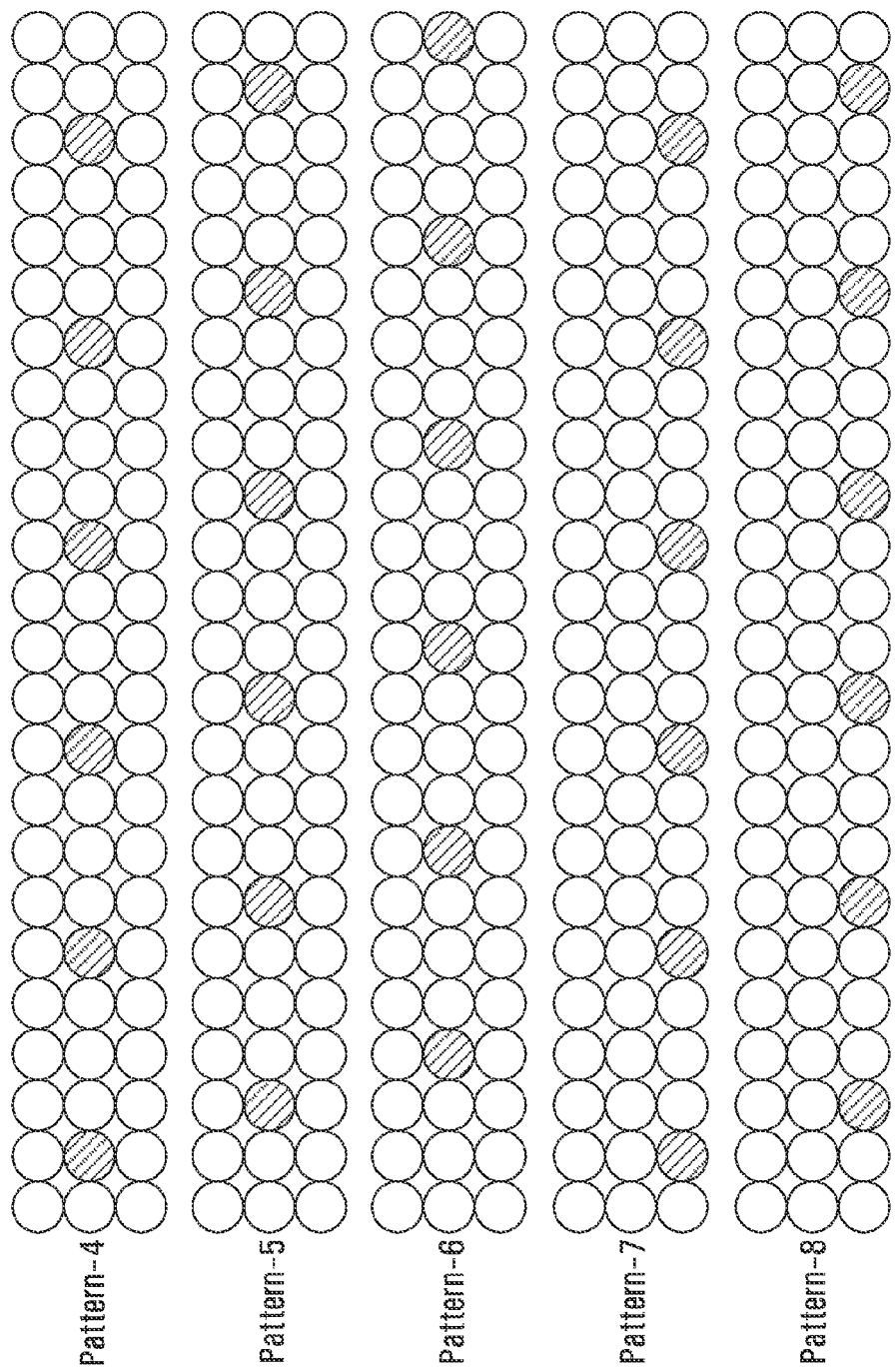

FIGS. 10A and 10B show RS pilot patterns that might, for example, be used with systems employing a sub-carrier to sub-channelization allocation known as UL PUSC (partial use sub-carrier channelization) with a single transmission antenna RS. In a PUSC allocation, full channel diversity is achieved by distributing allocated sub-carriers to sub-channels, whereby the allocated sub-carriers are a subset of the entire available bandwidth. FIG. 10A shows a particular tile structure 1010 of an OFDM transmission resource having a two dimensional appearance. Each horizontal row of the tile structure 1010 represents an OFDM symbol duration and each vertical column represents a different sub-carrier. In the particular tile structure, pilot symbols are shown occupying the four corners of the three OFDM symbol duration by four sub-carrier tile structure. This particular representation is a pilot pattern that may be used in systems complying with existing standards and which are sometimes referred to as "legacy systems", in which BS and MS communicate directly without an RS. The remaining eight symbol locations in the tile structure, collectively indicated at 1014 are identified as being used for data.

Pilot patterns 1 through 8 are groups of six tiles each having three OFDM symbol duration by four sub-carrier size that are concatenated together in the frequency direction. Looking at a same given tile in each of the eight patterns, a different single symbol location is identified as being used for an RS pilot symbol in each respective pattern. The locations used for the RS pilot symbol are the eight symbol locations not associated with legacy system pilots. In some embodiments, some or all of the eight different pilot pattern can be used for different RSs in the same cell. If two RS in the same cell are separated by a sufficient distance that interference is at or below an acceptable level, the same pattern can be used by both RS.

Figure 11:
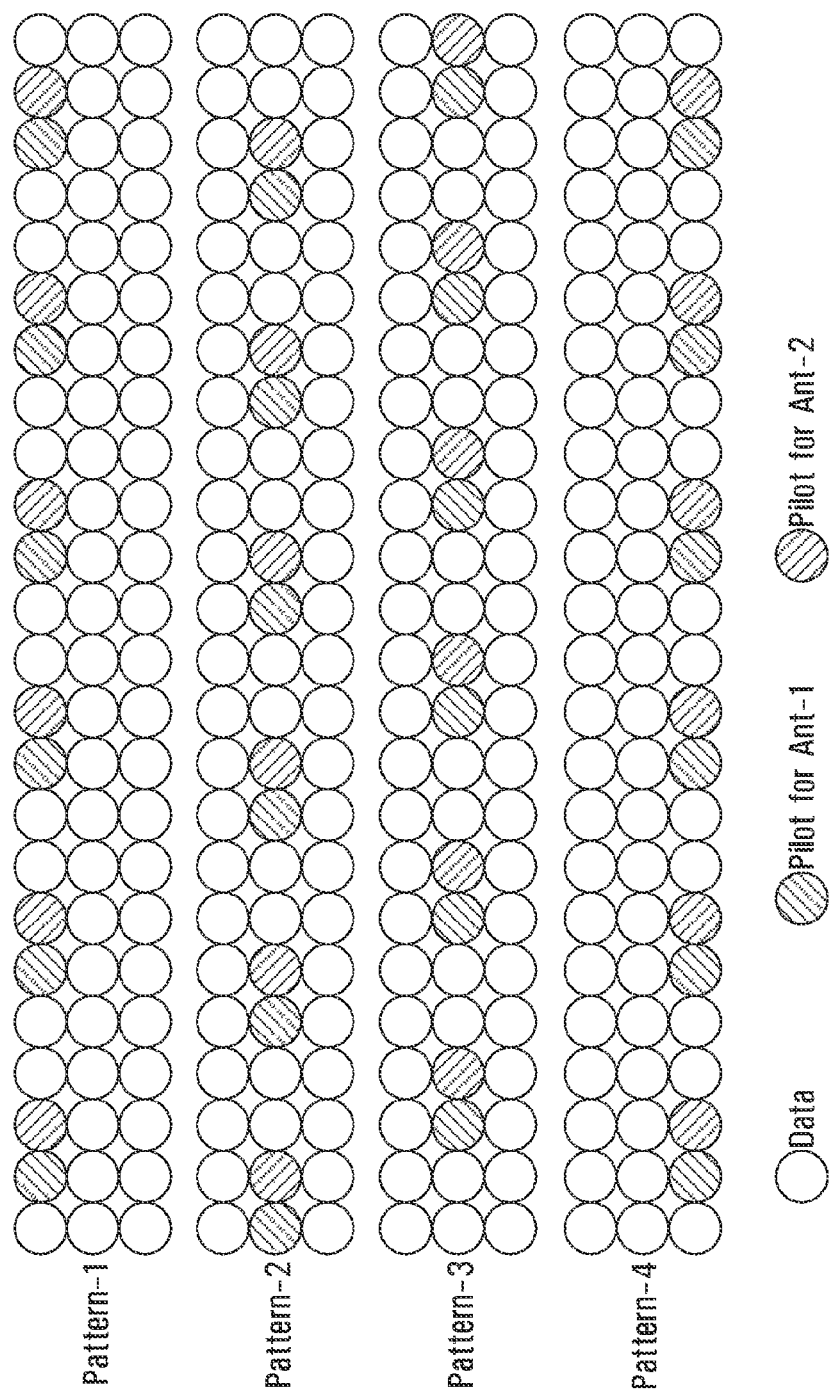
FIG. 11 is a set of schematic diagrams of RS pilot design for PUSC for UL transmission using a two transmission antenna RS in accordance with an embodiment of the invention.

FIG. 11 shows a set of four example RS pilot patterns for UL PUSC using a two transmission antenna RS. The tile structure is the same as the tile in FIG. 10A. The pilot patterns in FIG. 11 are also six tiles concatenated together in the frequency direction as in FIGS. 10A and 10B. In each respective pattern, locations are indicated where pilots for each of a first and a second antenna transmits its own pilot and a null symbol location in the location where the other antenna transmits its pilot. The four patterns shown are not considered to be an exhaustive or complete list of possible pilot symbol arrangements.

Figure 12A:
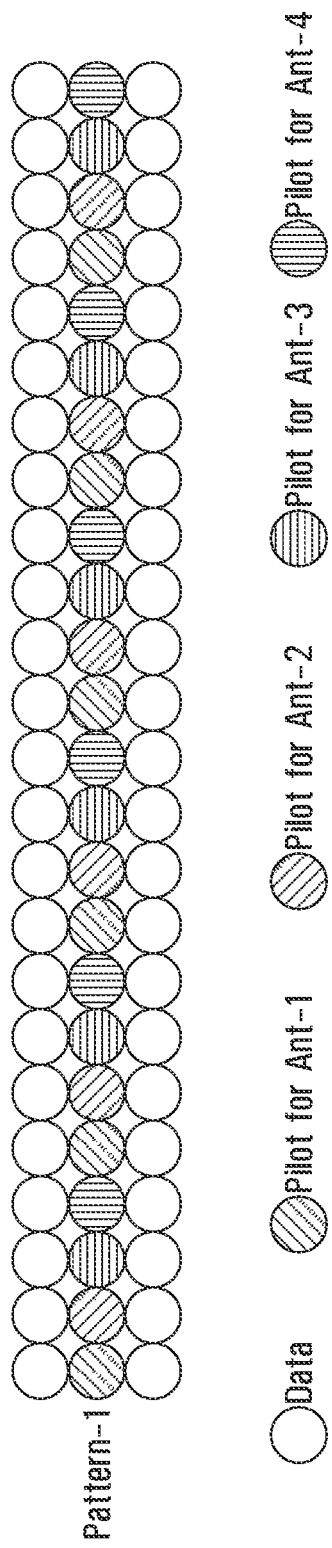
FIGS. 12a, 12b and 12c are schematic diagrams of RS pilot designs for PUSC for UL transmission using a four transmission antenna RS in accordance with an embodiment of the invention.
Figure 12B:
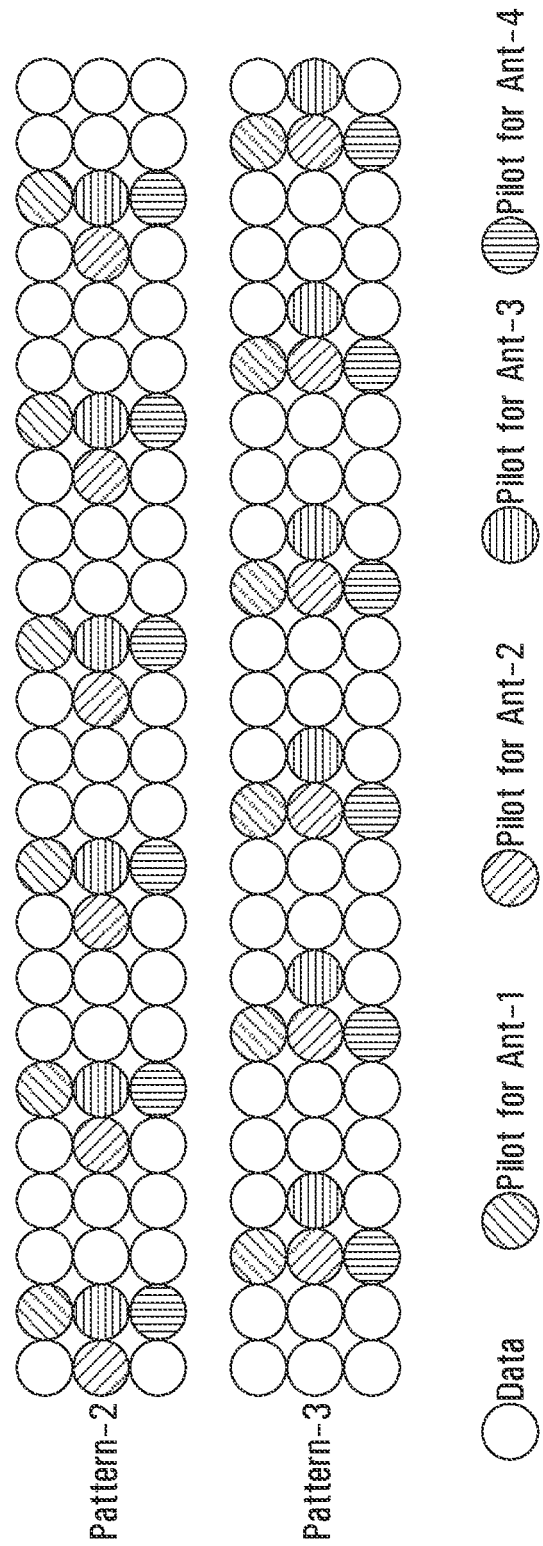
Figure 12C:
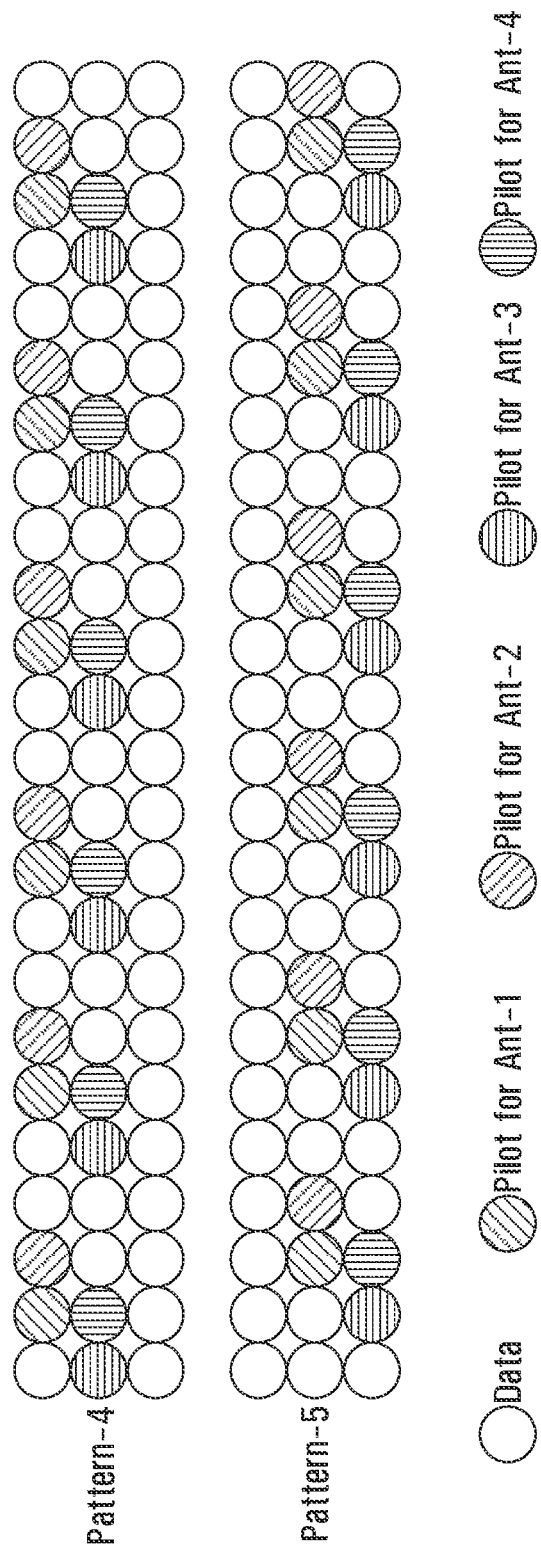

FIGS. 12A, 12B and 12C show a set of five example RS pilot patterns for UL PUSC using a four transmission antenna RS. The tile structure is the same as the tile in FIG. 10A. The pilot patterns in FIGS. 12A, 12B and 12C are also six tiles concatenated together in the frequency direction as in FIGS. 10A and 10B. Each antenna transmits its own pilot and a null symbol locations in the locations where the other antennas transmit their respective pilots. The five patterns shown are not considered to be an exhaustive or complete list of possible pilot symbol arrangements.

The pilot patterns in FIGS. 10, 11 and 12 are described above as being a group of six concatenated tiles of a particular size. More generally, the number of sub-carriers and OFDM symbol durations in a pilot pattern is implementation specific. Furthermore, the locations of the legacy pilots and RS pilots are examples of where such pilots may be located and other arrangements are contemplated. For example, a general implementation provides a tile design in which there is at least one pilot location for each antenna of a relay station that does not interfere with pilot locations of the other antennas of the same relay station, pilot locations of the BS, and pilot locations of other relay stations.

Figure 13A:
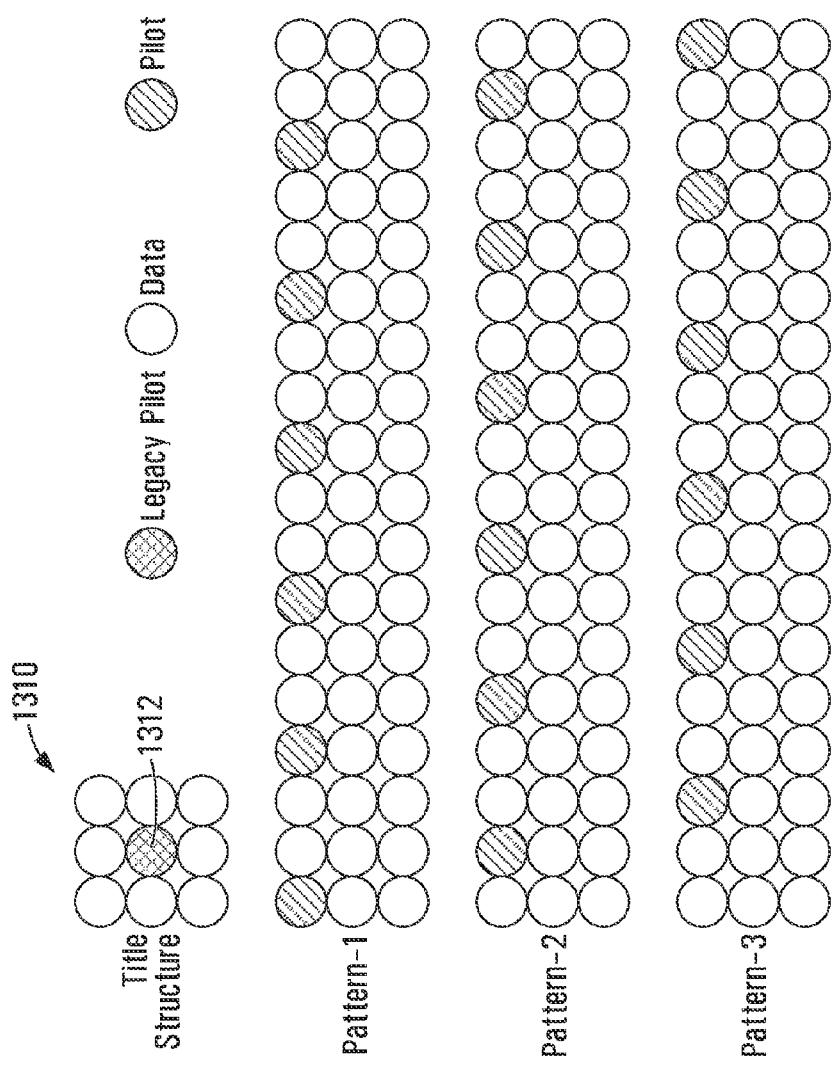
FIGS. 13a and 13b are a set of schematic diagrams of RS pilot designs for another type of sub-carrier to sub-channel allocation (optional PUSC (OPUSC)) for UL transmission using a single transmission antenna RS in accordance with an embodiment of the invention.
Figure 13B:
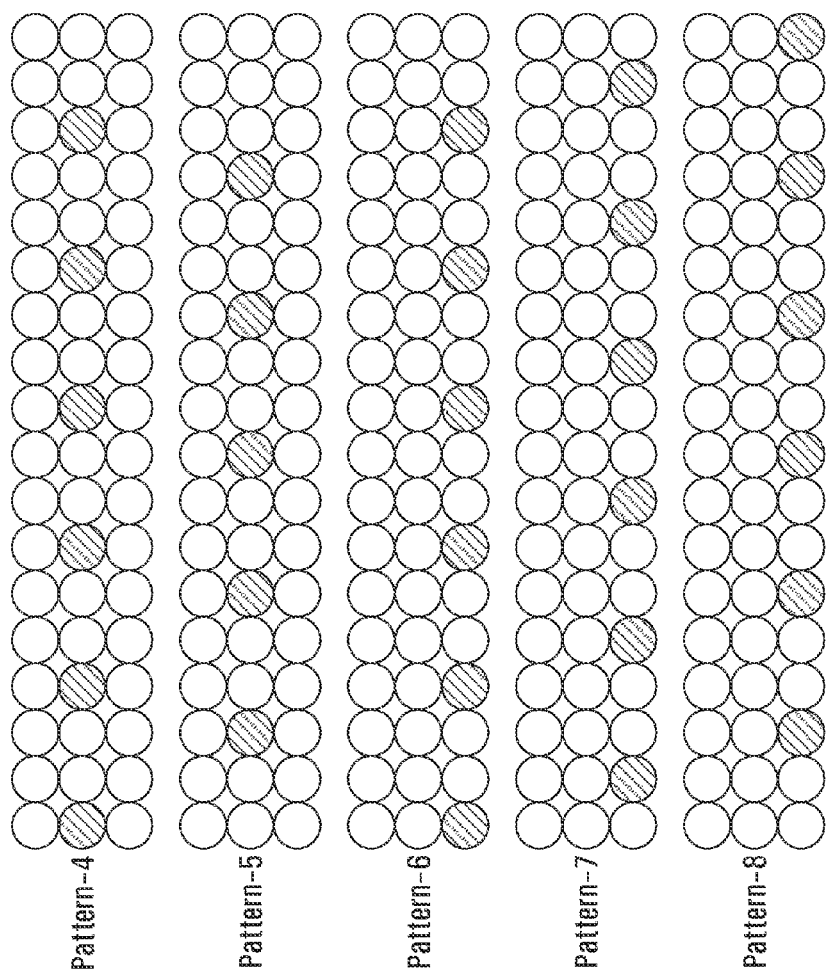

FIGS. 13A and 13B show RS pilot designs that might, for example, be applied in systems employing another example sub-carrier to sub-channelization allocation scheme known as UL optional PUSC (OPUSC) in a single transmission antenna RS. In the example of UL OPUSC illustrated in FIG. 13A, a tile structure 1310 is three OFDM symbol durations by three sub-carriers in which a legacy pilot symbol 1312 is shown occupying the center location of the tile structure. Pilot patterns 1-8 are groups of six three OFDM symbol duration by three sub-carrier tiles that are concatenated together in the frequency direction. Looking at a same given tile in each of the eight patterns, a different single symbol location is identified as being used for an RS pilot symbol in each respective pattern. The locations used for the RS pilot symbol are the eight symbol locations not associated with the legacy systems. A different pilot pattern can be used for different RS in the same cell. If two RS in the same cell are separated by a sufficient distance that interference is at or below an acceptable level, a same pattern can be used by both RS.

Figure 14A:
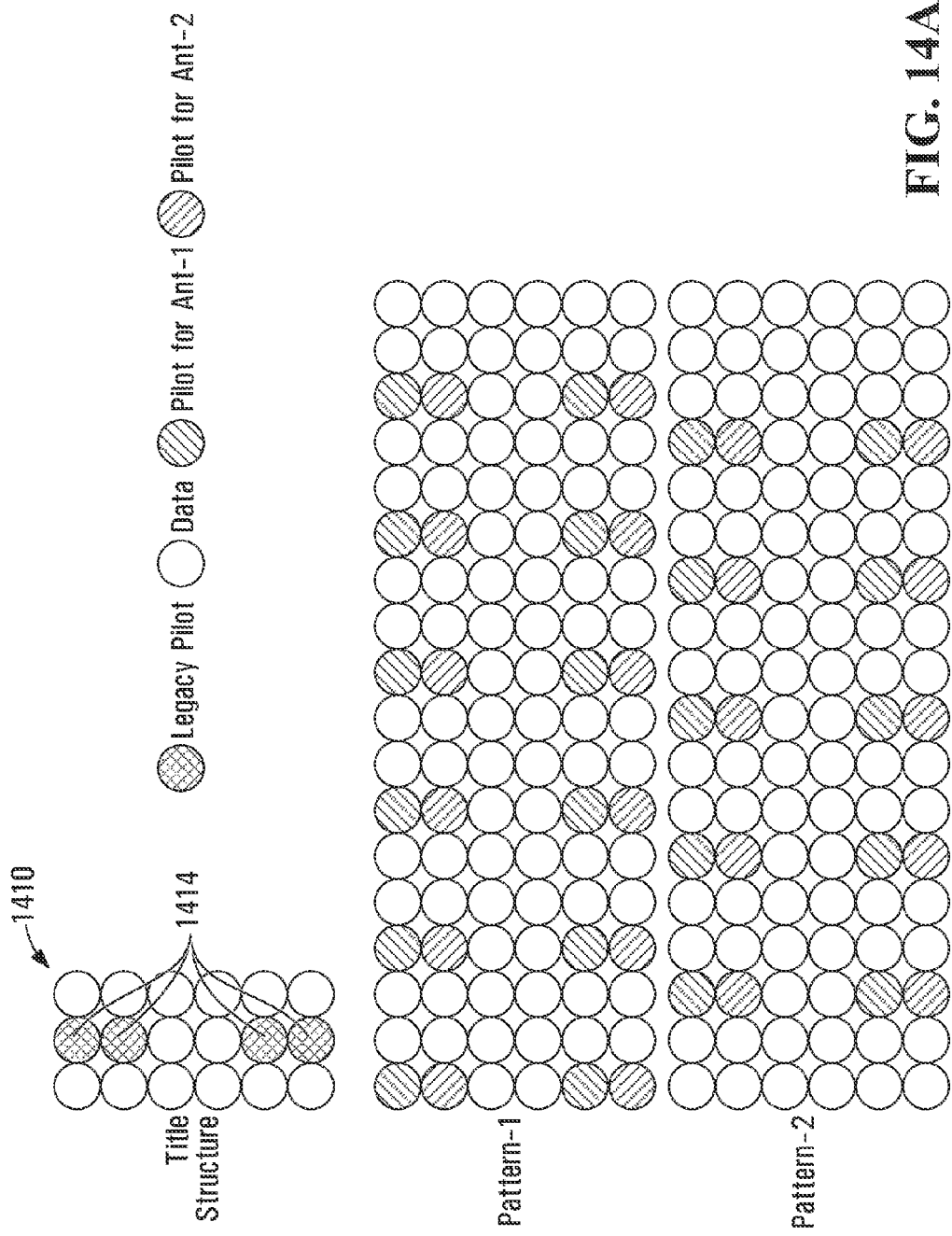
FIGS. 14a and 14b are a set of schematic diagrams of RS pilot designs for OPUSC for UL transmission using a two transmission antenna RN in accordance with an embodiment of the invention.
Figure 14B:
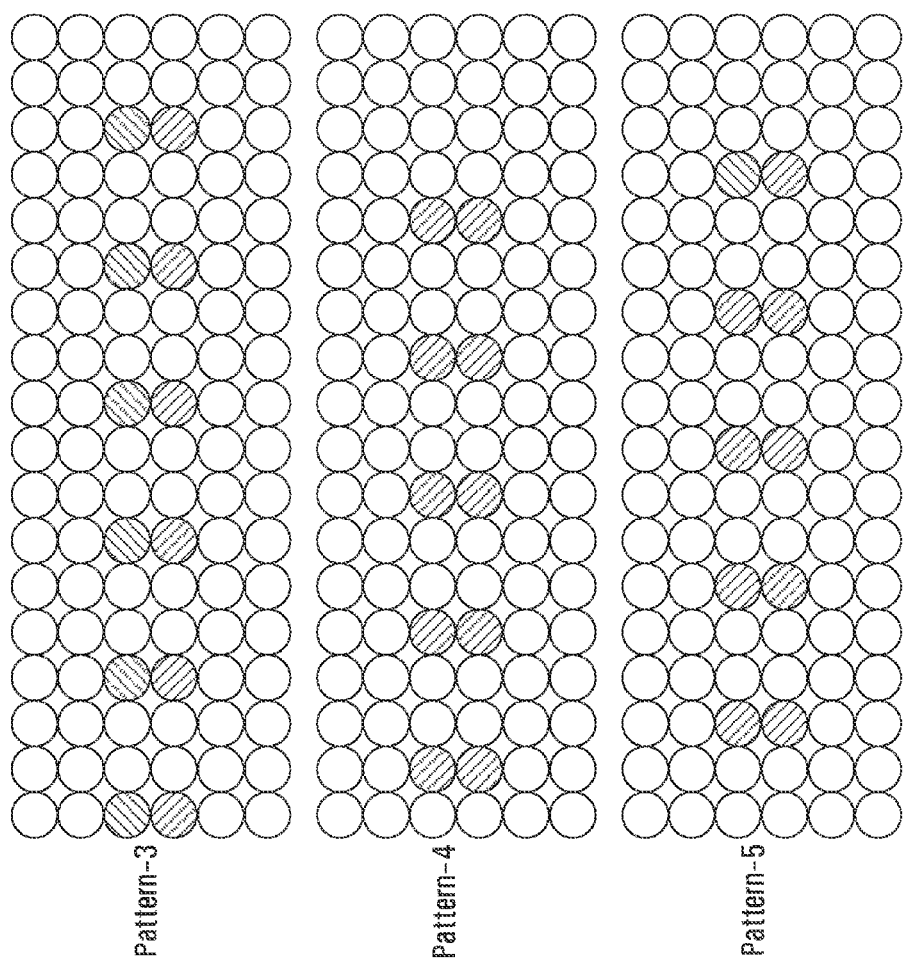

FIGS. 14A and 14B show a set of example RS pilot patterns for UL optional PUSC using a two transmission antenna RS. In the example of UL OPUSC illustrated in FIG. 14A, a tile structure 1410 is six OFDM symbol durations by three sub-carriers in which legacy pilot symbols 1412 are collectively indicated at 1414. Pilot patterns 1-5 are groups of six tiles that are concatenated together in the frequency direction. Looking at a same given tile in each of the five patterns, two pairs of symbol locations are identified as being used for RS pilot symbols in each respective pattern. Each of a first and second antenna transmits its own pair of pilots and a pair of null symbol locations in the locations where the other antenna transmits its respective pair of pilots. The five patterns shown are not considered to be an exhaustive or complete list of possible pilot symbol arrangements.

Figure 15:
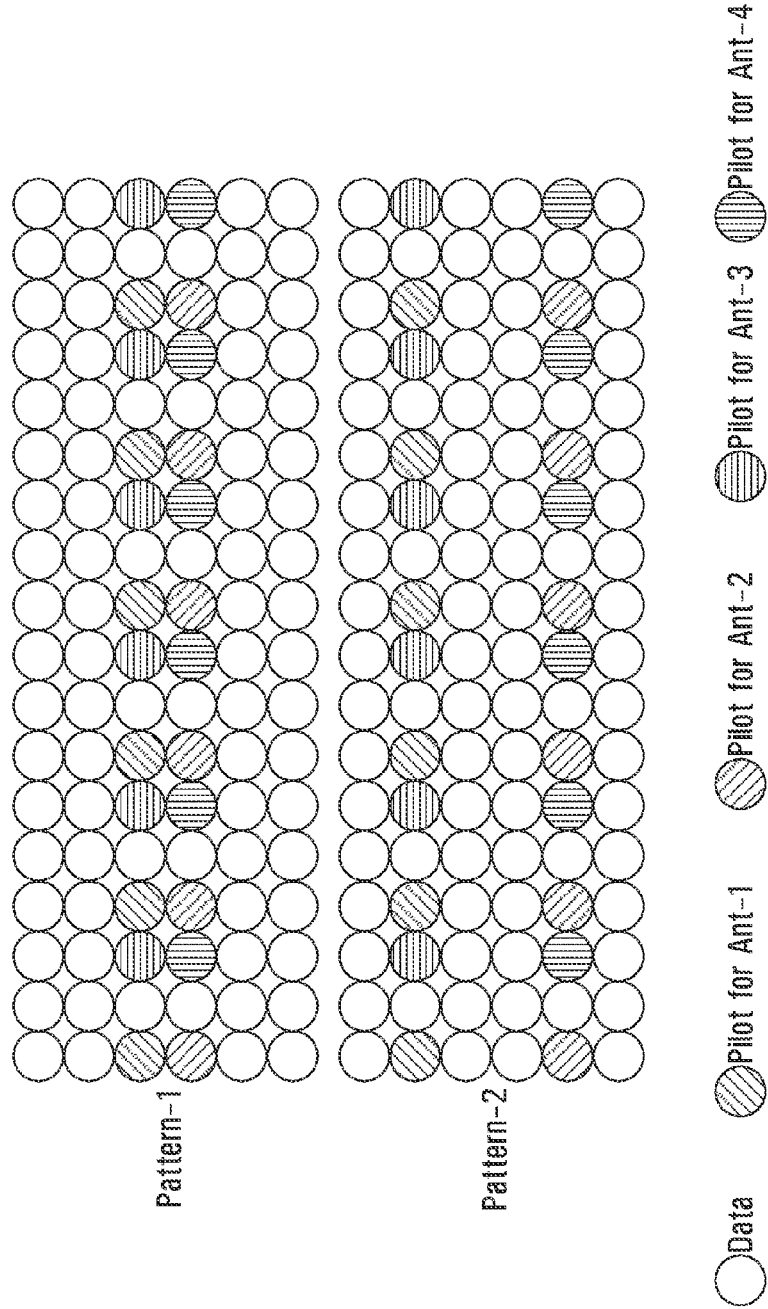
FIG. 15 is a set of schematic diagrams of RS pilot designs for OPUSC UL transmission UL transmission using a four transmission antenna RS in accordance with an embodiment of the invention.

FIG. 15 shows a pair of example RS pilot patterns for UL optional PUSC using a four transmission antenna RS. The tile structure is the same as that of FIG. 14A. Pilot patterns 1 and 2 are groups of six tiles that are concatenated together in the frequency direction. Looking at a same given tile in each of the two patterns, symbol locations are identified as being used for RS pilot symbols in each respective pattern. Each of first, second, third and fourth antennas transmits its own pilot and null symbol locations in the locations where the other antennas transmit their respective pilots. The pair of patterns shown are not considered to be an exhaustive or complete list of possible pilot symbol arrangements.

The pilot patterns in FIGS. 13, 14 and 15 are described above as being a group of six concatenated tiles of a particular size. More generally, the number of sub-carriers and OFDM symbol durations in a pilot pattern is implementation specific. Furthermore, the locations of the legacy pilots and RS pilots are examples of where such pilots may be located and other arrangements are contemplated.

For UL PUSC, in some embodiments, the pilot pattern arrangements are ¼ of the conventional pilot overhead for a single antenna RS; ½ of the conventional pilot overhead for two antenna RS; and the same as conventional pilot overhead for four antenna RS.

For UL optional PUSC, in some embodiments, the pilot pattern arrangements are ½ of the conventional pilot overhead for a single antenna RS; ½ or the same as conventional pilot overhead for two antenna RS; and the same as conventional pilot overhead for four antenna RS.

FIGS. 16-19 are examples of two sequential TDD frames in a potential series of frames in which a respective DL sub-frame and a respective UL sub-frame have been combined together to form each of the two TDD frames. The size of these sub-frames can be statically or dynamically defined.

MS/RS Zones

Downlink zones in the DL sub-frames are classified into three types:

1) DL_Common zone: a set of one or more OFDM symbols specifically targeted for reception by both MS and RS (for example while the RS is at network entry);

2) DL_RS zone: a set of one or more OFDM symbols specifically targeted for reception by one or multiple RS;

3) DL_MS zone: a set of one or more OFDM symbols specifically targeted for reception by one or multiple MS.

The DL common zone may include a preamble and FCH, similar to that described above in FIGS. 4 and 5. FIGS. 16-19 also include an 802.16e MAP in the DL common zone. The 802.16e MAP is implementation specific based on 802.16e and may not be included as such in all embodiments. More generally, the DL MAP is used to identify locations in the DL sub-frame where data is transmitted to particular RSs or MSs.

Uplink zones are classified into three types:

1) UL_Common zone: a set of one or more OFDM symbols for receiving from both MSs and RSs (for example while the RS is at network entry);

2) UL_RS zone: a set of one or more OFDM symbols for receiving from one or multiple RS;

3) UL_MS zone: a set of one or more OFDM symbols for receiving from one or multiple MS.

Some embodiments provide for the reuse of OFDM symbols in multiple zones. Some embodiments provide for reuse between different tiers, while others provide for reuse within a tier. An example of reuse between different tiers in a hierarchical network is a BS transmitting during OFDM symbol intervals, and an RS transmitting on the same OFDM symbol intervals assuming the transmissions will not interfere. Another example of reuse between different tiers in a hierarchical network is an RS transmitting during OFDM symbol intervals, and an RS in a different tier transmitting on the same OFDM symbol intervals assuming the transmissions will not interfere.

An example of reuse within a tier in a hierarchical network is an RS transmitting during OFDM symbol intervals, and another same tier RS transmitting on the same OFDM symbol intervals assuming the transmissions will not interfere.

Frame Structure with MS/RS Zones

First Embodiment

In a first embodiment, the allocation of resources is performed in a TDD manner between the UL and DL. Within a TDD frame, there is a DL sub-frame that is only used for downlink transmission (be it from BS to RS, or RS to RS or RS to MS), and a UL sub-frame that is only used for uplink transmission (be it from MS to RS, RS to RS or RS to BS).

It is assumed that full use sub-carrier utilization is employed meaning that a full set of available sub-carrier frequencies is used. More generally, other sub-carrier to sub-channel permutations are possible.

A single OFDM band is used for both RS links (between BS and RS as well as RS and RS) and MS links (between BS and MS as well as RS and MS). In this embodiment, the single OFDM band is on a single OFDM carrier.

In a specific example, within a DL sub-frame, each BS is allocated a DL_RS zone for transmitting to RSs and a DL_MS zone for transmitting to MSs. Each RS is allocated a DL_RS zone for transmitting to RSs if it needs to transmit to a next RS (there may not always be one) and a DL_MS zone for transmitting to MSs.

Similarly, in a specific example, within a UL sub-frame, each BS is allocated a UL_RS zone for receiving from RSs and a UL_MS zone for receiving from MSs. Each RS is allocated a UL_RS zone for receiving from RSs if it needs to receive from a next RS (there may not always be one) and a UL_MS zone for receiving from MSs.

For this embodiment, there is no reuse among different tier RS, that is RSs that are a different number of hops from the BS and the BS. This means that once OFDM symbols have been allocated as a DL_MS zone of a BS, that time is not available for use by the RSs; rather the RSs are idle during that time. In some implementations of this frame structure, reuse is allowed among the same tier RSs, that is RS that are a same number of hops from the BS.

Figure 16:
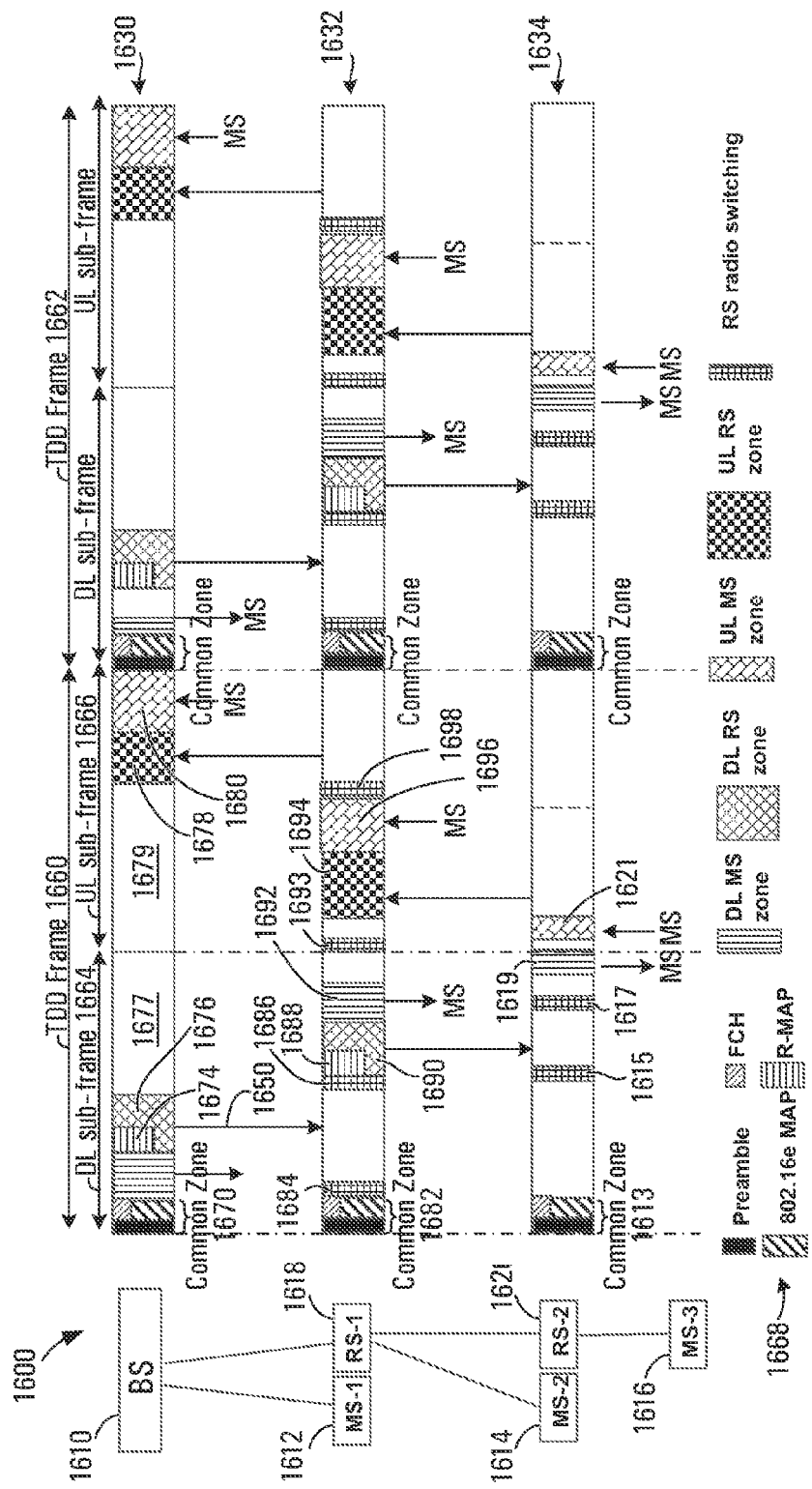
FIGS. 16 through 19 are diagrams of frame structures provided by embodiments of the invention.

A specific example of frame structures defined in this manner is shown in FIG. 16. FIG. 16 also includes an example of a network 1600 including relay stations RS-1 1618 and RS-2 1620, base station BS 1610 and mobile stations MS-1 1612, MS-2 1614 and MS-3 1616, similar to FIG. 1 to clearly illustrate the correspondence of the frame structure to the base station BS and relay stations RS-1 and RS-2. The frame structure from the perspective of BS 1610 is generally indicated at 1630. The frame structure from the perspective of RS-1 1618 is generally indicated at 1632. The frame structure from the perspective of the RS-2 1620 is generally indicated at 1634. In the example of FIG. 16, each arrow between BS and MS/RS and between RS and RS/MS, for example arrow 1650 between BS 1610 and RS-1 1618, represents a transmission/reception using a full OFDM band. Only the DL_RS zones, DL_MS zones, UL_MS zones and UL_RS zones as defined above are specifically shown in the illustrated example in the interest of simplifying the figure. However, it is to be understood that each arrow 1650 has an associated resource allocated for transmission (by a BS, RS or MS) with the same resource allocated for reception (by a BS, RS or MS). In the frame structure 1630 for the BS 1610, for both DL and UL, portions of the frame structure that are not filled represent idle time for the BS 1610. In the frame structure 1632 for RS-1 1618, DL portions of the frame structure that are not filled, and are not opposite portions of the frame structure 1630 for the BS 1610 allocated for transmission to RS-1 1618, represent idle time for RS-1 1618. Furthermore, UL portions of the frame structure 1632 that are not filled represent idle time for RS-1 1618. In the frame structure 1634 for RS-2 1620, DL portions of the frame structure that are not filled, and are not opposite portions of the frame structure 1632 for RS-1 1618 allocated for transmission to RS-2 1620, represent idle time for RS-2 1620. Furthermore, UL portions of the frame structure 1634 that are not filled in and are not opposite portions of the frame structure 1632 allocated for reception from RS-2 1620 represent idle time for the RS-2 1620.

In the illustrated example, two TDD frames 1660,1662 are shown. Only TDD frame 1660 will be described in detail. TDD frame 1660 is composed of a DL sub-frame 1664 during which all downlink transmissions occur and a UL sub-frame 1666 during which all uplink transmissions occur. A legend indicating differing shadings for the differing zone types is generally indicated at 1668.

During the DL sub-frame 1664, the frame structure 1630 for the BS 1610 includes a common zone 1670 for transmissions that can be received by MSs and RSs. The frame structure 1630 includes a DL_MS zone 1672 for transmission directly to mobile stations such as MS-1 1612. There is a DL-RS zone 1676 that includes an R-MAP 1674 for transmission to relay stations such as RS-1 1618.

During the DL sub-frame 1664, the frame structure 1632 for the RS-1 1618 includes a common zone 1682 for transmissions that can be received by MSs and RSs. The frame structure 1632 includes a DL_MS zone 1692 for transmission directly to mobile stations such as MS-2 1614. There is a DL-RS zone 1690 that includes an R-MAP 1688 for transmission to relay stations such as RS-2 1620. There is also an RS radio switching period 1684. During this time, the RS switches its radio from transmitting to receiving. There is a second RS switching period 1686 during which the RS switches its radio from receiving to transmitting.

During the DL sub-frame 1664, the frame structure 1634 for the RS-2 1620 includes a common zone 1613 for transmissions that can be received by MSs and RSs. The frame structure 1634 includes a DL_MS zone 1619 for transmission directly to mobile stations such as MS-3 1616. There is also an RS radio switching period 1615. During this time, the RS switches its radio from transmitting to receiving. There is a second RS switching period 1617 during which the RS switches its radio from receiving to transmitting.

During the UL sub-frame 1666, the frame structure 1630 for the BS 1610 includes a UL RS zone 1678 for receiving from relay stations such as RS-1 1618, and a UL MS zone 1680 for receiving from mobile stations such as MS-1 1612.

During the UL sub-frame 1666, the frame structure 1632 for the RS-1 1618 includes a UL RS zone 1694 for receiving from relay stations such as RS-2 1620, and a UL MS zone 1696 for receiving from mobile stations such as MS-2 1614. There is also an RS radio switching period 1693. During this time, the RS switches its radio from transmitting to receiving. There is a second RS switching period 1698 during which the RS switches its radio from receiving to transmitting.

During the UL sub-frame 1666, the frame structure 1634 for the RS-2 1620 includes a UL MS zone 1621 for receiving from mobile stations such as MS-3 1616.

Frame Structure with MS/RS Zones

Second Embodiment

In a second embodiment, the allocation of resources is again performed in a TDD manner between the UL and DL. Within a TDD frame, there is a DL sub-frame that is only used for downlink transmission (be it from BS to RS, or RS to RS or RS to MS), and a UL sub-frame that is only used for uplink transmission (be it from MS to RS, RS to RS or RS to BS).

It is assumed that full use sub-carrier utilization is employed meaning that a full set of available sub-carrier frequencies is used. More generally, other sub-carrier to sub-channel permutations are possible.

A single OFDM band is used for both RS links (between BS and RS as well as RS and RS) and MS links (between BS and MS as well as RS and MS). In this embodiment, the single OFDM band is on a single OFDM carrier.

In a specific example, within a DL sub-frame, each BS is allocated a DL_RS zone for transmitting to RSs and a DL_MS zone for transmitting to MSs. Each RS is allocated a DL_RS zone for transmitting to RSs if it needs to transmit to a next RS (there may not always be one) and a DL_MS zone for transmitting to MSs.

Similarly, in a specific example, within a UL sub-frame, each BS is allocated a UL_RS zone for receiving from RSs and a UL_MS zone for receiving from MSs. Each RS is allocated a UL_RS zone for receiving from RSs if it needs to receive from a next RS (there may not always be one) and a UL_MS zone for receiving from MSs.

For this embodiment, there is reuse among different tier BS and/or RS. This means, for example, that once OFDM symbols have been allocated as a DL_MS zone of a BS, that time is also made available for use by the RSs, assuming interference problems will not occur. In some implementations of this frame structure, reuse is also allowed among the same tier RSs.

Figure 17:
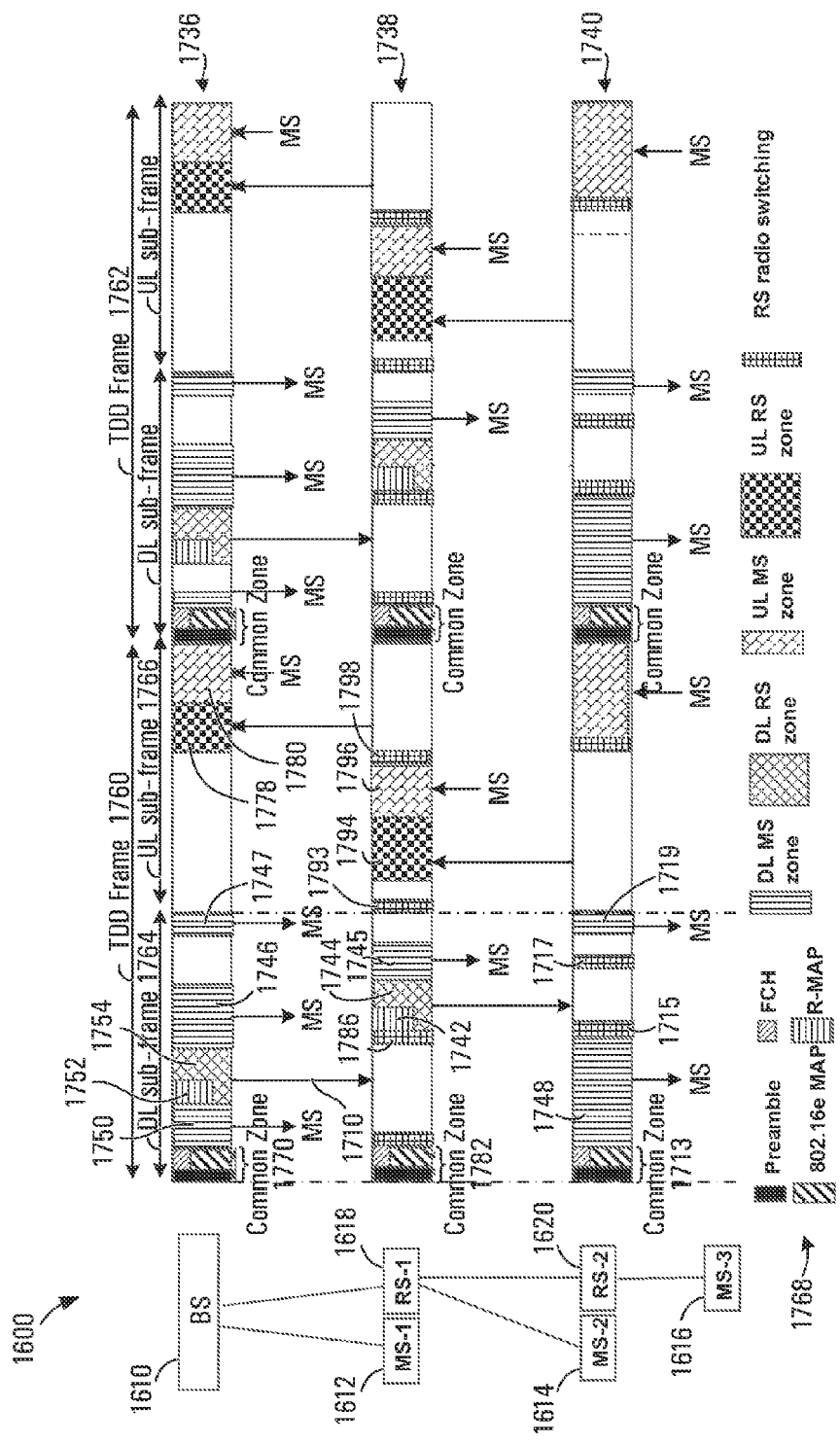

A specific example of frame structures defined in this manner is shown in FIG. 17, where a similar convention to showing the frame structure to that used in FIG. 16 described above has been employed. FIG. 17 also includes the example network 1600 of FIG. 16 to clearly illustrate the correspondence of the frame structure to the base station BS and relay stations RS-1 and RS-2. The frame structure from the perspective of BS 1610 is generally indicated at 1736. The frame structure from the perspective of RS-1 1618 is generally indicated at 1738. The frame structure from the perspective of RS-2 1620 is generally indicated at 1640. In the example of FIG. 17, each arrow for example arrow 1756 between BS 1610 and RS-1 1618 represents a transmission/reception using a full OFDM band.

In the illustrated example, two TDD frames 1760,1762 are shown. Only TDD frame 1760 will be described in detail. TDD frame 1760 is composed of a DL sub-frame 1764 during which all downlink transmissions occur and a UL sub-frame 1766 during which all uplink transmissions occur. A legend indicating differing shadings for the differing zone types is generally indicated at 1768.

During the DL sub-frame 1764, the frame structure 1736 for the BS 1610 includes a common zone 1770 for transmissions that can be received by MSs and RSs. The frame structure 1736 includes a DL_MS zone 1750 for transmission directly to mobile stations such as MS-1 1612. There is a DL-RS zone 1754 that includes an R-MAP 1752 for transmission to relay stations such as RS-1 1618. There are also second and third DL_MS zones 1746,1747 for transmission directly to mobile stations.

During the DL sub-frame 1764, the frame structure 1738 for the RS-1 1618 includes a common zone 1782 for transmissions that can be received by MSs and RSs. The frame structure 1738 includes a DL_MS zone 1745 for transmission directly to mobile stations such as MS-2 1614. There is a DL-RS zone 1744 that includes an R-MAP 1742 for transmission to relay stations such as RS-2 1620. There is also an RS radio switching period 1784. During this time, the RS switches its radio from transmitting to receiving. There is a second RS switching period 1786 during which the RS switches its radio from receiving to transmitting.

During the DL sub-frame 1764, the frame structure 1740 for the RS-2 1720 includes a common zone 1713 for transmissions that can be received by MSs and RSs. The frame structure 1740 includes a DL_MS zone 1748 for transmission directly to mobile stations such as MS-3 1616. There is also an RS radio switching period 1715. During this time, the RS switches its radio from transmitting to receiving. There is a second RS switching period 1717 during which the RS switches its radio from receiving to transmitting. There is also a second DL_MS zones 1719 for transmission directly to mobile stations.

During the UL sub-frame 1766, the frame structure 1736 for the BS 1610 includes a UL RS zone 1778 for receiving from relay stations such as RS-1 1618, and a UL MS zone 1780 for receiving from mobile stations such as MS-1 1612.

During the UL sub-frame 1766, the frame structure 1738 for the RS-1 1618 includes a UL RS zone 1794 for receiving from relay stations such as RS-2 1620, and a UL MS zone 1796 for receiving from mobile stations such as MS-2 1614. There is also an RS radio switching period 1793. During this time, the RS switches its radio from transmitting to receiving. There is a second RS switching period 1798 during which the RS switches its radio from receiving to transmitting.

During the UL sub-frame 1766, the frame structure 1740 for the RS-2 1620 includes a UL MS zone 1721 for receiving from mobile stations such as MS-3 1616.

An example of reuse is illustrated for RS-1 1618 and BS 1610. Specifically, in frame structure 1738, R-MAP 1742 and DL RS zone 1744 are transmitted at the same time as DL MS zone 1746 by BS 1610 in frame structure 1736. Another example is illustrated in which DL MS zone 1748 is transmitted by RS-2 1620 in frame structure 1740 at the same time as DL MS zone 1750, RS-MAP 1752 and DL RS zone 1754 are transmitted by BS 1610 in frame structure 1736. These are examples of reuse implemented between tiers.

Frame Structure with MS/RS Zones

Third Embodiment

In a third embodiment, the allocation of resources is again performed in a TDD manner between the UL and DL.

Within a TDD frame, there is a DL sub-frame that is only used for downlink transmission (be it from BS to RS, or RS to RS or RS to MS), and a UL sub-frame that is only used for uplink transmission (be it from MS to RS, RS to RS or RS to BS).

It is assumed that partial use sub-carrier channelization (PUSC) is employed meaning that for some transmissions, a subset of an available OFDM band is employed. For example, in some embodiments the available OFDM band is divided into three parts, and the three parts can be allocated separately. More generally, separation into N parts may be performed. The available OFDM band is divided during the DL sub-frame among the BS and the RSs for transmission to respective MSs and the OFDM band is divided during the UL sub-frame among the BS and the RSs for reception from respective MSs.

A single carrier OFDM system involves an OFDM signal being modulated onto a single carrier frequency. This OFDM band of the OFDM signal may be still split into partial bands. In other embodiments described below, multiple different carrier frequencies are used, and a respective OFDM signal is modulated onto each of the carriers.

For this embodiment, single carrier OFDM is used for both RS links (between BS and RS as well as RS and RS) and MS links (between BS and MS as well as RS and MS), although as indicated above, for PUSC implementations, for some of these transmissions, only a part of the band is used.

In a specific example, within a DL sub-frame, each BS is allocated a DL_RS zone for transmitting to RSs and a DL_MS zone for transmitting to MSs. Each RS is allocated a DL_RS zone for transmitting to RSs if it needs to transmit to a next RS (there may not always be one) and a DL_MS zone for transmitting to MSs.

Similarly, in a specific example, within a UL sub-frame, each BS is allocated a UL_RS zone for receiving from RSs and a UL_MS zone for receiving from MSs. Each RS is allocated a UL_RS zone for receiving from RSs if it needs to receive from a next RS (there may not always be one) and a UL_MS zone for receiving from MSs.

For this embodiment, there is no reuse among different tier BS and/or RS. In some implementations of this frame structure, reuse is allowed among the same tier RSs.

Figure 18:
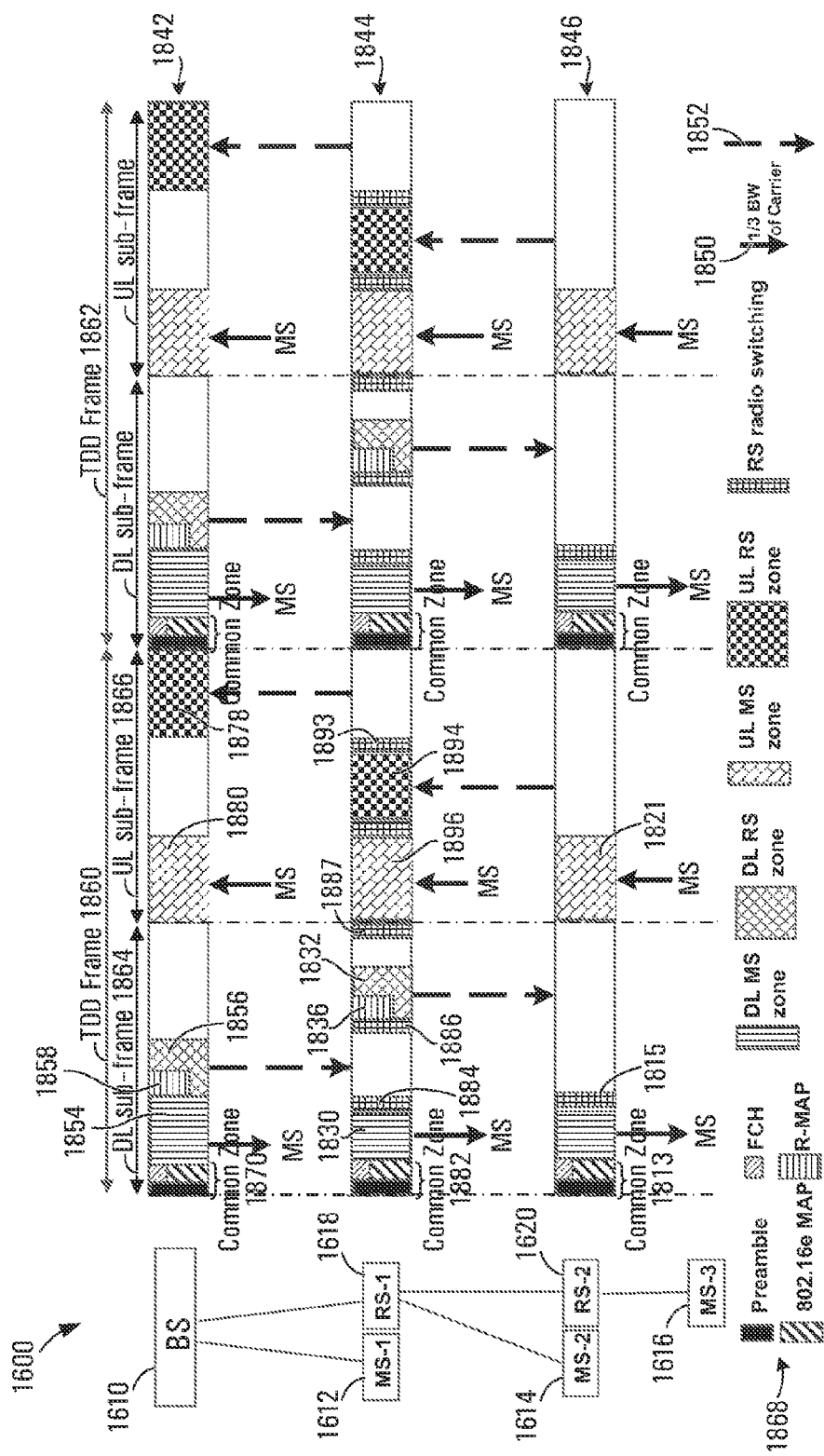

A specific example of frame structures defined in this manner is shown in FIG. 18, where a similar convention to showing the frame structure to that used in FIG. 16 described above has been employed. FIG. 18 also includes the example network 1600 of FIG. 16 to clearly illustrate the correspondence of the frame structure to the base station BS and relay stations RS-1 and RS-2. The frame structure from the perspective of BS 1610 is generally indicated at 1842. The frame structure from the perspective of RS-1 1618 is generally indicated at 1844. The frame structure from the perspective of RS-2 1620 is generally indicated at 1846.

In the illustrated example, two TDD frames 1860,1862 are shown. Only TDD frame 1860 will be described in detail. TDD frame 1860 is composed of a DL sub-frame 1864 during which all downlink transmissions occur and a UL sub-frame 1866 during which all uplink transmissions occur. A legend indicating differing shadings for the differing zone types is generally indicated at 1868.

During the DL sub-frame 1864, the frame structure 1842 for the BS 1610 includes a common zone 1870 for transmissions that can be received by MSs and RSs. The frame structure 1842 includes a DL_MS zone 1854 for transmission directly to mobile stations such as MS-1 1612. There is a DL-RS zone 1856 that includes an R-MAP 1858 for transmission to relay stations such as RS-1 1618.

During the DL sub-frame 1864, the frame structure 1844 for the RS-1 1618 includes a common zone 1882 for transmissions that can be received by MSs and RSs. The frame structure 1844 includes a DL_MS zone 1830 for transmission directly to mobile stations such as MS-2 1614. There is a DL-RS zone 1832 that includes an R-MAP 1836 for transmission to relay stations such as RS-2 1620. There is also an RS radio switching period 1884. During this time, the RS switches its radio from transmitting to receiving. There is a second RS switching period 1886 during which the RS switches its radio from receiving to transmitting. There is a third RS switching period 1887 during which the RS switches its radio from transmitting to receiving.

During the DL sub-frame 1864, the frame structure 1846 for the RS-2 1620 includes a common zone 1813 for transmissions that can be received by MSs and RSs. The frame structure 1846 includes a DL_MS zone 1848 for transmission directly to mobile stations such as MS-3 1616. There is also an RS radio switching period 1815. During this time, the RS switches its radio from transmitting to receiving.

During the UL sub-frame 1866, the frame structure 1842 for the BS 1610 includes a UL RS zone 1878 for receiving from relay stations such as RS-1 1618, and a UL MS zone 1880 for receiving from mobile stations such as MS-1 1612.

During the UL sub-frame 1866, the frame structure 1844 for the RS-1 1618 includes a UL RS zone 1894 for receiving from relay stations such as RS-2 1620, and a UL MS zone 1896 for receiving from mobile stations such as MS-2 1614. There is also an RS radio switching period 1893. During this time, the RS switches its radio from receiving to transmitting.

During the UL sub-frame 1866, the frame structure 1846 for the RS-2 1620 includes a UL MS zone 1821 for receiving from mobile stations such as MS-3 1616.

In the example of FIG. 18, each solid arrow 1850 as indicated in the legend 1868 represents a transmission/reception using a portion of the OFDM band—⅓ in the particular example illustrated, while each dashed arrow 1852 as indicated in the legend 1868 represents the transmission/reception using the full OFDM band. In the example illustrated, the partial band signals are used to transmit to and from mobile stations; thus, for the BS 1610, RS-1 1618 and RS-2 1620, each are simultaneously allocated a third of the OFDM band at the same time during the DL sub-frame 1864 for transmission to MSs. Similarly, for the BS 1610, RS-1 1618 and RS-2 1620, each are simultaneously allocated a third of the OFDM band during the UL sub-frame 1866 for reception from MSs. However, since the transmissions from BS to RS and RS to RS are transmission/reception using the full OFDM band, and there is no frequency reuse between tiers. Therefore, when a station is receiving a transmission it is not transmitting and vice versa.

Frame Structure with MS/RS Zones

Fourth Embodiment

In a fourth embodiment, the allocation of resources is again performed in a TDD manner between the UL and DL. Within a TDD frame, there is a DL sub-frame that is only used for downlink transmission (be it from BS to RS, or RS to RS or RS to MS), and a UL sub-frame that is only used for uplink transmission (be it from MS to RS, RS to RS or RS to BS).

It is assumed that partial use sub-carrier utilization is employed meaning that for some transmissions, a subset of an available OFDM band is employed. For example, in some embodiments an available OFDM band is divided into three parts, and the three parts can be allocated separately. More generally, separation into N parts may be performed.

For this embodiment, it is assumed there are multiple carriers employed modulated by a respective OFDM signal having an OFDM band. For example there might be three carrier frequencies with respective OFDM bands that can be separately allocated. Note that a different OFDM band is distinct from portions of a single OFDM band; multiple portions of a single OFDM band transmitted by a single transmitter can be generated with a single IFFT, but when multiple bands are employed, each needs a respective IFFT. These can be referred to as respective carriers (each carrier carrying a respective OFDM signal with the associated set of sub-carriers). In a particular example, one OFDM carrier is used in a partial use manner for transmission to and from mobile stations with the bandwidth divided between the BS and RSs. In a particular implementation, the BS is given ⅓ of a first carrier's band, first tier RSs are given ⅓ of the band, and second tier RSs are given ⅓ of the band for both uplink and downlink transmission; a second carrier's band is allocated for transmission by the BS to/from first tier RSs, and a third carrier's band is allocated for transmission by first tier RSs to/from second tier RSs. Transmissions on different carriers can take place simultaneously as there is no interference; similarly transmissions on different partial bands can take place as there is no interference.

Figure 19:
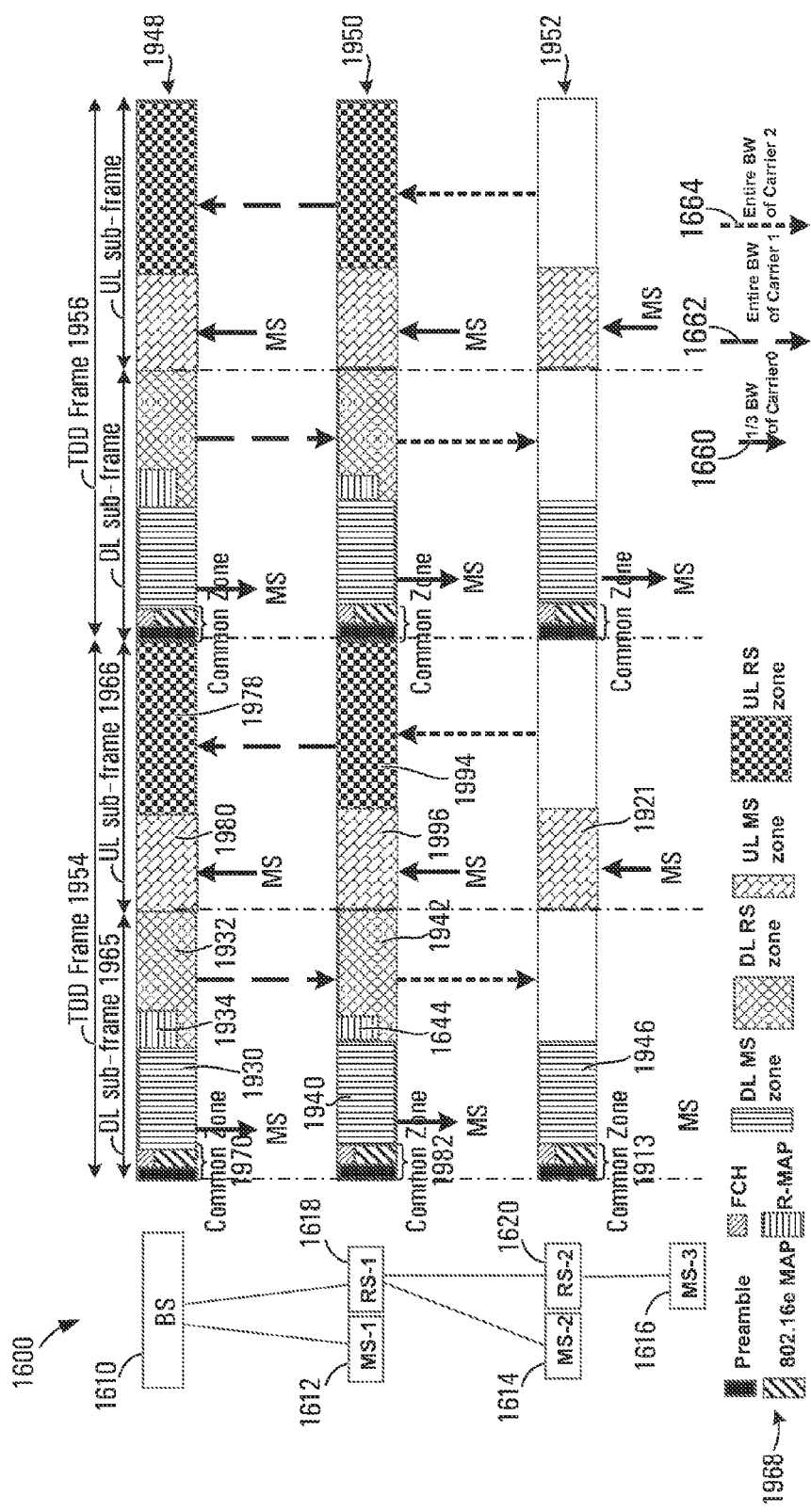

A specific example of frame structures defined in this manner is shown in FIG. 19, where a similar convention to showing the frame structure to that used in FIG. 16 described above has been employed. FIG. 19 also includes the example network 1600 of FIG. 16 to clearly illustrate the correspondence of the frame structure to the base station BS and relay stations RS-1 and RS-2. The frame structure from the perspective of BS 1610 is generally indicated at 1948. The frame structure from the perspective of RS-1 1618 is generally indicated at 1950. The frame structure from the perspective of RS-2 1620 is generally indicated at 1952.

In the illustrated example, two TDD frames 1954,1956 are shown. Only TDD frame 1954 will be described in detail. TDD frame 1954 is composed of a DL sub-frame 1965 during which all downlink transmissions occur and a UL sub-frame 1966 during which all uplink transmissions occur. A legend indicating differing shadings for the differing zone types is generally indicated at 1968.

During the DL sub-frame 1965, the frame structure 1948 for the BS 1610 includes a common zone 1970 for transmissions that can be received by MSs and RSs. The frame structure 1948 includes a DL_MS zone 1930 for transmission directly to mobile stations such as MS-1 1612. There is a DL-RS zone 1932 that includes an R-MAP 1934 for transmission to relay stations such as RS-1 1618.

During the DL sub-frame 1965, the frame structure 1950 for the RS-1 1618 includes a common zone 1982 for transmissions that can be received by MSs and RSs. The frame structure 1950 includes a DL_MS zone 1940 for transmission directly to mobile stations such as MS-2 1614. There is a DL-RS zone 1942 that includes an R-MAP 1944 for transmission to relay stations such as RS-2 1620.

During the DL sub-frame 1965, the frame structure 1952 for the RS-2 1620 includes a common zone 1913 for transmissions that can be received by MSs and RSs. The frame structure 1952 includes a DL_MS zone 1946 for transmission directly to mobile stations such as MS-3 1616.

During the UL sub-frame 1966, the frame structure 1948 for the BS 1610 includes a UL RS zone 1978 for receiving from relay stations such as RS-1 1618, and a UL MS zone 1980 for receiving from mobile stations such as MS-1 1612.

During the UL sub-frame 1966, the frame structure 1950 for the RS-1 1618 includes a UL RS zone 1994 for receiving from relay stations such as RS-2 1620, and a UL MS zone 1996 for receiving from mobile stations such as MS-2 1614.

During the UL sub-frame 1966, the frame structure 1952 for the RS-2 1620 includes a UL MS zone 1921 for receiving from mobile stations such as MS-3 1616.

In the example of FIG. 19, each solid arrow 1960 as indicated in the legend 1968 represents a transmission/reception using a portion of the first OFDM band "carrier 0"—⅓ in the particular example illustrated, each long dashed arrow 1962 as indicated in the legend 1868 represents the transmission/reception using the second OFDM band "carrier 1", and each short dashed arrow 1964 as indicated in the legend 1868 represents the transmission/reception using the third OFDM band "carrier 2". In the example illustrated, the partial band signals are used to transmit to and from mobile stations; thus, for BS 1610, RS-1 1618 and RS-2 1620, each are simultaneously allocated a third of the OFDM band during the DL sub-frame 1965 for transmission to MSs. Similarly, for BS 1610, RS-1 1618 and RS-2 1620, each are simultaneously allocated a third of the first OFDM band during the UL sub-frame for reception from MSs. The entire second OFDM band is used for transmission/reception between the BS and the first tire RS (RS-1 1618), and the entire third OFDM band is used for transmission/reception between first and second tier RSs (RS-1 1618 and RS-2 1620). For the particular example illustrated, two radios are provided in the first tier RS to allow the reception from the BS on carrier 1 simultaneously with the transmission to the second tier RSs on carrier 2.

The embodiments described above, and the specific examples thereof shown in FIGS. 16 to 19 all assume a TDD separation between DL and UL transmissions. Further embodiments are provided that parallel the embodiments described with the exception that the separation between DL and UL transmission uses FDD. All of the examples described above also can be modified to this context; the only difference is that rather than having UL sub-frames and DL sub-frames that are transmitted during separate time intervals, UL frames and DL frames are simultaneously transmitted, but on different frequencies.

RS_Preamble

In systems that do not use relay stations, the BS transmits a preamble that is used by mobile stations to measure radio propagation environment and enable MS cell selection. In 802.16e, this preamble is transmitted at the start of every DL sub-frame. When relay stations are present, they also transmit such a preamble in a similar manner so that MS cell selection can be performed as before. This preamble is referred to as a "normal preamble". A problem with this approach is that an RS needs to be able to look at a received preamble and transmit a preamble at the same time. An embodiment of the invention provides a method of a preamble transmission by the RS that enables RS radio environment measurement without interrupting MS cell selection.

In a particular implementation, a new preamble, referred to as an RS_preamble since it is transmitted by the RS only and not the BS, is transmitted in every Nth frame, where N≥1, once the RS enters the network. In some embodiments, the RS_preamble is transmitted in addition to the normal preamble. In some embodiments, frames are as defined in 802.16e, but other frame definitions are contemplated.

In some embodiments, the RS_preamble is transmitted within a UL sub-frame for TDD implementations or a UL sub-frame for FDD implementations. Note this is in contrast to the normal preamble that is transmitted during the DL sub-frame. A pseudo-random noise (PN) sequence for each respective RS preamble may be the same as that of an assigned normal preamble or the PN sequence may be different.

The RS's transmission and receiving of this RS_preamble is synchronized so that at each RS_preamble transmission time, RSs that need to listen to preambles are not transmitting preambles at the same time as they are receiving the preambles. For example, first tier RSs can simultaneously transmit their preambles during a first preamble transmission period, and second tier RSs can monitor these; similarly, second tier RSs can simultaneously transmit their preambles during a second preamble transmission period, and first and/or third tier RSs when present can monitor these. In a particular example, first tier RSs transmit their preamble during odd UL sub-frames or UL frames, and second tier RSs transmit their RS_preamble during even UL sub-frames or UL frames.

In some embodiments RS_preamble reuse within a cell is employed.

In some embodiments, for the multiple carrier case such as the example of FIG. 19, a common channel is defined as a primary channel for transmitting an RS_preamble for each respective RS to determine a radio environment measurement. The radio environment measurements are used to, for example establish topology, transmit broadcast traffic and RS related control messages, and negotiate or declare the transmission and receiving schedule on another channel.

Channel Coordination

Another embodiment of the invention provides a method of channel coordination for an RS. A channel is defined as a zone on a carrier, and as in previous embodiments, there may be one or multiple carriers each of which has a respective OFDM band.

Variables that affect channel coordination may include the number of radios of an RS, a measurement of RS load, and an environment measurement of an RS.

In a first example of an environment measurement by a RS, the RS measures a neighboring station's (other RSs and/or the BS) preamble or common synch channels after the network entry procedure. The measurement may be synchronized within a cell and controlled by the BS to ensure that at a given time a particular RS stops transmitting preamble/common synch and measures other neighboring station's preambles. When an RS measures the preamble of other respective RSs, it may not be able to transmit its own preamble. The RS may stop sending a preamble for one frame. In some embodiments, if the RS stops sending preambles, before it stops sending preambles, it will notify MSs it is associated with so that none of the MSs will initiate a handoff due to what the MSs would otherwise perceive as a signal drop based on the missing preamble.

In a second example of an environment measurement by an RS, the RS_preamble mechanism described previously is employed.

Centralized Channel Coordination by BS

In some embodiments, centralized channel coordination is performed by the BS based on one or more of the above-mentioned variables. The RS reports its capability during network entry, for example a number of radios, etc. The RS also reports its load statistics to the BS. This may for example occur periodically, on-demand or autonomously. In some embodiments, the RS periodically or on-demand measures signalling strength and/or channel quality of neighboring RSs and reports these measurements to the BS. The BS then determines the channel assignment for each RS and broadcasts this information to the involved RSs.

Distributed Channel Coordination

In some embodiments, distributed channel coordination is performed by the BS based on the above-mentioned variables. For example, the BS determines the channel assignment for an RS that is one hop away from the BS using the same procedure as above for centralized channel coordination. The RS then determines the channel assignment for an RS that is one hop away from the RS. This process continues for subsequent RSs that are each one hop away from an RS determining the channel assignment.

Hybrid of Distributed and Centralized Channel Coordination

With this embodiment, the BS determines channel assignment for each RS in any of a first N hops, using the same approach as above for centralized channel coordination, and the remaining channel assignments using the distributed channel coordination approach. More specifically, relay stations that are M hops away, where M≥N, will perform channel assignment for relay stations that are M+1 hops away.

The following are a set of messages that can be introduced for achieving the above-described embodiment:

a request message that includes a list of RS IDs (relay station identifications) from which the BS requests measurements made by RSs, for example an RS_ENV-REQ (relay station environment request) message;

a response message to the RS_ENV-REQ message sent by the RSs. For each measured RS, the RS sends an RS ID (may be avoided if in the order of RS ID) and the measurement information, for example RS_ENV-RSP (relay station environment response));

an advertisement (ADV) message for broadcasting channel coordination control information by the BS to its RSs or by an RS to its next hop RSs, for example RS_Channel-ADV (relay station channel advertisement). For each next hop RS, excluding the end RS, which has no next hop RS, the BS or RS sends an RS ID, transmission OFDM symbol and carrier and/or power, receiving OFDM symbol and carrier, and action time;

a request message sent by the BS to the RS to request transmission OFDM symbol and carrier and/or power information and receiving OFDM symbol and carrier information, for example RS_Channel_REQ (relay station channel request);

a response message sent by the RS to the BS in response to the RS_Channel_REQ, for example RS_Channel-RSP (relay station channel request).

RS DL Resource Allocation Methods

The RS DL resource is a transmission resource used for communication from the BS to the RS and from the RS to its next hop RS. In some embodiments, when an RS is forwarding traffic for multiple MSs (aggregated traffic), the aggregated traffic presents a less bursty nature than traffic dedicated to a single MS. As such, the traffic pattern is similar to a connection-oriented connection. Furthermore, since most RSs may be fixed, a change in channel conditions from the BS to RS and RS to RS may be less frequent than that of a BS to MS or RS to MS, and the channel may remain unchanged for a duration that is longer than a duration of a frame, for example a frame duration defined by 802.16e. Because of these distinctions, a resource assignment mechanism can be different from that currently supported by 802.16e for MS.

In some implementations, a persistent DL RS related resource assignment mechanism is employed. With such a mechanism, a BS or an RS can assign a DL resource to its descendent RS for a period of time longer than a frame, a frame being the nominal period for assignment, for example according to current 802.16e specifications. The resource assignment can be updated from time to time. Variables of the resource assignment include for example any one or more of resource size, resource location and MCS (modulation and coding scheme). In some embodiments, the resource assignment can be supplemented beyond an existing persistent resource assignment from time to time. The resource can also be terminated when appropriate, such as when the resource is no longer needed.

In some embodiments, the RS is assigned a dedicated feedback channel for a period of time. The feedback channel may be present every N frames where N is a number greater than or equal to than one. The feedback channel can be used for various purposes. For example, the RS may use this feedback channel to send a channel quality indicator, a feedback header or a BW (bandwidth) request periodically.

The following type of messaging can be employed to implement the above method, but other implementations are possible.

An assignment information element (IE) is introduced, which could be placed in an 802.16e UL-MAP or in an RS-MAP according to embodiments of the present invention. An information element is a portion of the transmission resource used to provide information to a station receiving a transmission on the transmission resource. For example, the DL and UL-MAP portions of the frame may include multiple different types of IEs. The assignment IE may define four types of signalling. For example, a first type of signalling is "Full assignment" signalling, which includes information fields for RS ID (Relay station identification), Resource size and location, and MCS. The first type of signalling allocates a persistent UL resource defined by the contents of the "Full assignment" signalling fields. A second type of signalling is "Supplementary" signalling, which includes information fields for RS ID and resource size and location. The second type of signalling allocates an additional UL resource defined by the contents of the "Supplementary" signalling fields. A third type of signalling includes "Termination" signalling, which includes an information field for RS ID. The third type of signalling terminates a UL resource for the RS defined in the "Termination" signalling field. A fourth type of signalling is "Update" signalling, which includes information fields for one or more of: Update size (defines a new size), Update position (defines a new position) and Update MCS (defines a new MCS). The fourth type of signalling updates a UL resource defined by the parameters in the contents of the "Update" signalling fields. The assignment IE in a given frame may include some or all of the fields defining the four types of signalling.

In some embodiments, the information fields in the assignment IE each accommodate a series of respective bits having a pre-determined length, which are implementation specific.

RS UL Resource Allocation Methods

Another embodiment of the invention provides a method of allocating a transmission resource used for communication from the RS to the BS and from an RS to its parent RS. In some embodiments, when the RS is forwarding traffic from multiple MS to BS (aggregated traffic), the aggregated traffic presents a less bursty nature than traffic dedicated to a single MS. The traffic pattern is similar to a connection-oriented connection. Since most of the RSs may be fixed, a change in the channel conditions from the RS to the BS and from the RS to its parent RS may be less frequent than that of a MS to BS or MS to RS. The channel may remain unchanged for some time, for example longer than a frame as defined by 802.16e. Because of this, the resource assignment mechanism can be different from that currently supported by 802.16e for MS.

RS UL Resource Request

A first aspect of an RS resource allocation mechanism is a UL resource request.

Non-Contention Based Approach

In some embodiments, UL resource requesting is performed using a non-contention based approach. For example, each RS is assigned a dedicated UL resource for an RS to send a resource request message, such as a MAC (media access control) header, every N frames, where N is a pre-defined number. In some embodiments, the dedicated UL resource is a channel that may be the same as the feedback channel or a different channel. Various types of resource request MAC headers can be employed as a UL bandwidth request header. For example, a BW request header and other types of known feedback headers may be employed. A header defined as "RS-BW request header" is also provided herein.

A very specific example of the RS-BW request header is a header that is four bytes in length and includes information fields for defining the request type (Type), the bandwidth request, and a header check sequence (HCS). For example, in some embodiments, the "Type" field is 1 bit, the Bandwidth request field is 22 bits and the HCS field is 8 bits. The 1 bit "Type" field may indicate options such as "increased" and "aggregated" by the use of the single bit as either "0" or "1". When the "Type" selected is "aggregated", the request is made to replace a previous connection bandwidth with a new requested amount. When the "Type" selected is "increased", the request is made to increase a current bandwidth amount by the requested amount.

Contention Based Approach

In some embodiments, UL resource allocation requesting is performed using a contention based approach. The RS uses a BW request ranging method to request a UL resource. This may for example involve the use of either an existing 802.16e BW request header or a "RS-BW request header".

The following is a very specific example of the "RS-BW request header", which has information fields to define a request type (Type), a station identification (Node ID), the bandwidth request and a HCS. For example, in some embodiments, the Type field is 1 bit, the Node ID is 8 bits, the bandwidth request field is 22 bits and the HCS field is 8 bits. The 1 bit "Type" field may indicate options such as "increased" and "aggregated" by the use of the single bit as either "0" or "1". When the "Type" selected is "aggregated", the request is made to replace a previous connection bandwidth with a new requested amount. When the "Type" selected is "increased", the request is made to increase a current bandwidth amount by the requested amount.

RS UL Resource Grant

A second aspect of an RS resource allocation mechanism is a UL resource grant. In some embodiments, this is triggered by the reception of the UL request as described above. In some embodiments, the resource allocation is a persistent UL resource allocation with functionality for updating, supplementing and terminating in a similar manner as that for DL resource allocation, which is described above.

The following is an example of a set of messages that can be used to implement the UL resource grant, but more generally any messaging protocol can be employed.

An assignment IE is introduced, which could be placed in an 802.16e UL-MAP or in an RS-MAP according to embodiments of the present invention. The assignment IE may define four types of signalling. For example, a first type of signalling is "Full assignment" signalling which includes information fields for RS ID, Resource size and location, and MCS. A second type of signalling is "Supplementary" signalling which includes information fields for RS ID and resource size and location. A third type of signalling is "Termination" signalling which includes an information field for RS ID. A fourth type of signalling is "Update" signalling which includes information fields for one more of: Update size (defines a new size), Update position (defines a new position) and Update MCS (defines a new MCS). The uses for the four types of signalling are the same as the uses for the corresponding types of signalling for DL resource allocation described above. The assignment IE in a given frame may include some or all of the fields defining the four types of signalling.

MS UL Resource Allocation

Another embodiment of the invention provides a method of performing MS UL resource allocation. A MS UL resource is the resource used for communication from MS to BS or from a MS to an RS.

With the existing MS UL resource request supported by 802.16e, a piggyback request sub-header is employed. A piggyback request sub-header is part of a MAC frame carrying user data rather than a separate bandwidth request management MAC frame. The piggyback request sub-header may be encrypted, and is used along with data. A BW request header is also used, either on a non-contention based UL resource, or on a contention based UL resource. Due to the encryption of the piggyback request sub-header, the associated RS may not be able to decrypt the sub-header, assuming that there is end-to-end privacy. Because of this, the request has to go to the BS first and the BS will inform the request to the associated RS resulting in a long delay.

In some embodiments for MS UL resource requesting, the piggyback request sub-header function is disabled when MS UL resource requesting is needed (for multi-hop away MS). An MS uses the BW request header transmitted along with data, for example a data PDU (packet data unit), if there is a UL resource available. The RS associated with the MS understands the header because no encryption is performed on the BW request header. The piggyback request sub-header can be disabled, for example through used of a management message request and response, for example SBC-REQ/RES messages.

In some embodiments for MS UL resource requesting, the piggyback sub-header is forwarded to the BS by an RS associated with the MS. The BS decrypts the piggyback sub-header and informs the associated RS by a message, for example an RS_MSBW-IND message. Delay can be reduced by using a dedicated DL/UL RS resource assignment mechanism.

An example of a message that can be used to implement the second option is the RS_MSBW-IND message. The RS_MSBW-IND message defines a connection between the MS and BS, a connection between the MS and RS and includes a bandwidth request. In a specific example of the RS_MSBW-IND message, the message includes information fields to define a basic CID (connection identification) of the MS, the bandwidth request, and transport CID that identifies the connection path.

Intra-Cell Peer-to-Peer Communication

Another embodiment of the invention provides mechanisms for performing intra-cell peer-to-peer communication. This is to enable communication between MSs or between RSs that are associated with the same BS. The peer-to-peer communication is peer-to-peer in the sense that packets received from a MS do not need to go all the way up a hierarchy to a network gateway before being turned around and sent back to another MS and/or RS served by the same BS.

In this embodiment, a simple route function is introduced in a convergence sub-layer. The convergence sub-layer is a layer above MAC layer (layer 2), but below the physical layer (layer 1) as defined in the OSI open system interconnection model.

A destination address table is maintained by the BS that includes destination addresses that are served by the BS. The table is updated at one or more of the following times: after a MS enters the network; at a MS hand off when the MS is leaves the cell being served by the BS; and at a MS hand off when the MS is enters the cell being served by this BS.

Upon receiving a SDU (service data unit) (more generally any transmission) from the UL, a destination address of the SDU is determined. A SDU is a data format utilized in 802.16 MAC layer. If the destination address is within the table, the SDU is routed to a DL convergence sub-layer; otherwise the SDU is routed to an upper layer, for example through SAP (service advertising protocol).

Figure 33:
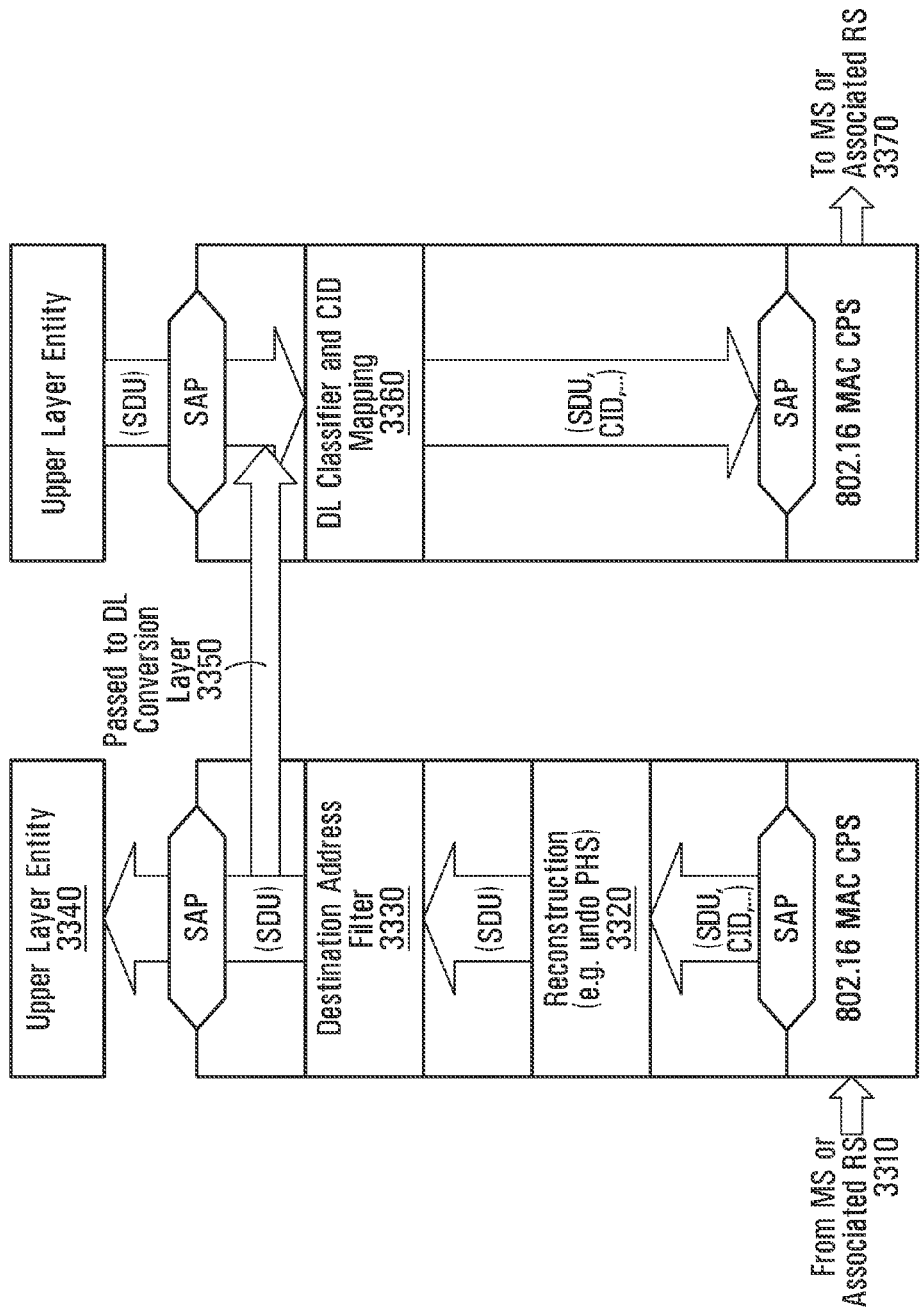
FIG. 33 is a block diagram of functionality in a base station for facilitating intra-cell peer-to-peer communication.

A detailed block diagram of a convergence sub-layer function example is provided in FIG. 33. In the left-hand portion of the figure a packet is received from an MS or associated RS 3310. The packet is reconstructed at 3320, and then subject to destination address filtering at 3330 with the table that includes all addresses covered by the BS. If the address is not present, the packet is passed on to the SAP, and then on to an upper layer entity at 3340. If the address is present, the packet is passed over to the DL convergence sub-layer at 3350, this being the functionality shown in the right hand side of the figure.

In the DL convergence sub-layer, a packet is received that is destined to another address that is served by that BS. DL classification and CID mapping is performed at 3360, and the packet is transmitted to another MS or associated RS at 3370.

A similar concept can be applicable to RSs.

Figure 20:
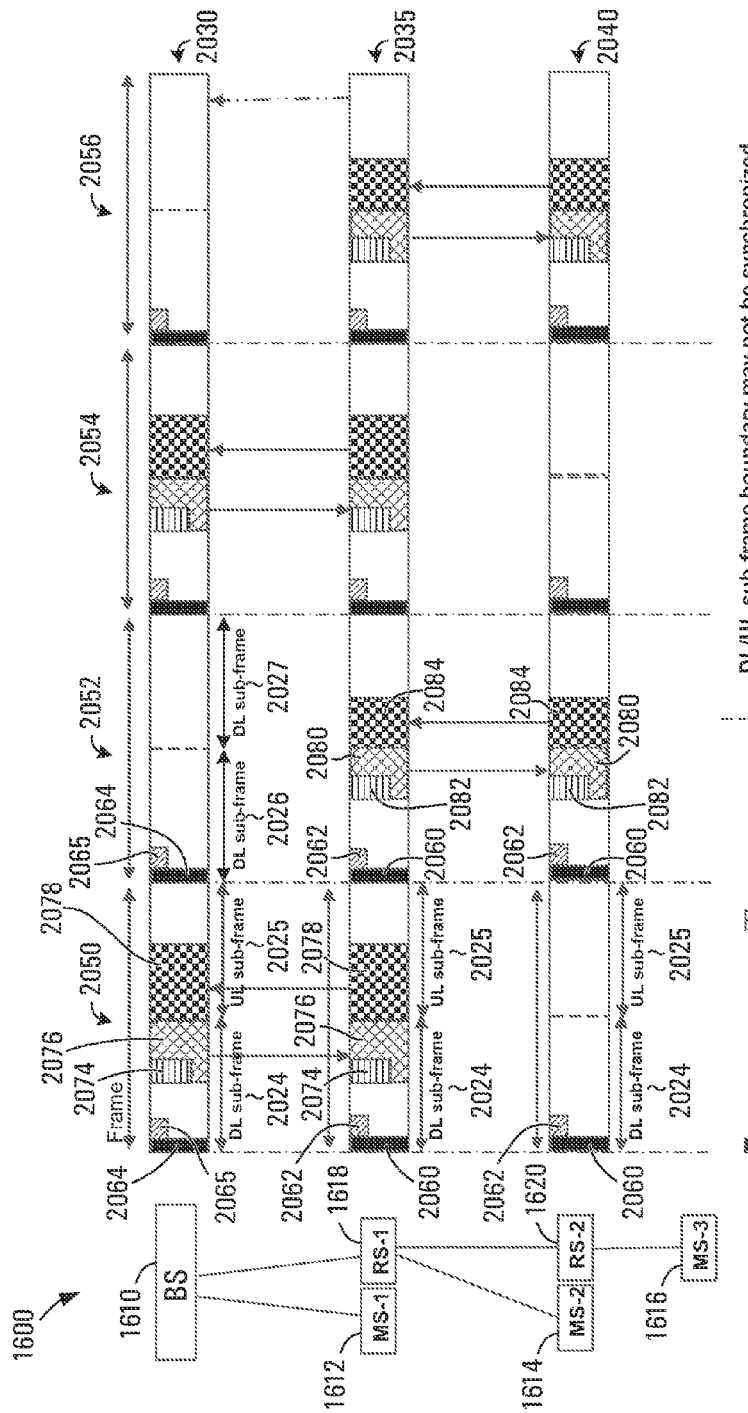
FIGS. 20 and 21 are schematic diagrams of frame structures provided by embodiments of the invention.

Referring to FIG. 20, shown is a specific frame structure for handling the presence of relays in an OFDM communication system. FIG. 20 also includes the example network 1600 of FIG. 16 to clearly illustrate the correspondence of the frame structure to the BS and relay stations RS-1 and RS-2. In FIG. 20, the horizontal direction of the frame structure is time, representing multiple OFDM symbols, while the vertical direction is frequency, representing multiple OFDM sub-carriers. In the first row 2030, communication from the perspective of BS 1610 is shown; in the second row 2035, communication from the perspective of a first tier relay station RS-1 1618 is shown; in the third row 2040, communication from the perspective of a second tier relay station RS-2 1620 is shown. In the time direction, frames are defined, each consisting of multiple OFDM symbols.

In the embodiment illustrated in FIG. 20, an DL/UL (downlink/uplink) duplex structure is employed. Each frame 2050,2052,2054,2056 includes a DL sub-frame 2024,2026 used for DL communication and a UL sub-frame 2025,2027 used for UL communication. The size of these sub-frames can be statically or dynamically defined. The format of FIG.

20 is slightly different from the format of FIGS. 18 and 19 in that both sides of a communication are shown. More specifically, a portion of a frame used to transmit from a first entity, for example BS 1610, to a second entity, for example RS-1 1618, is shown in both the frame structure 2030 for BS 1610 and the frame structure 2035 for RS-1 1618.

The frames are divided into first and second groups of frames. In the illustrated example, the first group is the odd frames 2050,2054 and the second group is the even frames 2052,2056 but other definitions are possible. In FIG. 20, the first group of frames is used for UL and DL communication between BS 1610 and its first tier RSs (RSs one-hop away from BS), for example RS-1 1618 and for communications (not shown) between the BS 1610 and MS directly served by the BS, for example MS-1 1612.

In addition, in some embodiments, the first group of frames is also used for communication between the second tier RSs (two-hops away from the BS), for example RS-2 1620, and MS associated with the second tier RSs, for example MS-3 1616. This assumes interference from transmissions from the BS will not significantly effect transmissions from second tier RSs.

In FIG. 20, the second group of frames 2052,2056 is used for UL and DL communication between the first tier RS RS-1 1618 and any RS/MS it is communicating with. This would include communications between RS-1 and RS-2 1620, and include communications between RS-1 and MS-2 1614 (not shown).

In some embodiments, the BS 1610 is also permitted to communicate during the second group of frames with mobile stations at a reduced power, for example with mobile stations that are closer to the base station, so as not to interfere with the relay communications.

In some embodiments, in order to ensure backwards compatibility with MS that support 802.16e, each RS, after network entry, transmits a preamble 2060 and a FCH 2062 on every frame as shown.

In some embodiments, having defined the first and second groups of frames, RS_Zones are defined in the time domain to enable more efficient sub-channelization. More specifically, a DL RS_Zone is defined for downlink transmission (from a base station or a relay to another relay) and a UL RS_Zone is defined for uplink transmission (from a relay to another relay, or from a relay to BS. Remaining resources are available for communication with mobile stations.

In the illustrated example, four TDD frames 2050,2052, 2054,2056 are shown. Only TDD frames 2050 and 2052 will be described in detail. TDD frame 2050 is composed of a DL sub-frame 2024 during which downlink transmissions from the BS occur and a UL sub-frame 2025 during which uplink transmissions to the BS occur. Similarly, TDD frame 2052 is composed of a DL sub-frame 2026 during which downlink transmissions from first tier RS occur and a UL sub-frame 2027 during which uplink transmissions to second tier RS occur. A legend indicating differing shadings for the differing zone types is generally indicated at 2068.

During the DL sub-frame 2024, the frame structure 2030 for the BS 1610 includes a preamble 2064 and FCH 2065. In some embodiments, the FCH is consistent with 802.16e. The frame structure 2030 includes a DL-RS zone 2076 that includes an R-MAP 2074 for transmission to relay stations such as RS-1 1618. The frame structure 2030 may also include a DL_MS zone (not shown) for transmission directly to mobile stations such as MS-1 1612.

During the DL sub-frame 2024, the frame structure 2035 for the RS-1 1618 includes a preamble 2062 and FCH 2065. In the illustrated example, an area of the DL sub-frame 2024 in frame structure 2035 is shown for receiving the DL-RS zone 2076 that includes the R-MAP 2074. The frame structure 2035 may include a DL_MS zone (not shown) for transmission directly to mobile stations such as MS-2 1614 as well as RS radio switching periods (not shown). During the radio switching periods, the RS switches its radio from transmitting to receiving or vice versa.

During the DL sub-frame 2024, the frame structure 2040 for the RS-2 1620 includes a preamble 2060 and FCH 2062. The frame structure 2040 may include a DL_MS zone (not shown) for transmission directly to mobile stations such as MS-3 1616. There may also be RS radio switching periods.

During the UL sub-frame 2025, the frame structure 2030 for the BS 1610 includes an area of the DL sub-frame 2024 for receiving UL RS zone 2078 transmissions from relay stations such as RS-1 1618. The frame structure 2030 may also include a UL MS zone (not shown) for receiving from mobile stations such as MS-1 1612.

During the UL sub-frame 2025, the frame structure 2035 for the RS-1 1618 includes the UL RS zone 2078 for transmission from relay stations such as RS-2 1620. The frame structure 2035 may also include a UL MS zone (not shown) for receiving from mobile stations such as MS-2 1614. There may also be RS radio switching periods.

During the UL sub-frame 2025, the frame structure 2040 for the RS-2 1620 may include a UL MS zone (not shown) for receiving from mobile stations such as MS-3 1616.

During the DL sub-frame 2026, the frame structure 2030 for the BS 1610 includes a preamble 2064 and FCH 2065. The frame structure 2030 may also include a DL_MS zone (not shown) for transmission directly to mobile stations such as MS-1 1612.

During the DL sub-frame 2026, the frame structure 2035 for the RS-1 1618 includes a preamble 2060 and FCH 2062. The frame structure 2035 includes a DL-RS zone 2080 that includes an R-MAP 2082 for transmission to relay stations such as RS-2 1620. The frame structure 2035 may include a DL_MS zone (not shown) for transmission directly to mobile stations such as MS-2 1614 as well as RS radio switching periods.

During the DL sub-frame 2026, the frame structure 2040 for the RS-2 1620 includes a preamble 2060 and FCH 2062. In the illustrated example, an area of the DL sub-frame 2026 in frame structure 2035 is shown for receiving the DL-RS zone 2080 that includes the R-MAP 2082. The frame structure 2040 may include a DL_MS zone (not shown) for transmission directly to mobile stations such as MS-3 1616. There may also be RS radio switching periods.

During the UL sub-frame 2027, the frame structure 2030 for the BS 1610 may include UL MS zone (not shown) for receiving from mobile stations such as MS-1 1612.

During the UL sub-frame 2027, the frame structure 2035 for the RS-1 1618 includes an area of the UL sub-frame 2027 for receiving a UL RS zone 2094 from relay stations such as RS-2 1620. The frame structure 2035 may also include UL MS zone (not shown) for receiving from mobile stations such as MS-2 1614. There may also be RS radio switching periods.

During the UL sub-frame 2027, the frame structure 2040 for the RS-2 1620 includes a UL RS zone for transmitting to relay stations, such as RS-1 1618. The frame structure 2040 may also include a UL MS zone (not shown) for receiving from mobile stations such as MS-3 1616.

Corresponding zones for transmitting/receiving are defined in the first frame 2050 for the first tier RS RS-1 1618 and the BS 1610 in frame structures 2030,2035. During this time, the second tier relay RS-2 1620 is only communicating with MS, for example MS-3 1616, so no zones are defined. Similar zones are defined for communication between RS-1 1618 and RS-2 1620 during each of the second group of frames 1652, including the second and fourth frames 2052, 2056 in frame structures 2035,2040.

The size of the RS_Zone and a starting OFDM symbol within a frame can be defined for example by a) a fixed size, b) slowly changed in size through use of a management MAC message, and c) dynamically changed in size and forecast by BS and DL transmitting RSs a few frames before the change.

In some embodiments, an RS-MAP is transmitted to indicate the resource assignments for the DL RS_zone and/or the UL RS_zone. These resource assignments indicate how the contents of the transmissions are assigned to particular mobile stations. The RS-MAP, if needed, can be transmitted by each DL transmitting BS and RS in corresponding DL transmitting frames.

An RS-MAP resource allocation includes one or more of resource location information, resource size information and modulation and code scheme (MCS) information. Location information may be provided in the form of a fixed offset relative to the beginning of a frame or a fixed offset relative to the RS_Zone. Size information can for example be provided by modifying the 802.16e OFDMA downlink Frame Prefix Format by changing the last four reserved bits into "RS-MAP length (units in 4 bytes)". MCS information can for example be provided by either of two options which include a) slowly updating the MCS based on worst link budgets among all attached RS and b) multicasting the MCS information to the corresponding RSs when needed.

As an alternative to transmitting the RS-MAP, the allocations for the RS may be included together with allocations for non-relay stations in a single MAP.

Multiple RS-MAPS may be sent with each respective RS-MAP including resource assignments for one or more RS sharing similar channel qualities.

DL Preamble Transmission

In some embodiments, DL preambles are used to transmit PN codes in a manner consistent with current 802.16e definitions. These provide for a total of 114 PN sequences (57×2) and 32 IDcell definitions. In some embodiments, each transmitting station (BS and RS) is physically differentiated within a geographic area by a respective distinct preamble PN sequence for switching purposes. Each respective preamble PN sequence implies a particular IDcell. Thus, each RS is assigned a dedicated PN sequence. This enables a preamble sequence space reuse that is larger than what 802.16e defines. The preamble can be transmitted within the network synchronized in a manner to enable serving station selection.

In some embodiments, the 802.16e standard is adapted to be used in this manner by modifying REG-REQ/RSP (registration request/response) messages to be used by the relay station when it enters the network. For example, the REG-REQ/RSP messages can be modified to include an assigned PN index information field, a DL_PermBase information field, and a PRBS_ID information field. DL_PermBase and PRBS_ID are index numbers used for data randomizations in the 802.16e standard. They are essentially linked to the Base station ID to ensure that each base station randomizes data in different manner. Specifically, DL_PermBase is used in relation to physical sub-channel to logical sub-channel mapping and PRBS_ID is used in relation to data scrambling.

In some embodiments, an algorithm is employed to perform PN index selection. The algorithm selects and assigns to an RS the PN index selection to minimize IDcell collision. The algorithm also may assign DL_PermBase and PRBS_ID values.

For the purpose of routing, a station (BS and RS) is identified by a BS ID (base station identification) in a MAC management message. For this purpose, each RS is assigned a BS ID (48 bits). In some embodiments, the 802.16e standard is adapted to be used in this manner by modifying the REG-REQ/RSP to include the assigned BS ID.

Various options exist for PN assignment for a mobile relay station (MRS) preamble. In some embodiments, the preamble PN index does not change during handover of an MRS from a BS serving first cell to a BS serving a second cell as the MRS moves between the first and second cells. This involves defining a system reserved for a sub-set of PN indexes for the MRS so as to avoid collision when the MRS moves across the network. In some embodiments, the preamble is changed or re-assigned during handover, and no PN needs to be reserved for the MRS. In this case, the MSs associated with the MRS need to be informed of the change or they must perform re-synchronization. In a particular example, this is achieved by modifying a message, such as a mobile handoff message response (MOB_MSHO_RSP) to include a preamble PN index.

TDM Channelization

Figure 21:
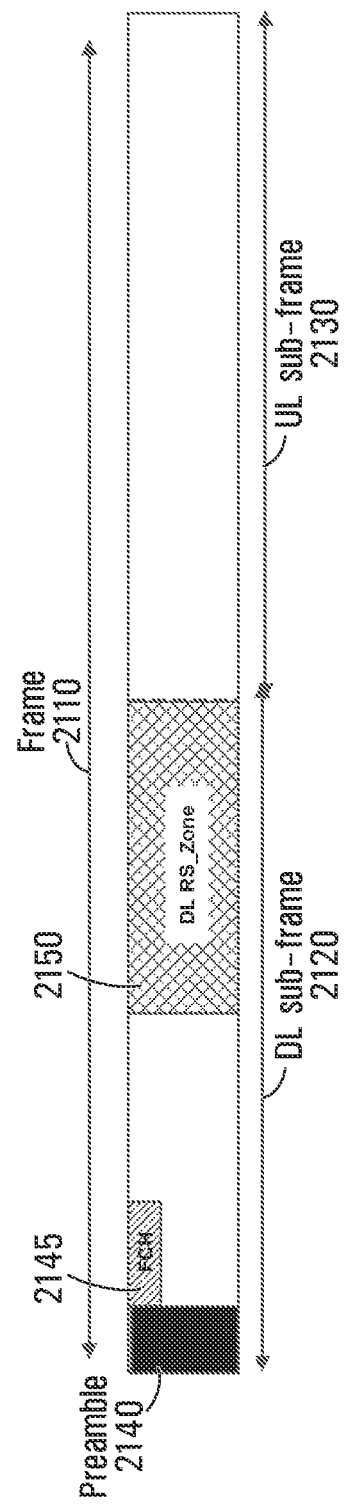

A first example of DL Resource Multiplexing between BS/RS and RS and between BS/RS and MS employs the above-introduced DL RS_Zone for the transmission from BS/RS to RS. The DL RS_Zone concept is illustrated in FIG. 21. In FIG. 21, a frame 2110 is a two dimensional channel resource in which one dimension is represented by logical sub-channels and the other dimension is represented by OFDM symbols. The frame 2110 includes a DL sub-frame 2120 and a UL sub-frame 2130. In the DL sub-frame 2120 there is a preamble 2140 and a FCH 2145. The DL RS_Zone 2150 is also included in the DL sub-frame 2120. This enables the definition of sub-channel types with larger resource granularity and therefore less assignment overhead. In some embodiments, the DL RS_Zone 2150 is consistent with the DL RS_Zone described above with regard to FIGS. 16 to 19.

A DL RS_Zone can, for example, be defined to include one or multiple OFDM symbol(s) within a corresponding DL sub-frame or to include an entire DL sub-frame.

Having defined the DL RS_Zone, sub-channelization can be performed to provide assignment granularity. In some embodiments, a bin concept similar to that used for 802.16e AMC (adaptive modulation and coding) sub-channelization is employed to define a building block for sub-channelization of the DL RS_Zone. A bin is defined as a group of contiguous sub-carriers (G) in one OFDM symbol. Sub-carriers in a bin indexed as k are re-indexed as sub-carrier (k,i)=sub-carrier Gk+i (i=0, 1, . . . , G−1). Each bin includes pilot sub-carriers.

The following is a specific example of how the bin concept can be implemented, but other examples are possible. For one antenna, a sub-carrier indexed with a floor (G/2) is reserved as a pilot sub-carrier. The term "floor" is being used as a mathematical function for rounding a real number to a largest integer less than or equal to the real number. For two antennas, two sub-carriers indexed with floor(G/2) and floor(G/2)+1 respectively, are reserved as pilot sub-carriers, one pilot sub-carrier for each antenna. For four antennas, four sub-carriers indexed with floor(G/2), floor(G/2)−1, floor(G/2)+1 and floor(G/2)+2 respectively, are reserved as pilot sub-carriers, one pilot sub-carrier for each antenna.

Figure 22:
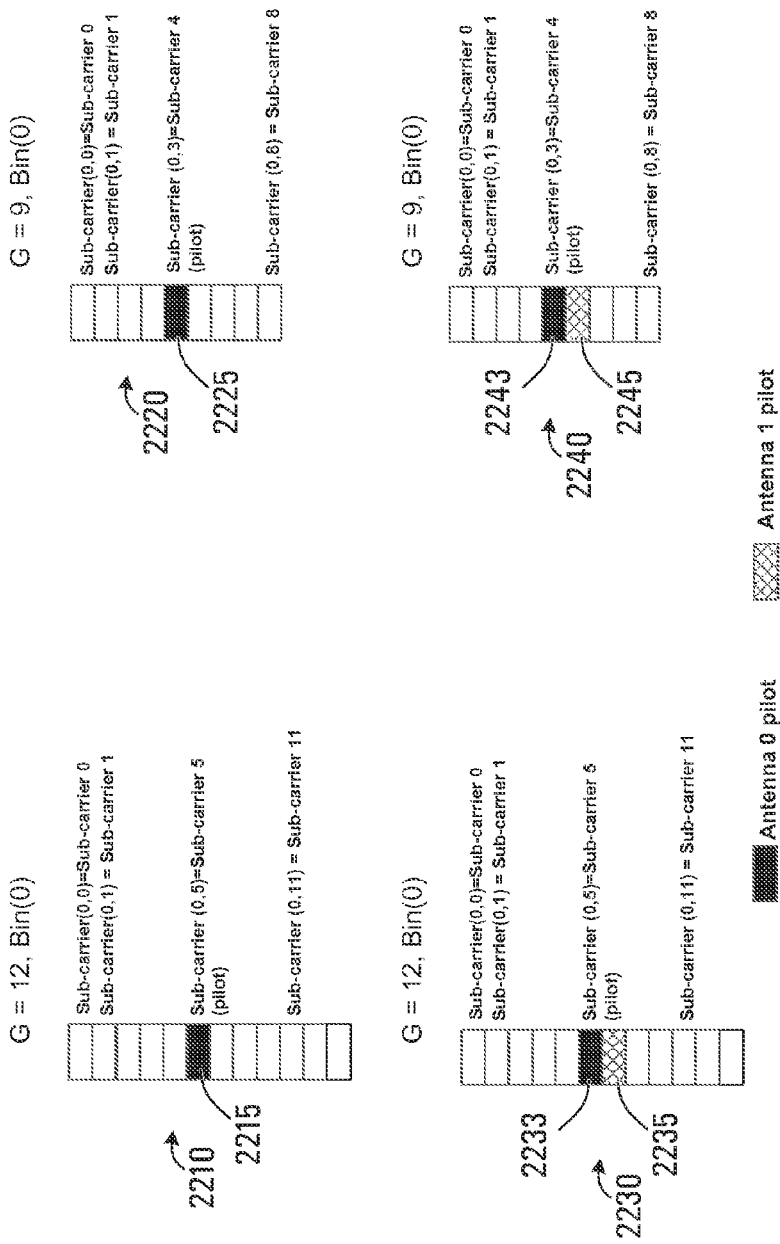
FIG. 22 is a set of schematic diagrams of schematic diagrams of bin construction for even and odd bin sizes.

Examples of bin construction for even and odd bin sizes for one and two antennas are provided in FIG. 22. Each of the examples depicts a single column of rectangular boxes in which the column represents the bin and each box represents a sub-carrier in the bin. Bin constructions for use in single antenna implementations are illustrated at 2210 and 2220. A bin with G=12 including a pilot in the sixth sub-carrier 2215 is illustrated at 2210. A bin with G=9 including a pilot in the fifth sub-carrier 2225 is illustrated at 2220. Bin constructions for use in two antenna implementations are illustrated at 2230 and 2240. A bin with G=12 including a pilot for a first antenna in the sixth sub-carrier 2233 and a pilot for a second antenna in the seventh antenna 2235 is illustrated at 2230. A bin with G=9 including a pilot for a first antenna in the fifth sub-carrier 2243 and a pilot for a second antenna in the sixth antenna 2245 is illustrated at 2240.

The bins thus defined can then be used to define sub-channels to allow for DL resource multiplexing. Sub-channelization can be defined by a matrix of N×M bins, in which N is a number of contiguous bins within an OFDM symbol and M as a number of consecutive OFDM symbols. The following are specific examples of sub-channel types that might be provided: 1×12; 1× size of RS_Zone (size of RS_Zone=number of OFDM symbols of RS_Zone); 2×6; 2×12; 2× size of RS_Zone; 3×6; 3×12; 3× size of RS_Zone; 4×6; 4×12; 4× size of RS_Zone; 6×6; 6×12; 6× size of RS_Zone. More generally, the size of the sub-channel is implementation specific and can be a size other than the particular example described above.

Figure 23:
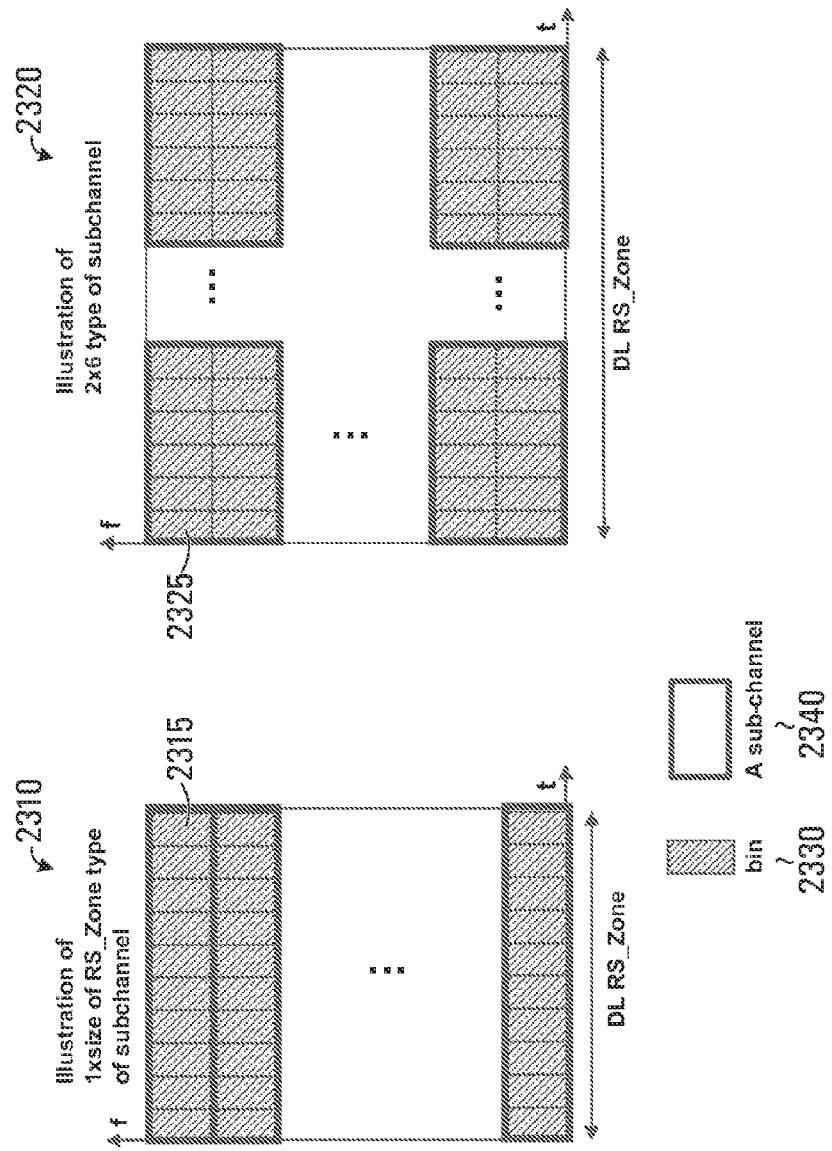
FIG. 23 is a set of schematic diagrams of two specific sub-channel definitions.

FIG. 23 contains examples of two specific sub-channel definitions. Individual bins are identified by a single cross hatched element indicated at 2030. A sub-channel including multiple bins is identified by a thick outline around the multiple bins, as indicated at 2040. A "1× size of RS_Zone" type sub-channel is indicated at 2315 in which the sub-channel is a single row of bins equal to the length of the DL RS_Zone. A "2×6" type sub-channel is indicated at 2325 in which the sub-channel is a matrix that is two rows of six bins. The DL RS_Zones 2310 and 2320 include an implementation specific number of such sub-channels.

FDM Channelization

In another embodiment, DL Resource Multiplexing between BS/RS and RS and BS/RS and MS is employed on an FDM (frequency division multiplexing) basis. This is particularly applicable in PUSC based systems. For example, in 802.16e, all available sub-carriers used for pilots and data in an OFDM symbol are divided into a set (for example six) of major groups and typically two of these major groups are assigned to each sector of a multi-sector transmitter. In another embodiment, a respective fractional number of major groups such as these are dedicated to BS/RS to RS transmission.

In some embodiments, a method employed for sub-channelization is that which is defined in 802.16e, which is hereby incorporated by reference in its entirety. This is a distributed type of channel on the basis of the sub-carriers.

In some embodiments, a sub-channel is defined so as to enlarge sub-channel size. This is a similar concept to the above-described bin-based sub-channelization, but in which the bin is replaced by a cluster. In some embodiments, clusters of a given sub-channel are not contiguous. In some embodiments, a cluster is a group of bins. As the clusters of a given sub-channel do not need to be contiguous, a diversity type of sub-channelization is allowable on the basis of clusters to be defined.

Figure 24:
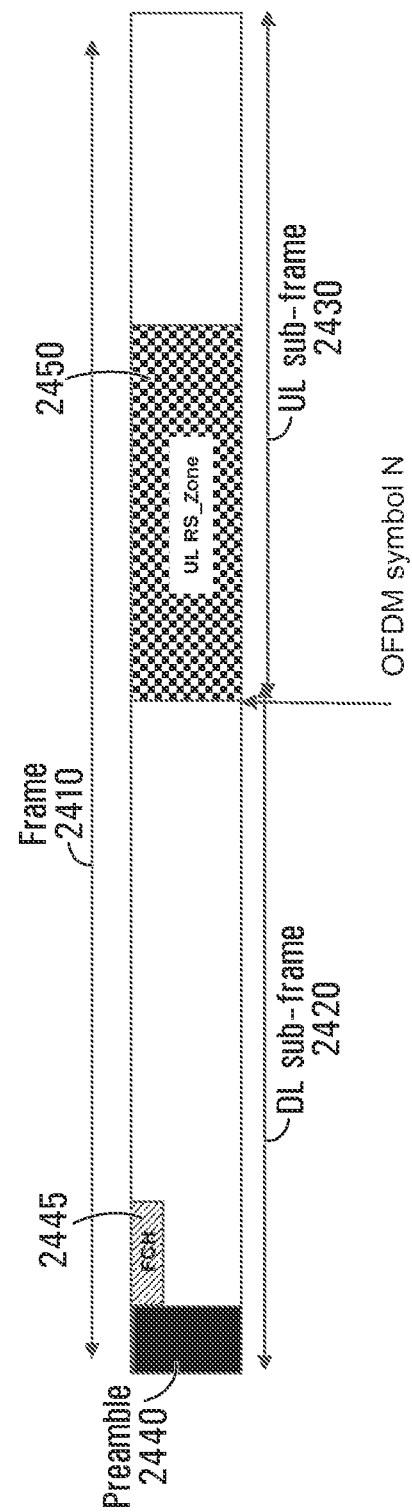
FIG. 24 is a schematic diagram of a frame structure according to an embodiment of the invention.

For UL Resource Multiplexing between RS and BS/RS and between MS and BS/RS, the above-introduced UL RS_Zone can be employed, as depicted in FIG. 24 by way of example. In FIG. 24, a frame 2410 is a two dimensional channel resource in which one dimension is represented by logical sub-channels and the other dimension is represented by OFDM symbols. The frame 2410 includes a DL sub-frame 2420 and a UL sub-frame 2430. In the DL sub-frame 2420 there is a preamble 2440 and a FCH 2445. The UL RS_Zone 2450 is also included as a portion of the UL sub-frame 2430. The UL RS_Zone is used for the transmission from RS to BS/RS and enables the definition of new types of sub-channels. The new types of sub-channels may for example reduce the pilot overhead for fixed or low mobile RS and/or allow for larger resource granularity thereby achieving less assignment overhead. In some embodiments, the UL RS_Zone is consistent with embodiments described above with regard to FIGS. 16 to 19.

The UL RS_Zone definition can for example include one or multiple OFDM symbol(s) within corresponding UL sub-frames, or may include an entire UL sub-frame.

The UL RS_Zone sub-channelization can for example be based on the enhancement of current 802.16e channelization using bin definitions.

A UL bin definition is defined as a group of contiguous sub-carriers (G) in one OFDM symbol. Sub-carriers in a bin indexed as k are re-indexed as sub-carrier(k,i)=sub-carrier Gk+i (i=0, 1, . . . , G−1). Bin_without_pilot is defined as a bin where all sub-carriers are used for data; Bin_with_pilot is defined to include pilots. In some embodiments, transmissions include sets of bins some of which contain pilots and others of which do not to reduce overhead. An example of a bin_with_pilot definition for one antenna is a bin where one sub-carrier is indexed with a floor(G/2) reserved as a pilot sub-carrier. An example of a bin_with_pilot definition for two antennas is a bin where two sub-carriers are indexed with floor(G/2) and floor(G/2)+1 reserved as pilot sub-carriers. For example, a first antenna transmits a pilot at index floor(G/2) and a null symbol location at index floor (G/2)+1 and a second antenna transmits a pilot at index floor(G/2)+1 and a null symbol location at index floor(G/2). More generally, in some embodiments, a first bin definition includes pilot symbols, and a second bin definition does not include pilot symbols, and a combination of the two bin definitions is used for a given sub-channel.

Figure 25:
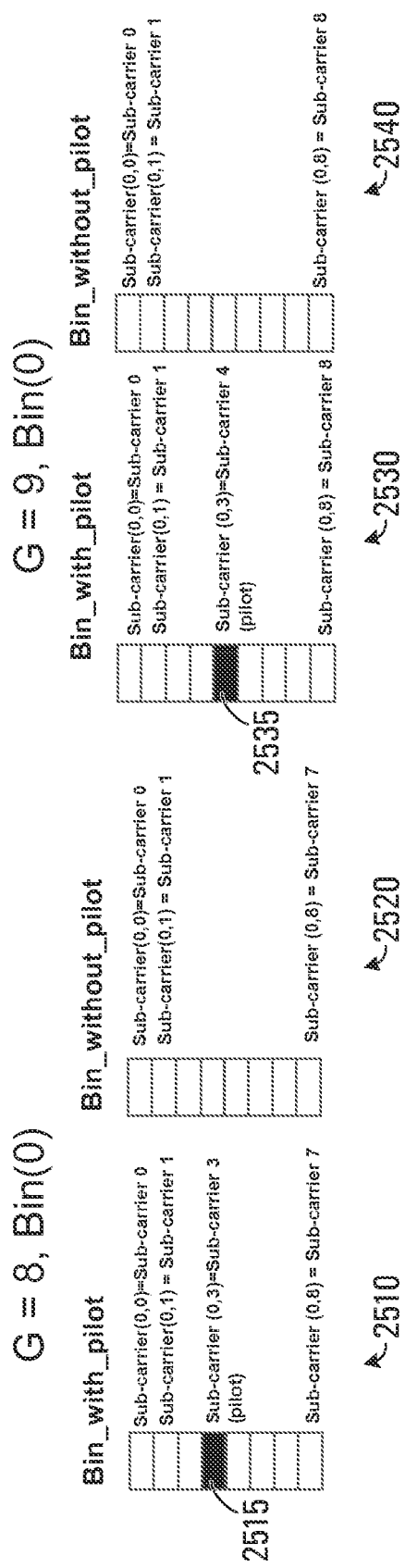
FIG. 25 shows specific examples of bin definitions for two different bin sizes, and for bins with and without pilots.

FIG. 25 shows specific examples of bin definitions for two different bin sizes and for bins with and without pilots. Each of the examples depicts a single column of rectangular boxes in which the column represents the bin and each box represents a sub-carrier in the bin. A bin for G=8 including a pilot in the fourth sub-carrier 2515 is illustrated at 2510. A bin for G=8 without a pilot is illustrated at 2520. A bin for G=9 including a pilot in the fifth sub-carrier 2535 is illustrated at 2530. A bin for G=9 without a pilot is illustrated at 2540.

Figure 26:
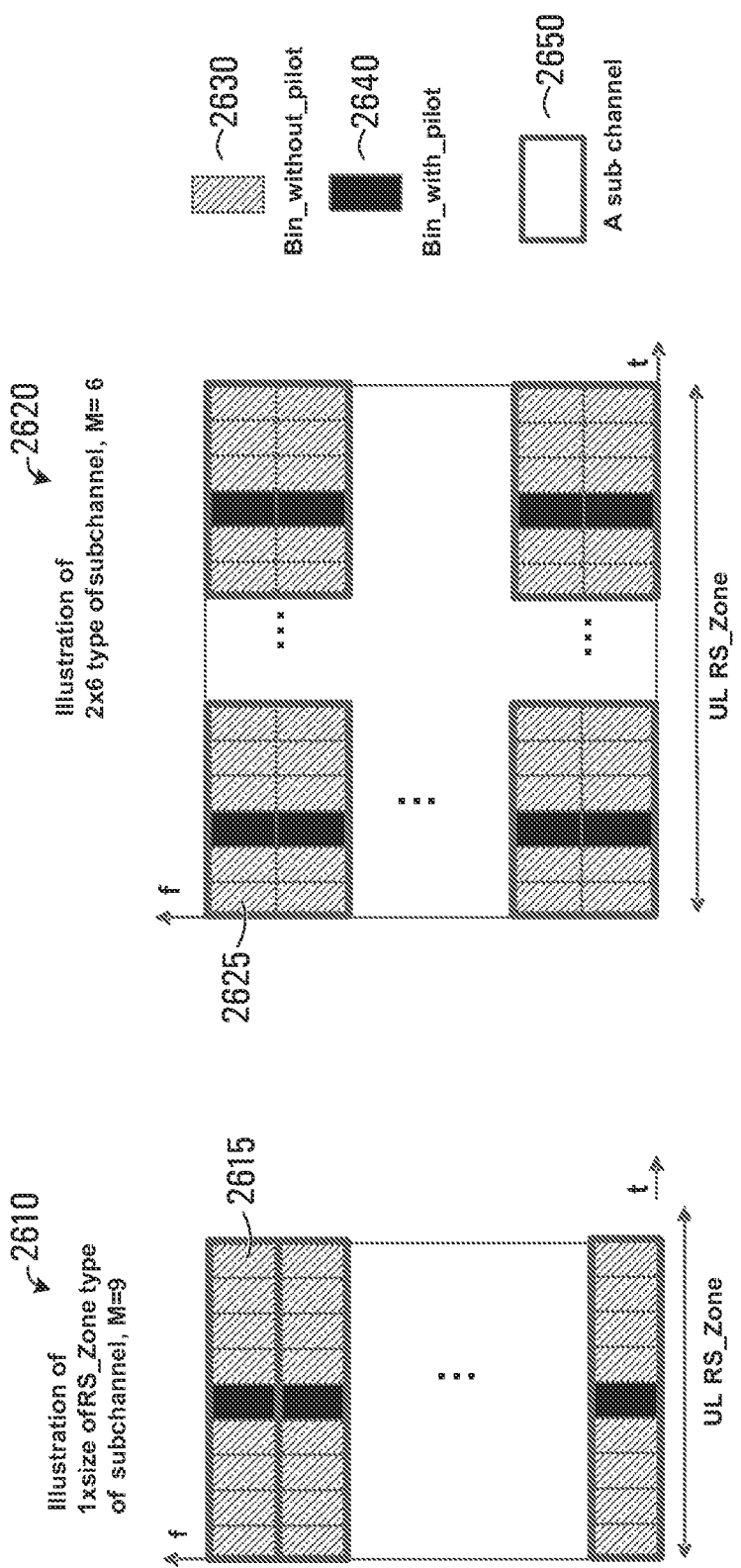
FIG. 26 is a set of schematic diagrams of two specific sub-channel definitions.

Having defined a bin as a basic unit of channelization, sub-channels can be defined similar to how it was done for downlink channelization. Specific examples in FIG. 26 illustrate a given type of sub-channel (M, which is a number of OFDM symbols in the sub-channel is known in which all bins are "bin_without_pilot" bins, except the bins in an OFDM symbol indexed with floor [M/2]. Other breakdowns between bins with pilots and without pilots can be employed. In the illustrated example of FIG. 26, individual "bin_without_pilot" bins are identified by a single cross hatched element as indicated at 2630 and "bin_with_pilot" bins are identified by a single solid black element as indicated by 2640. A sub-channel including multiple bins is identified by a thick outline around the multiple bins as indicated by 2650. A "1× size of RS_Zone" type sub-channel is indicated at 2615 in which the sub-channel is a single row of bins equal to the length of the DL RS_Zone. A "2×6" type sub-channel is indicated at 2325 in which the sub-channel is a matrix that is two rows of six bins. The DL RS_Zones 2310 and 2320 include an implementation specific number of such sub-channels.

In some embodiments, UL Resource Multiplexing between RS and BS/RS and MS and BS/RS is performed using FDM, which is particularly appropriate for PUSC and/or optional PUSC. In some embodiments, a tile structure as defined in 802.16e is employed. In some embodiments, a new tile structure RS_tile is defined. A UL tile can be defined as an N×M structure in which N is the number of contiguous sub-carriers within an OFDM symbol and M is the number of OFDM symbols. Some examples of tiles are defined above in FIGS. 10-15.

In a particular example, an RS_tile type 24×3 is defined. Additional structure types include those having a size of 24×6, 24×12 and 24× size of UL RS_Zone. More generally, the size of the RS_tile is implementation specific and can be a size other than the particular example described above.

Figure 27:
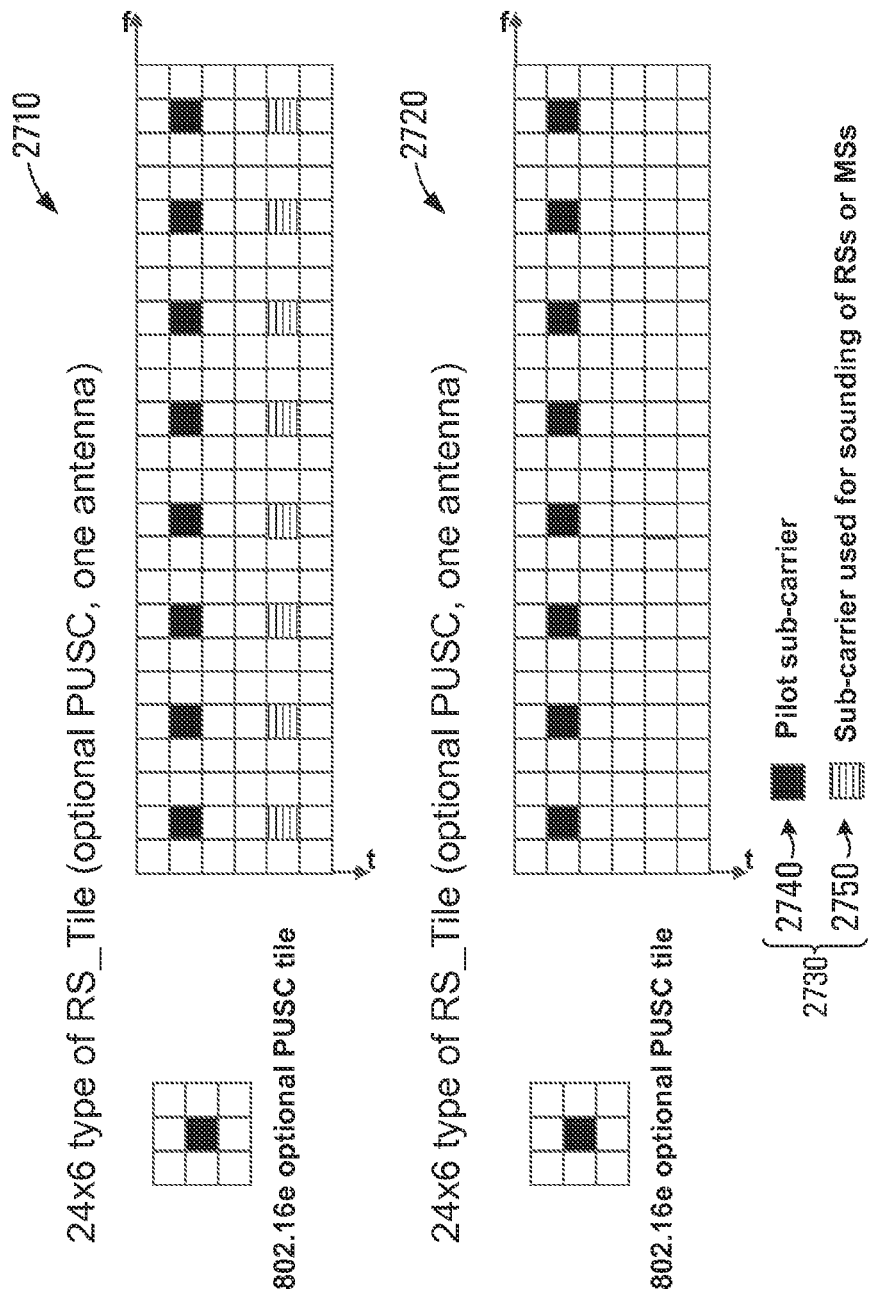
FIG. 27 is a group of schematic diagrams of pilot patterns to be used by an RS according to some embodiments of the invention.

In some embodiments, pilot transmission in a tile is performed with a pilot sub-carrier density in RS_tile that is the same as current 802.16e. In some embodiments, part of those sub-carriers are used for transmitting pilots, and part of those sub-carriers are used for sounding. A specific example of this is shown in FIG. 27. Pilot pattern 2710 is an example of a UL OPUSC pilot pattern having a basic tile structure similar to that of 1310 in FIG. 13A including pilot sub-carriers (indicated by 2740 in legend 2730) in a first row of 3 sub-carrier by 3 OFDM symbol tiles and sub-carriers used for sounding (indicated by 2750 in legend 2730) in a second row of 3 sub-carrier by 3 OFDM symbol tiles. In other embodiments, a pilot density lower than that of the current 802.16e tile is employed. Pilot pattern 2720 is an example of a UL OPUSC pilot pattern having a similar tile structure to 2710 including pilot sub-carriers in a first row of 3 sub-carrier by 3 OFDM symbol tiles and no pilot sub-carriers.

In another embodiment, the entire frame resource is initially assumed to be available for use for RS related transmission (DL/UL). RS sub-channels (RS_sub-channel) can be defined using any appropriate method including but not limited to those described above. In some embodiments, the resource used for MSs is assigned first using 802.16e sub-channels and RS related resources are assigned later using RS sub-channels. All resources occupied by MSs will be punctured out, or removed from the sub-channels to allow for the assigned resource for RS. This avoids hard partitioning between RS related resource and MS related resource.

RS 802.16e Preamble Transmission

In some embodiments, each RS is configured to transmit a preamble to facilitate a MS to perform cell selection and handoff, as well as to potentially aid in other functionality. A specific example of such a preamble is that specified by 802.16e, but others may be used. In the example that follows, 802.16e preambles are assumed, but similar preamble re-use can be applied to any finite preamble resource. With preambles based on 802.16e-2005, there are a total of 114 preambles (identified by preamble as characterized by IDcell, segment and PN sequence) for 1024 mode and 512 mode. This preamble resource pool is shared between base stations and the RSs which are configured to transmit 802.16e preamble.

Preamble Selection

During RS initial network entry, an RS performs the cell selection in a similar manner that a MS does. In some embodiments, this procedure is enhanced to enable the RS assistance in preamble PN sequence selection.

To begin, the RS maintains information identifying a set of possible preambles for use in the system to be measured. In an example approach to achieving this, the relay station maintains preamble information consisting for example of an entry for each preamble with each entry having a preamble index corresponding to the PN sequence. The RS measures the strength of each of the possible preambles and records the strength of each. The strength of each preamble may be recorded in a table for the corresponding entry. The longer the time taken for this measurement, the more the impact of fading will be minimized. When the measurement procedure is finished, for example when some number of frames has been measured, the RS determines its serving station (a base station or possibly another relay station) based on these measurements. The particular criteria here are not relevant and any method of cell selection can be employed.

Having performed cell selection, preamble selection is performed to select the preamble that will be transmitted by the relay station. In some embodiments, the RS uses the strength information to determine a candidate preamble pool for the purpose of a preamble selection. In some embodiments, the candidate preambles in the candidate pool are those preambles whose strengths measured by this RS are lower than a pre-defined threshold. More complicated selection procedures are also contemplated; for example any preamble below a first threshold up to some number and any preamble below a second threshold up to some number and so on; the lowest N below a particular threshold, etc. The RS then selects one preamble from the candidate pool and reports this back to its serving base station, either directly or via other relay stations. More generally, the RS may select some number M of preambles and indicate these to its serving base station. The selected preambles can be indicated by the preamble index. The base station may agree or deny a single selected preamble. In some implementations, the base station signals a determination of one or more preambles to the relay station. In some embodiments, multiple preambles are selected by the relay station, and the base station signals a selection of one of these.

In some embodiments, preamble selection is cooperative in that both the relay station and the base station participate. To begin, the RS reports preamble measurement information to its BS. This may for example contain a list that includes all the preamble indexes whose strength measured by the RS are higher and/or lower than a pre-defined threshold, but other information may alternatively be fed back to the BS.

The BS assigns a preamble based on the information from the list reported by this RS, for example by selecting one on the list or one not on the list depending on what is fed back. In some embodiments, the BS takes into account other available information such as what preamble(s) are currently in use within the cell and in use in neighboring cell(s), assuming this information is made available by neighbor BSs. Such information may be made available for example through backhaul connections.

Advantageously, by reasonable setting of threshold and measurement time, preamble collision (multiple devices attempting to use the same preamble in an overlapping coverage region) can be reduced, and the need for a complex preamble plan can be avoided.

In an example implementation, a Config-REQ/RSP MAC management message utilized. In the Config-REQ/RSP MAC management message the 4 bit reserved field is replaced with "RS_Zone Prefix location" The "RS_Zone Prefix location" indicate the OFDM symbol index relative to the beginning of current frame in units of 2 OFDM symbols.

In some embodiments, preamble strength measurement information, made available by mobile stations and/or relay stations is used by the base station to perform resource re-allocation. To begin, mobile stations report the strengths of preambles transmitted by relays, and more generally the strength of all the preambles that it can measure. In some embodiments, a mobile station may not necessarily distinguish between a preamble transmitted by a BS and a preamble transmitted by an RS and reports the signal strength of both. However, when a BS receives the signal strength measurements it knows which measurement is for the BS preamble and which measurement is for the RS preamble. The BS then uses this information to intelligently perform resource re-use between the relay stations. For example, when a MS reports negligible strength of a preamble transmitted by a one RS and good signal strength from a second RS, the signals transmitted by that first and second RSs may not interfere with each other and as such resources that are in use by the neighbouring base station. Examples of resources that can be allocated in this manner include resources within OFDM frames—for example particular sub-carriers over particular OFDM symbols or frames.

In a specific example of performing resource re-use based on the strength measurements, if a first MS reports a good signal strength from a first RS and poor signal strength from a second RS, and a second MS reports a good signal strength from the second RS and poor signal strength from the first RS, then the same or at least partially overlapping resources, can be assigned at the first and second RS for transmitting to the first and second MS with the understanding that this will not result in interference.

More generally, resources can be allocated at a first relay station to the mobile station that are also being allocated at a second relay station whose preamble signal strength measurement is s below a defined threshold.

Description of Example BS and MS

Figure 28:
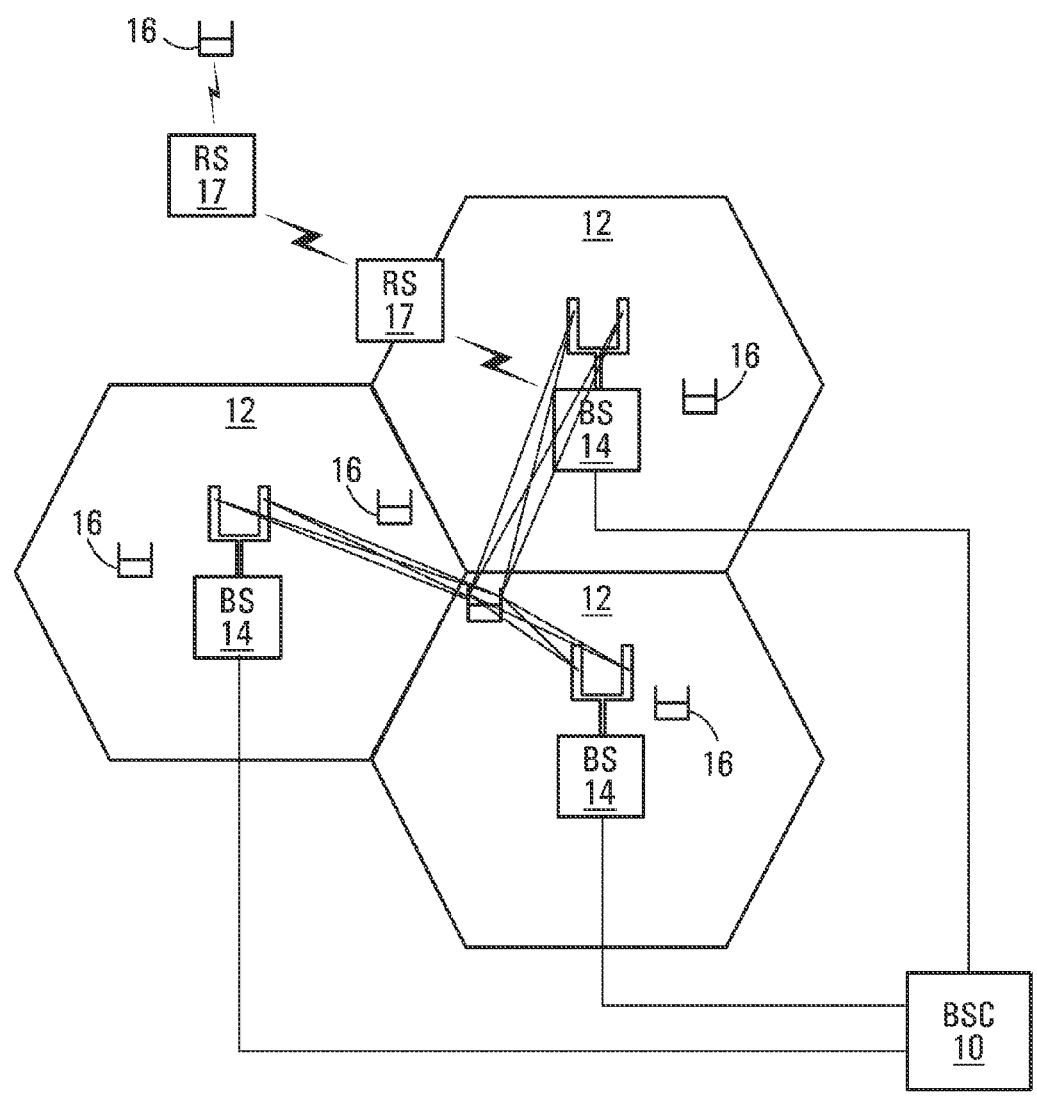
FIG. 28 is a block diagram of a cellular communication system.

For the purpose of providing context for embodiments of the invention for use in a communication system, FIG. 28 shows a base station controller (BSC) 10 which controls wireless communications within multiple cells 12, which cells are served by corresponding base stations (BS) 14. In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. Also shown are relay stations 17.

Figure 29:
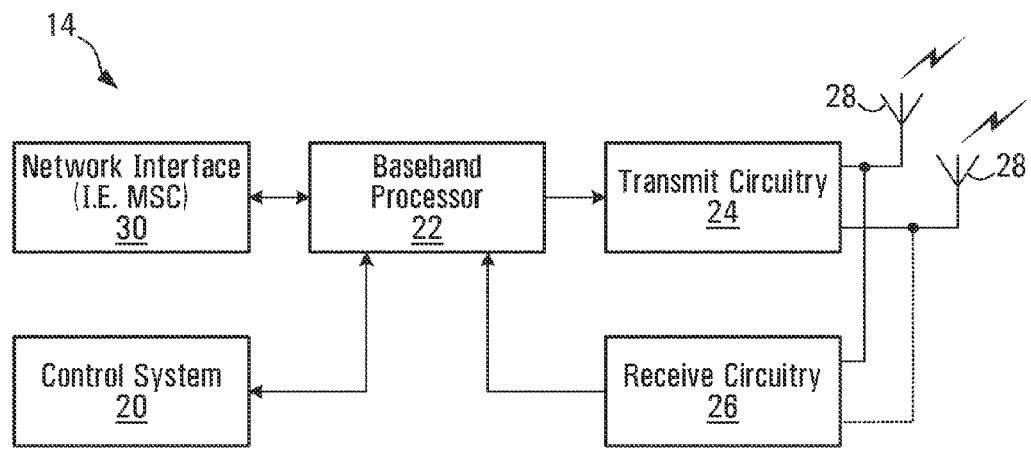
FIG. 29 is a block diagram of an example base station that might be used to implement some embodiments of the present invention.

A high level overview of the mobile terminals 16 and base stations 14 upon which aspects of the present invention are implemented is provided prior to delving into the structural and functional details of the preferred embodiments. With reference to FIG. 29, a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 28). A low noise amplifier and a filter (not shown) may co-operate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Various modulation and processing techniques available to those skilled in the art are used for signal transmission between the base station and the mobile terminal.

Figure 30:
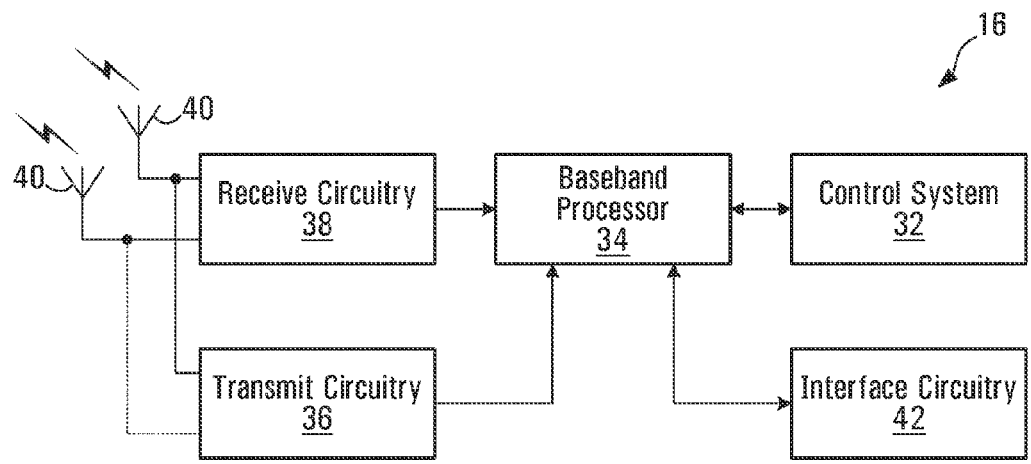
FIG. 30 is a block diagram of an example wireless terminal that might be used to implement some embodiments of the present invention.

With reference to FIG. 30, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. A low noise amplifier and a filter (not shown) may co-operate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28, and each mobile terminal 16 is equipped with "m" receive antennas 40. Notably, the respective antennas can be used for reception and transmission using appropriate duplexers or switches and are so labelled only for clarity.

Figure 31:
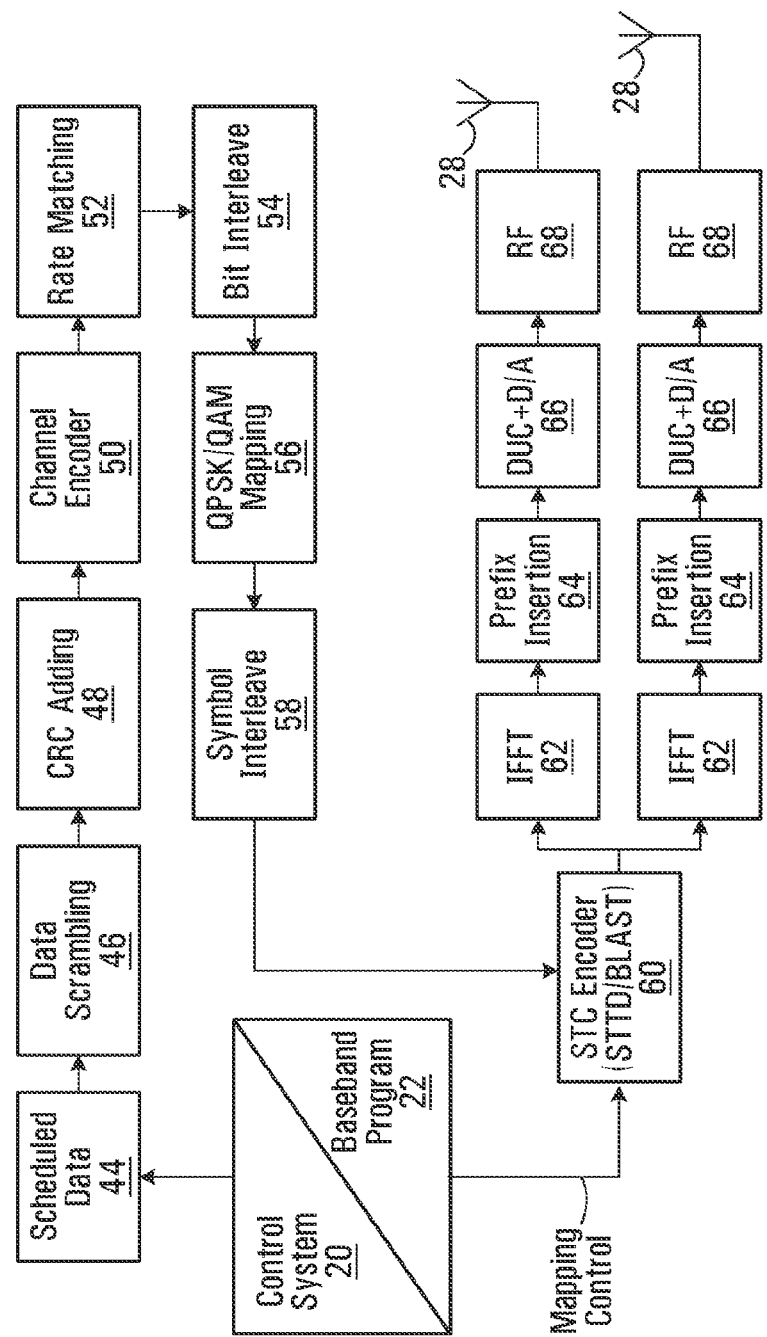
FIG. 31 is a block diagram of a logical breakdown of an example OFDM transmitter architecture that might be used to implement some embodiments of the present invention.

With reference to FIG. 31, a logical OFDM transmission architecture will be described. Initially, the base station controller 10 will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 29 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 32:
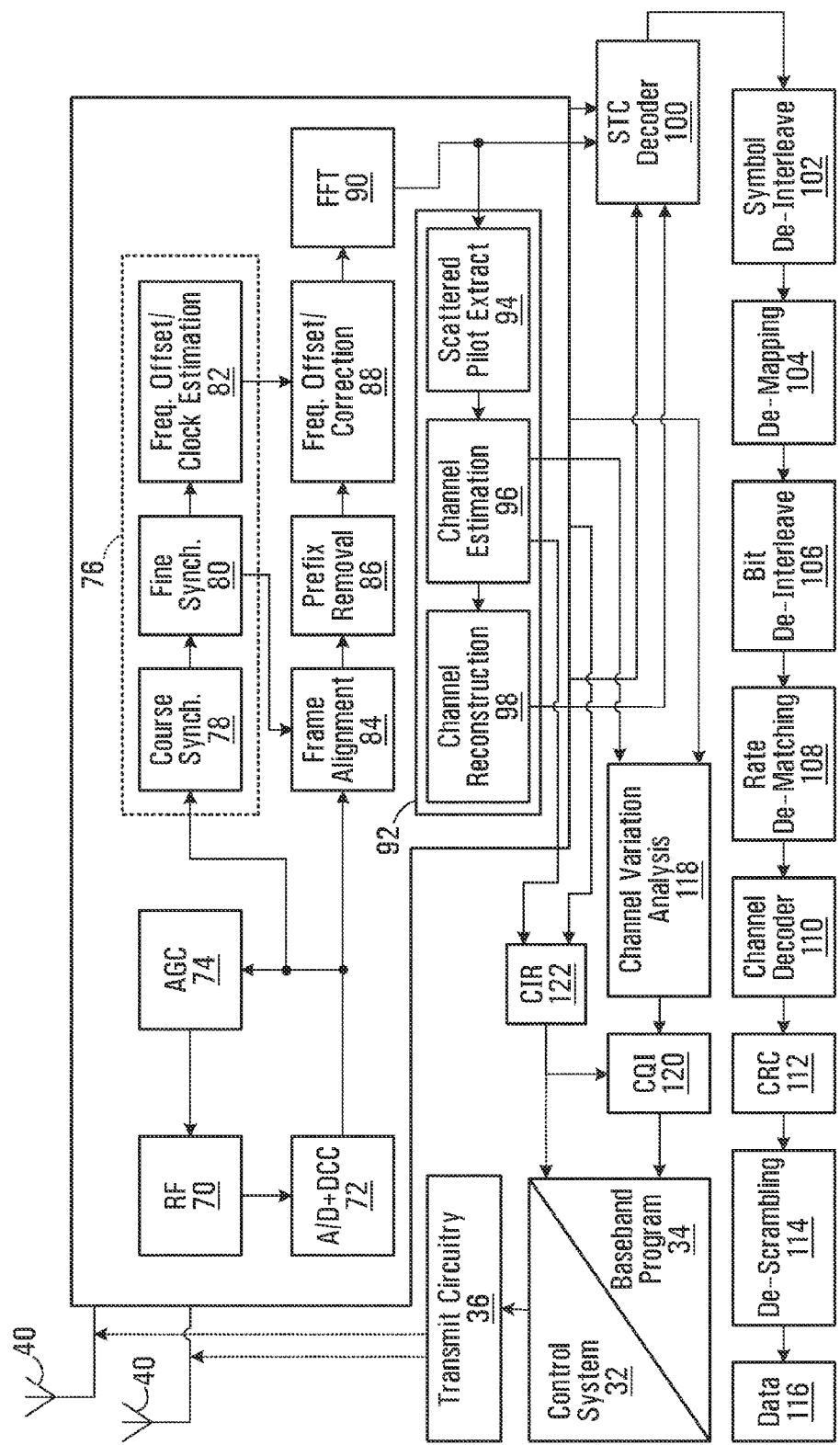
FIG. 32 is a block diagram of a logical breakdown of an example OFDM receiver architecture that might be used to implement some embodiments of the present invention.

Reference is now made to FIG. 32 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Examples of scattering of pilot symbols among available sub-carriers over a given time and frequency plot in an OFDM environment are found in PCT Patent Application No. PCT/CA2005/000387 filed Mar. 15, 2005 assigned to the same assignee of the present application. Continuing with FIG. 32, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The deinterleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which channel response varies across the various sub-carriers in the OFDM frequency band. The channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 28 to 32 each provide a specific example of a communication system or elements of a communication system that could be used to implement embodiments of the invention. It is to be understood that embodiments of the invention can be implemented with communications systems having architectures that are different than the specific example, but that operate in a manner consistent with the implementation of the embodiments as described herein.

For multi-hop implementations such as described previously, each relay node will include some transmitting functionality and some receiving functionality. For example, a relay station may include components of the example OFDM transmitter architecture and the example OFDM receiver architecture.

Numerous modifications and variations of the present invention are possible in light of the above teachings. It is therefore to be understood that within the scope of the appended claims, the invention may be practiced otherwise than as specifically described herein.

The invention claimed is:

1. A method comprising:
    measuring, at a relay station, strengths of a plurality of preambles in use in an orthogonal frequency division multiplexed (OFDM) network, wherein the relay station is in communication with a base station of the OFDM network and serves at least one mobile station in the OFDM network;
    generating, at the relay station, a list reporting a preamble index for each of the plurality of preambles, wherein the list identifies each of the preamble indexes whose strength measured by the relay station are higher or lower than a pre-defined threshold; and
    selecting a preamble to transmit based on the measured strengths of the preambles.

2. The method of claim 1 wherein measuring strengths of a plurality of preambles in use in the system is performed during initial network entry.

3. The method of claim 1 wherein selecting a preamble to transmit based on the measured strengths of the preambles comprises:
    selecting at least one preamble having a signal strength below a threshold.

4. The method of claim 3 further comprising:
    signalling the selection of the at least one preamble back to a serving base station.

5. A method comprising:
    a relay station in communication with a serving base station of the OFDM network and serves at least one mobile station in the OFDM network, wherein the relay station measures strengths of a plurality of preambles in use in an orthogonal frequency division multiplexed (OFDM) system and feeding at least some of these measurements back to the serving base station and generating a list reporting a preamble index for each of the plurality of preambles, wherein the list identifies each of the preamble indexes whose strength measured by the relay station are higher or lower than a pre-defined threshold;

the serving base station selecting a preamble for the relay to transmit based on the measured strengths of the preambles and signalling a selected preamble back to the relay.

6. The method of claim 1 wherein signalling to identify preambles is performed using preamble indexes.

7. The method of claim 5 wherein feeding at least some of these measurements back to a serving base station comprises:

feeding back the list that includes the plurality of preamble indexes.

8. A method comprising:

receiving, at a base station, strength measurement information from a mobile station in respect of a plurality of preambles transmitted by respective relay stations serving the mobile station in an orthogonal frequency division multiplexed (OFDM) network;

receiving, at the base station, a list reporting a preamble index for each of the plurality of preambles, wherein the list identifies each of the preamble indexes whose strength measurement information is higher or lower than a pre-defined threshold; and allocating resources in a manner resulting in resource re-use based on the strength measurements.

9. The method of claim 8 wherein:

allocating resources in a manner resulting in resource re-use based on the strength measurements comprises allocating resources at a first relay station to the mobile station that are also being allocated at a second relay station whose preamble signal strength measurement was below a defined threshold.

10. The method of claim 8 wherein allocating resources in a manner resulting in resource re-use based on the strength measurements comprises:

if a first mobile station reports a good signal strength from a first relay station and poor signal strength from a second relay station, and a second mobile station reports a good signal strength from the second relay station and poor signal strength from the first relay station, then in at least some instances assigning the same or at least partially overlapping resources at the first and second relay stations for transmitting to the first and second mobile stations with the understanding that this will not result in interference.

11. A method for initial access of a relay station (RS) into an orthogonal frequency division multiplexed (OFDM) system comprising a base station (BS) and at least one mobile station (MS), the method comprising:

the RS performing downlink (DL) synchronization, including frame synchronization and timing/frequency synchronization, wherein the RS is in communication with the BS and serves the at least one MS in the OFDM system;

the RS performing cell identification and selection;

the RS obtaining system parameters from information sent on a broadcast channel by the BS to all receiving stations and decoding the received system parameters;

the RS generating a list reporting a preamble index for each of the receiving stations, wherein the list identifies each of the preamble indexes whose strength measured by the RS are higher or lower than a pre-defined threshold;

the RS transmitting an initial ranging code; and the RS receiving a response to its transmitted initial ranging code from the BS.

12. The method of claim 11, further comprising:

selecting the initial ranging code from a first sub-set of ranging codes allocated for use by relay stations in a cell serving the BS, which are different than a second sub-set of ranging codes allocated for use by mobile stations in the cell serving the BS.

13. The method of claim 11, further comprising:

selecting the initial ranging code from a set of ranging codes allocated for use by relay stations and mobile stations in the cell serving the BS.

14. The method of claim 11, further comprising:

selecting the initial ranging code from a set of ranging codes allocated for use by relay stations and transmitting the selected initial ranging code in a time-frequency region that is different than a time-frequency region used for MS initial ranging.

15. A method for initial access of a relay station (RS) by a mobile station (MS) in an orthogonal frequency division multiplexed (OFDM) system comprising a base station (BS) and at least one RS, the method comprising:

the RS generating a list reporting a preamble index for each of a plurality of preambles for use in the OFDM system, wherein the list identifies each of the preamble indexes whose strength measured by the RS are higher or lower than a pre-defined threshold, wherein the RS is in communication with the BS and serves the at least one MS in the OFDM system;

the RS transmitting a common Sync symbol and preamble to enable downlink (DL) synchronization by the mobile;

the RS transmitting information on a broadcast channel available to be received and decoded by all who receive the information;

the RS detecting an initial ranging code from the MS; and the RS sending a response to the received initial ranging code.

16. The method of claim 15, wherein the initial ranging code received by the RS comprises:

an initial ranging code selected from a set of RS dedicated initial ranging codes that are specific to different RSs respectively in a cell served by the BS.

17. The method of claim 16, wherein information regarding RS dedicated initial ranging codes is transmitted and readable by all receivers within range of the BS on a BS broadcast channel.

18. The method of claim 15, wherein initial ranging code received by the RS comprises:

an initial ranging code selected from a set of allocated common initial ranging codes that are used for the BS and all RSs in a cell served by the BS.

19. In an orthogonal frequency division multiplexed (OFDM) system comprising a base station (BS), at least one relay station (RS) and a plurality of mobile station (MSs), a method comprising:

an RS receiving a BS preamble and additional information from the BS in a BS downlink (DL) transmission, the additional information including a BS-FCH (BS frame control header), BS-MAP (BS-multiplexing access profile), BS-Broadcast information, wherein the RS serves at least one of the plurality of MSs in the OFDM system;

the RS generating a list reporting a preamble index for each of a plurality of preambles for use in the OFDM system, wherein the list identifies each of the preamble indexes whose strength measured by the RS are higher or lower than a pre-defined threshold;

the RS transmitting in an RS DL transmission an RS preamble and an RS-FCH (RS frame control header), RS-MAP (RS-multiplexing access profile) and the BS-Broadcast information following a duration for receiving the additional information received from the BS in the BS DL transmission;

the at least one RS receiving in an RS UL transmission ranging information from any relay stations and MSs with which the at least one RS is communicating; and the at least one RS transmitting in a BS UL transmission ranging information from the at least one relay station (RS) and at least some of the plurality of MSs.

20. The method of claim 19 further comprising separating UL transmissions from DL transmissions using TDD (time division duplexing).

21. The method of claim 20 further comprising defining TDD frames, each TDD frame comprising a DL sub-frame during which downlink transmissions for the BS and RSs takes place, and a UL sub-frame during which uplink transmissions to the BS and RSs takes place, the DL sub-frame and the UL sub-frame being sequentially transmitted.

22. The method of claim 19 further comprising separating UL transmissions from DL transmissions using FDD (frequency division duplexing).

23. The method of claim 22 further comprising defining FDD frames, each FDD frame comprising a DL frame during which downlink transmissions for the BS and RSs takes place, and a UL frame during which uplink transmissions to the BS and RSs takes place, the DL frame and the UL frame being simultaneously transmitted using a different frequency resource.

24. The method of claim 19, wherein the duration is the duration for the RS to receive the additional information from the BS plus a predetermined offset.

25. The method of claim 19, wherein the duration is a fixed duration.

26. The method of claim 19, wherein a duration for receiving the additional information is variable in duration.

* * * * *

UNITED STATES PATENT AND TRADEMARK OFFICE
CERTIFICATE OF CORRECTION

PATENT NO. : 9,451,622 B2  
APPLICATION NO. : 13/618926  
DATED : September 20, 2016  
INVENTOR(S) : Ma et al.

Page 1 of 1

It is certified that error appears in the above-identified patent and that said Letters Patent is hereby corrected as shown below:

On the Title Page

Item (63), Line 1, should be replaced with the following:
"Continuation of application No. 12/093,202, filed on Aug. 15, 2008, now Pat. No. 8,774,019, which is a national stage entry of application No. PCT/CA2006/001851, filed on Nov. 10, 2006."

Signed and Sealed this  
Ninth Day of October, 2018

Andrei Iancu  
*Director of the United States Patent and Trademark Office*